United States Patent
Xiao et al.

(10) Patent No.: US 11,862,794 B2
(45) Date of Patent: Jan. 2, 2024

(54) COST EFFECTIVE SYNTHESIS OF OXIDE MATERIALS FOR LITHIUM ION BATTERIES

(71) Applicant: Battelle Memorial Institute, Richland, WA (US)

(72) Inventors: Jie Xiao, Richland, WA (US); Yujing Bi, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 418 days.

(21) Appl. No.: 16/951,868

(22) Filed: Nov. 18, 2020

(65) Prior Publication Data

US 2021/0351404 A1    Nov. 11, 2021

Related U.S. Application Data

(60) Provisional application No. 63/028,146, filed on May 21, 2020, provisional application No. 63/020,621, filed on May 6, 2020.

(51) Int. Cl.
*H01B 1/08* (2006.01)
*H01M 4/525* (2010.01)
(Continued)

(52) U.S. Cl.
CPC ............ *H01M 4/525* (2013.01); *C01G 53/50* (2013.01); *H01B 1/08* (2013.01); *H01M 4/505* (2013.01); *H01M 10/0525* (2013.01); *C01P 2002/52* (2013.01); *C01P 2002/72* (2013.01); *C01P 2002/85* (2013.01); *C01P 2002/90* (2013.01); *C01P 2004/03* (2013.01); *C01P 2004/04* (2013.01); *C01P 2004/61* (2013.01); *C01P 2004/62* (2013.01); *C01P 2006/40* (2013.01);
(Continued)

(58) Field of Classification Search
CPC ......... H01B 1/00; H01B 1/08; H01M 4/0471; H01M 4/525; H01M 10/0525; C01G 53/50
See application file for complete search history.

(56) References Cited

U.S. PATENT DOCUMENTS

| 2016/0211517 A1 | 7/2016 | Beck et al. |
| 2021/0351404 A1 | 11/2021 | Xiao et al. |

(Continued)

FOREIGN PATENT DOCUMENTS

| CN | 106159251 A | 11/2016 |
| CN | 106505193 A | 1/2017 |

OTHER PUBLICATIONS

Hu et al., "Evolution of the rate-limiting step: From thin film to thick Ni-rich cathodes," *Journal of Power Sources*, vol. 454, 227966, pp. 1-3 (Mar. 2, 2020).

(Continued)

*Primary Examiner* — Mark Kopec
(74) *Attorney, Agent, or Firm* — Klarquist Sparkman, LLP

(57) ABSTRACT

Methods for synthesizing single crystalline Ni-rich cathode materials are disclosed. The Ni-rich cathode material may have a formula $LiNi_xMn_yM_zCo_{1-x-y-z}O_2$, where M represents one or more dopant metals, $x \geq 0.6$, $0.01 \leq y < 0.2$, $0 \leq z \leq 0.05$, and $x+y+z \leq 1.0$. The methods are cost-effective, and include methods for solid-state, molten-salt, and flash-sintering syntheses.

17 Claims, 32 Drawing Sheets
(24 of 32 Drawing Sheet(s) Filed in Color)

(51) Int. Cl.
  *C01G 53/00* (2006.01)
  *H01M 10/0525* (2010.01)
  *H01M 4/505* (2010.01)
  *H01M 4/02* (2006.01)

(52) U.S. Cl.
  CPC ............... *H01M 2004/021* (2013.01); *H01M 2004/028* (2013.01)

(56) References Cited

U.S. PATENT DOCUMENTS

2023/0079339 A1* 3/2023 Ma .................... C01G 53/44
2023/0082796 A1* 3/2023 Lee ................. H01M 10/0525
   429/223

OTHER PUBLICATIONS

Hu et al., "Mesoscale-architecture-based crack evolution dictating cycling stability of advanced lithium ion batteries," *Nano Energy*, vol. 79, 105420, pp. 1-8 (Sep. 25, 2020).

Jiang et al., "Safer Triethyl-Phosphate-Based Electrolyte Enables Nonflammable and High-Temperature Endurance for a Lithium Ion Battery," *ACS Appl. Energy Mater*, vol. 3, pp. 1719-1729 (Jan. 22, 2020).

Kim, "Lithium Nickel Cobalt Manganese Oxide Synthesized Using Alkali Chloride Flux: Morphology and Performance As a Cathode Material for Lithium Ion Batteries," *ACS Appl. Energy Mater*, vol. 4, pp. 2329-2333 (Apr. 12, 2012).

Li et al., "Synthesis of Single Crystal $LiNi_{0.88}CO_{0.09}Al_{0.03}O_2$ with a Two-Step Lithiation Method," *Journal of The Electrochemical Society*, vol. 166, No. 10, pp. A1956-A1963 (Jun. 11, 2019).

Zhu et al., "Single-Crystal Based Studies for Correlating Properties and High-Voltage Performance of $Li[Ni_xMn_yCo_{1-x-y}]O_2$ Cathodes," *Journal of Materials Chemistry A*, pp. 1-37 (Feb. 2019).

International Search Report and Written Opinion, dated Apr. 4, 2022, issued in corresponding International Application No. PCT/US2021/030411, 12 pages.

Huang et al., "Synthesis of $Ni_{o.8}Co_{0.1}Mn_{o.1}(OH)_2$ precursor and electrochemical performance of $LiNi_{0.8}Co0.1Mn_{0.1}O_2$ cathode material for lithium batteries," *Trans. Nonferrous Met. Soc.* China, Jul. 2015, 25(7):2253-2259.

Liang et al., "A simple one-step molten salt method for synthesis of micron-sized single primary particle $LiNi_{0.8}Co_{0.1}Mn_{0.1\ O2}$ cathode material for lithium-ion batteries," *Ionics*, Feb. 24, 2020, 26:1635-1643.

* cited by examiner

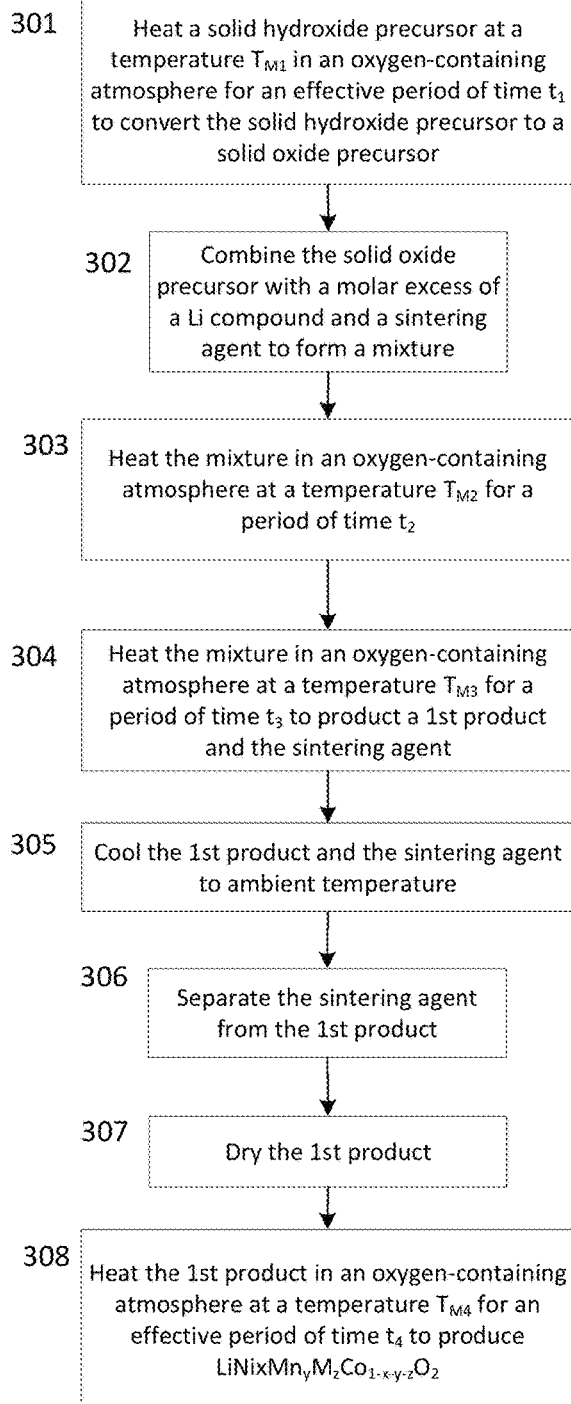
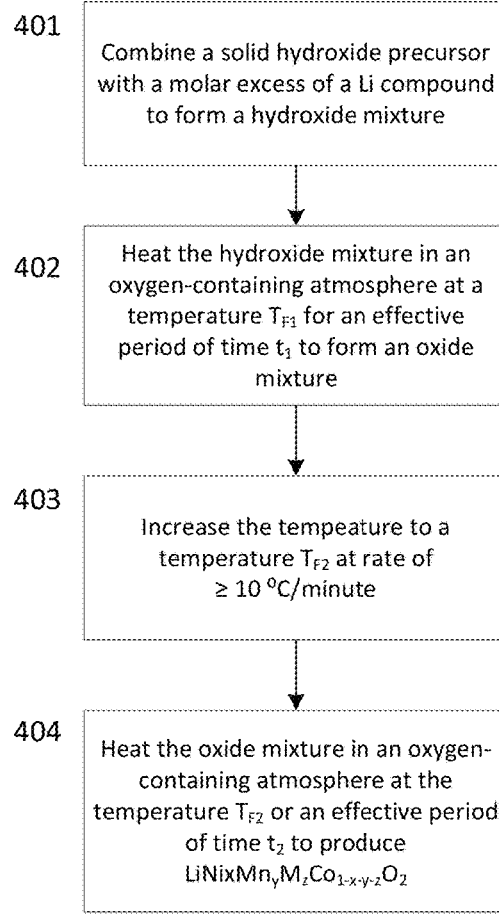
FIG. 3
FIG. 4

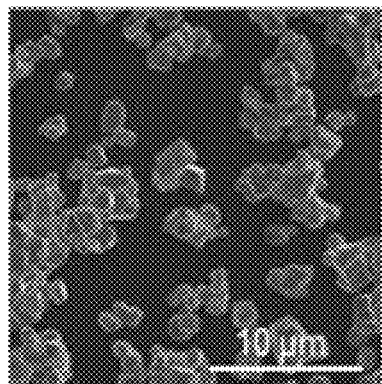 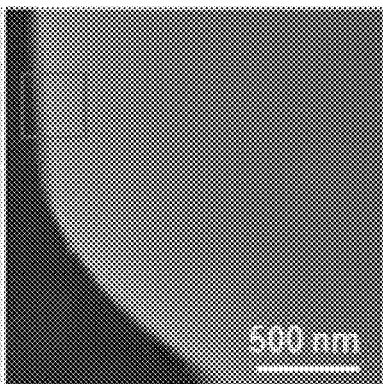 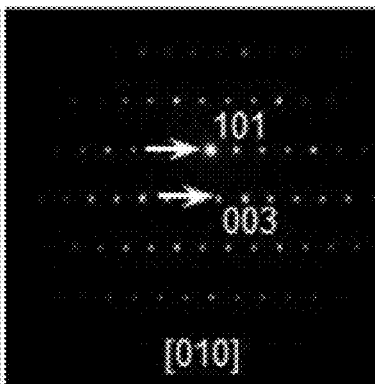
FIG. 7A  FIG. 7B  FIG. 7C
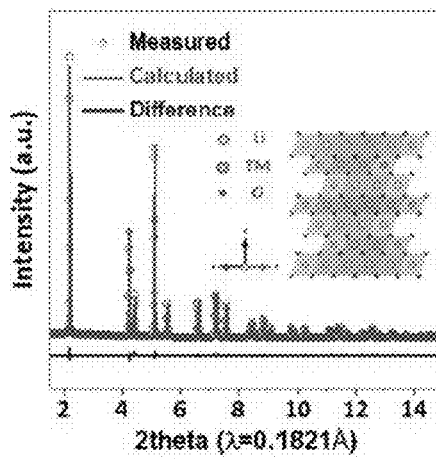 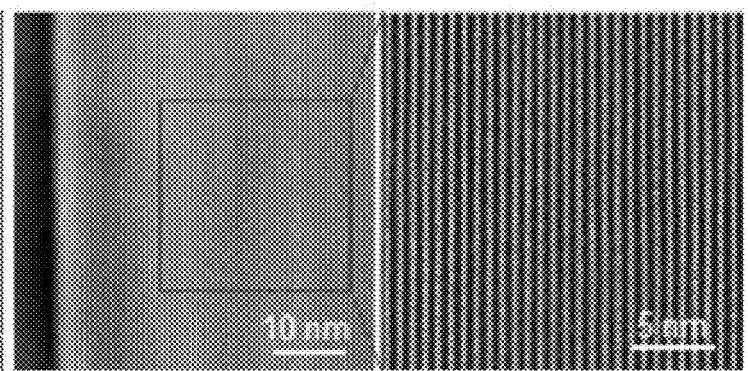
FIG. 7D  FIG. 7E  FIG. 7F
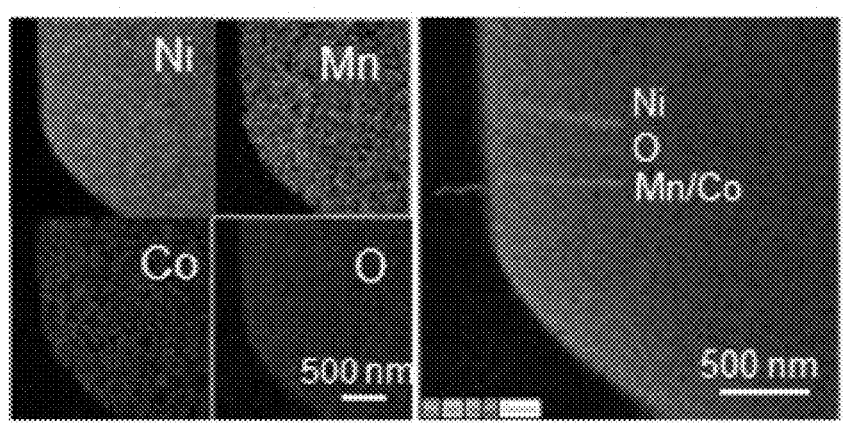
FIG. 7G  FIG. 7H

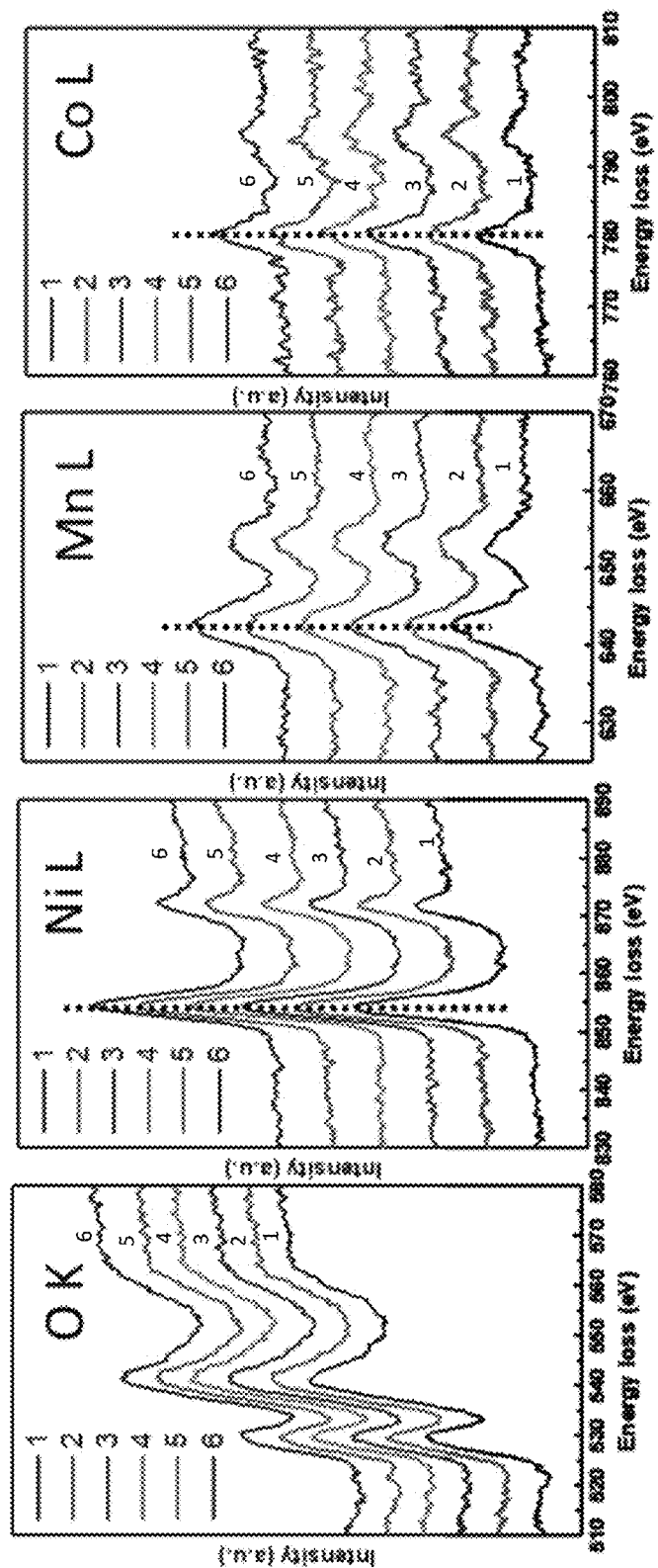
FIG. 22
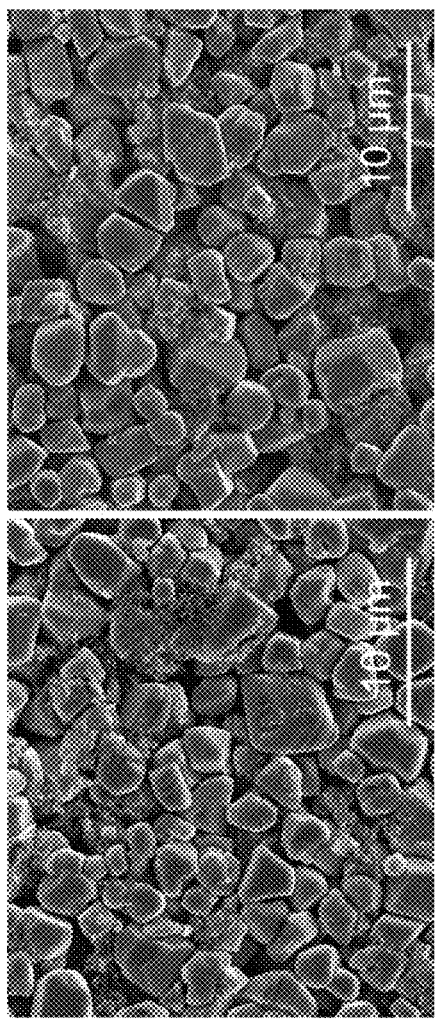
FIG. 23A
FIG. 23B

FIG. 24A
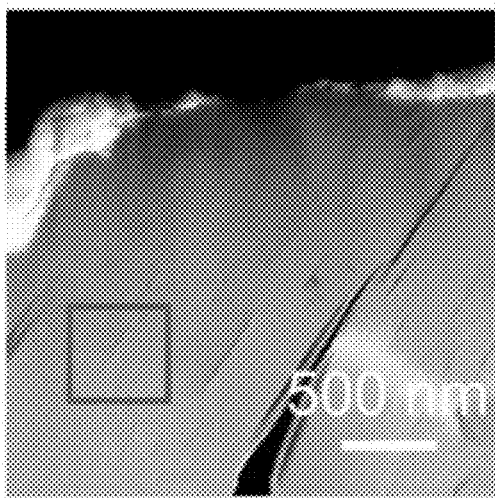
FIG. 24B
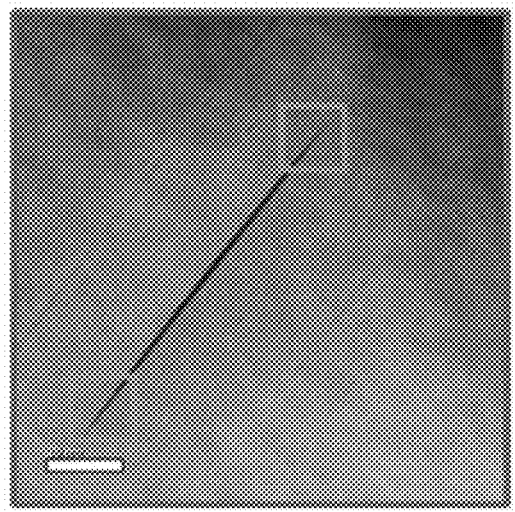
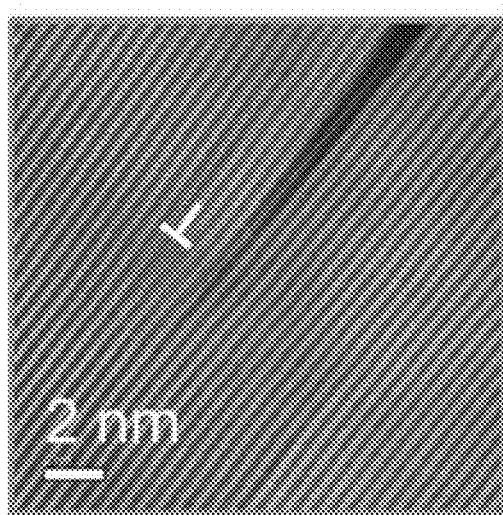
FIG. 24C
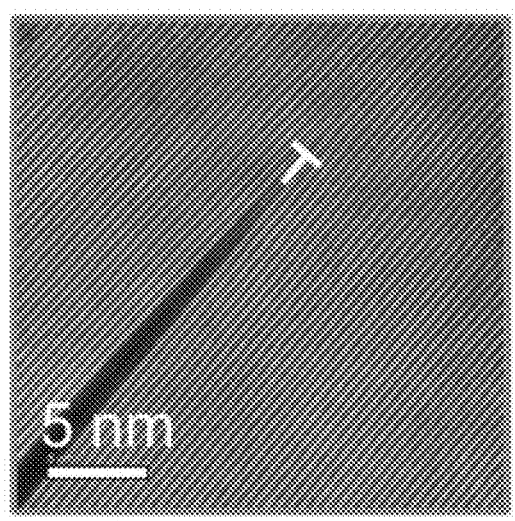
FIG. 24D

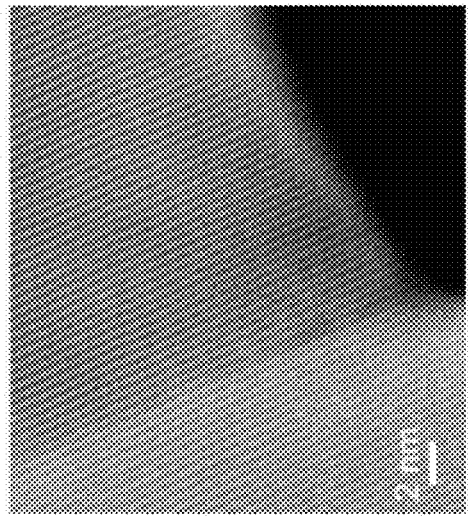
FIG. 25A  FIG. 25B  FIG. 25C
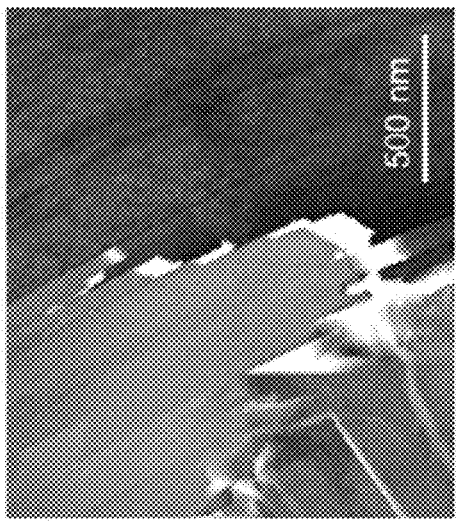
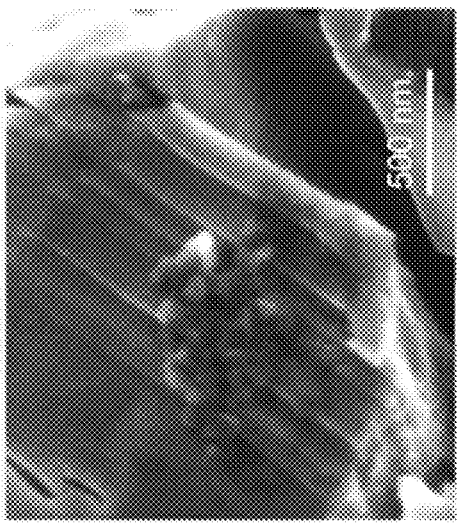
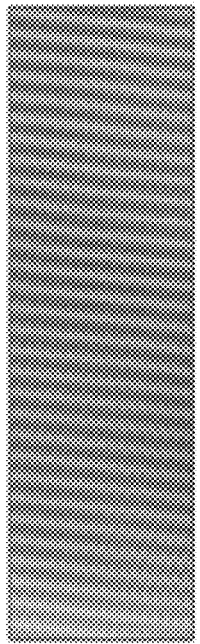
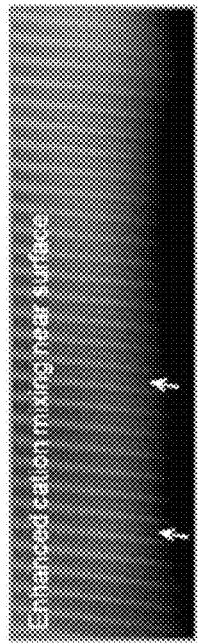
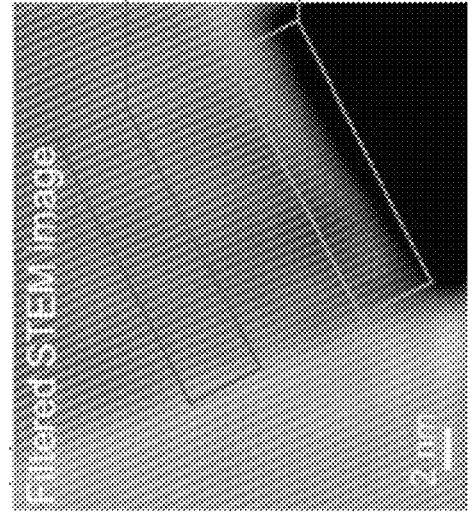
FIG. 25D  FIG. 25E

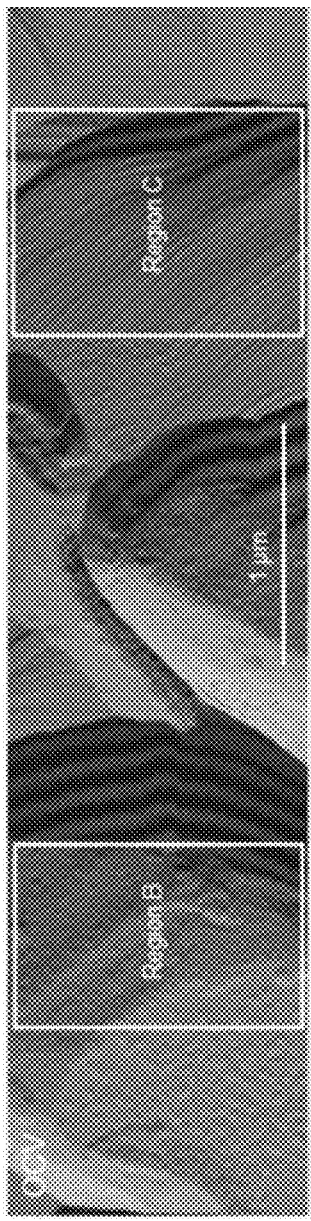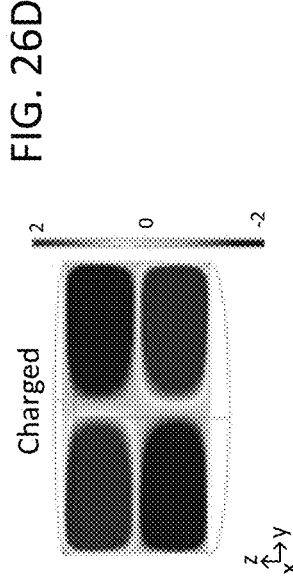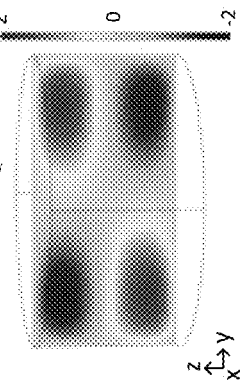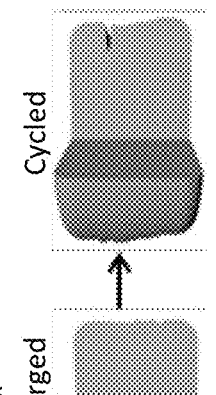
FIG. 26A  FIG. 26B  FIG. 26C  FIG. 26D  FIG. 26E  FIG. 26F

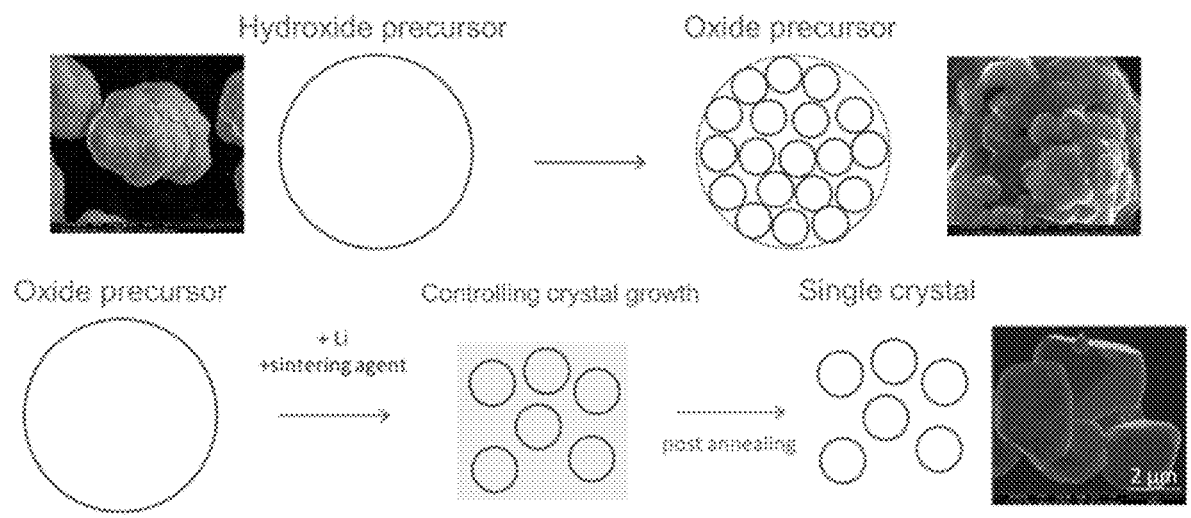
FIG. 34
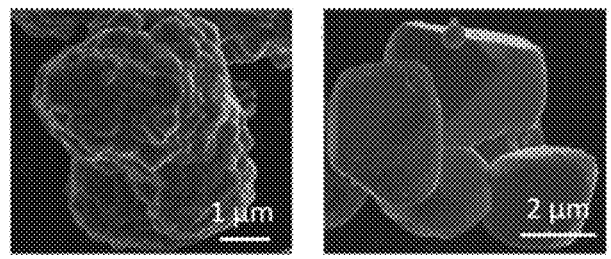
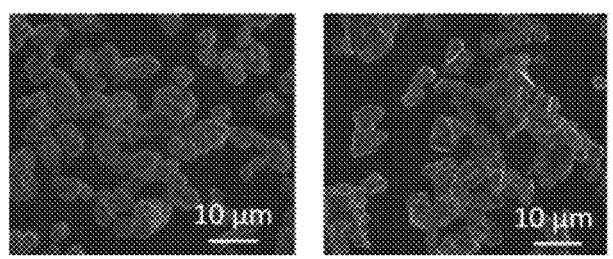
FIG. 35A    FIG. 35B

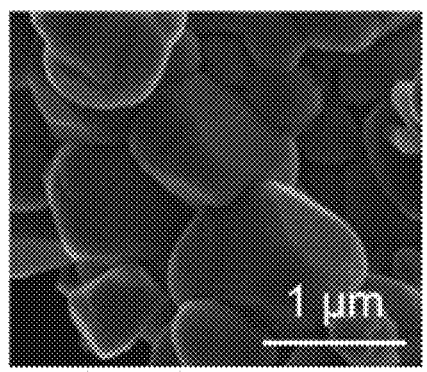
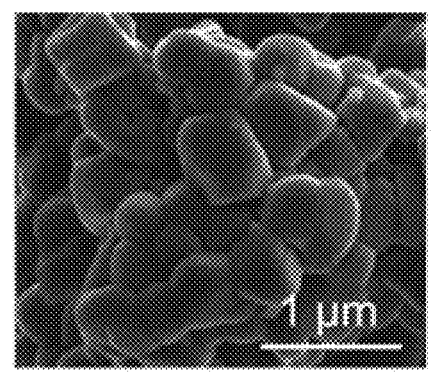
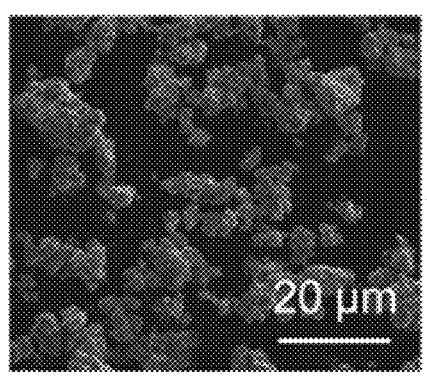
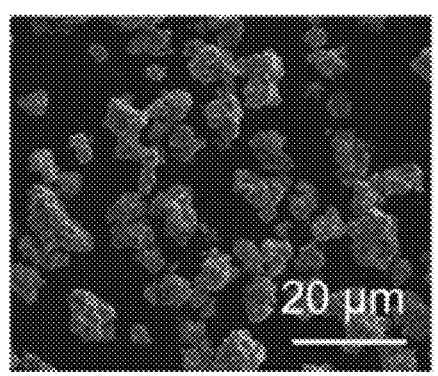
FIG. 40A          FIG. 40B
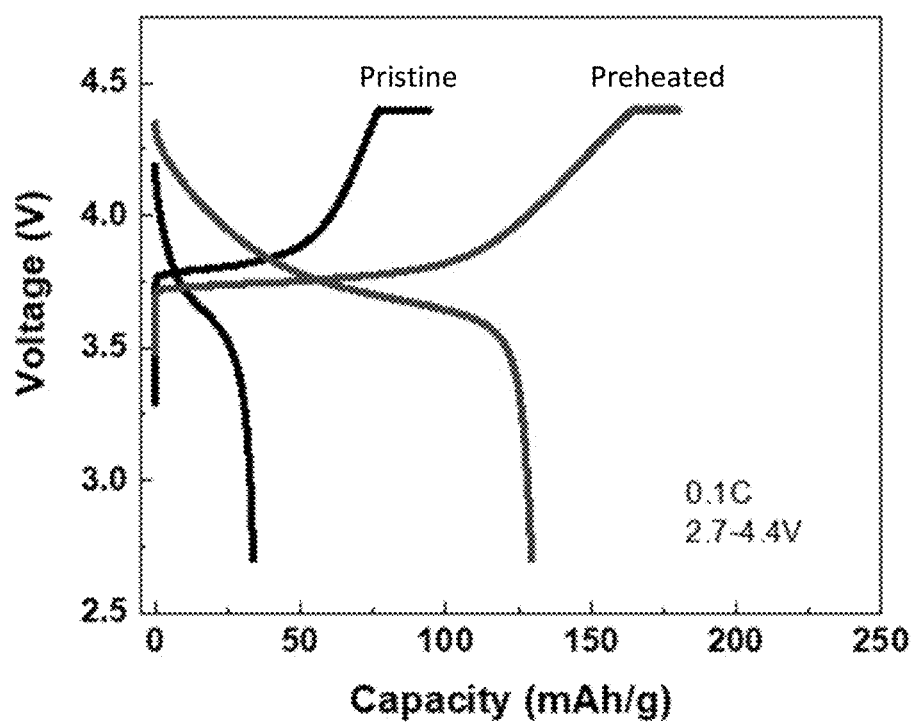
FIG. 41

FIG. 42A
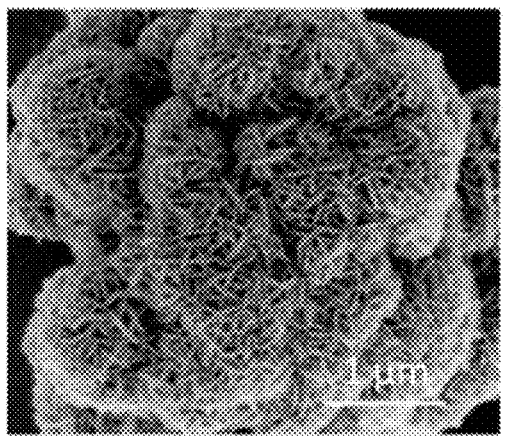
FIG. 42B
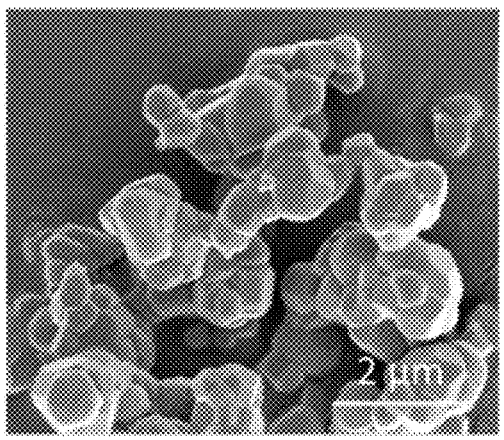
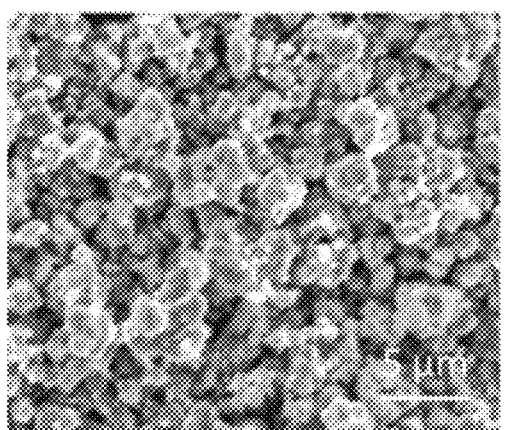
FIG. 42C
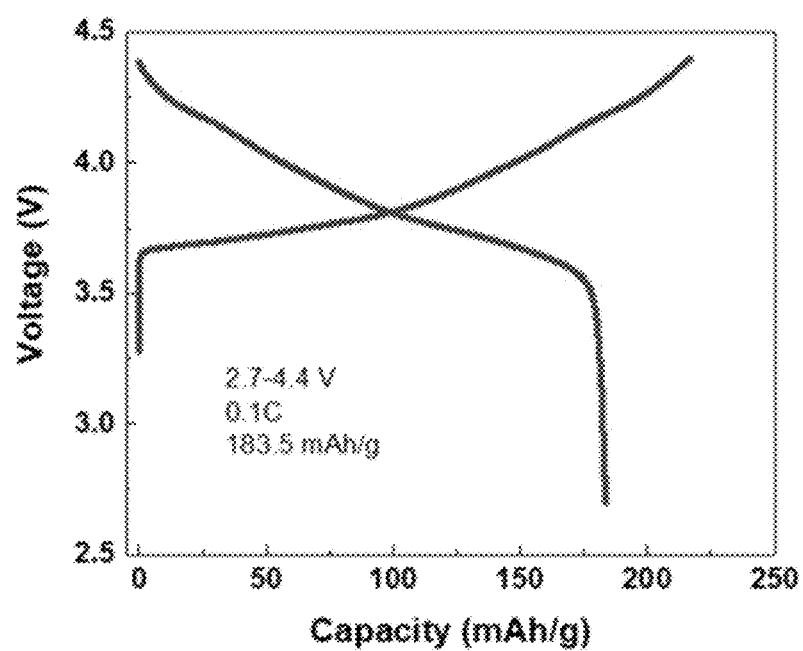
FIG. 43

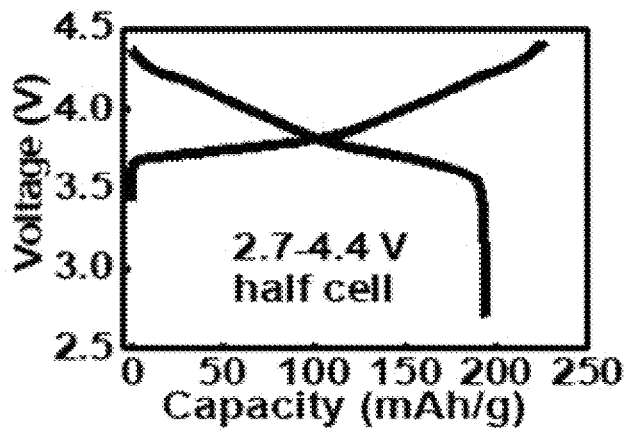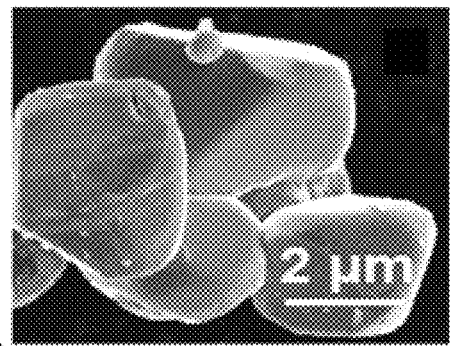
FIG. 44A          FIG. 44B
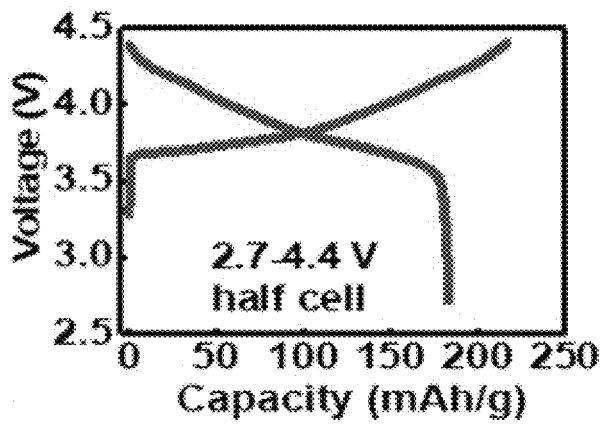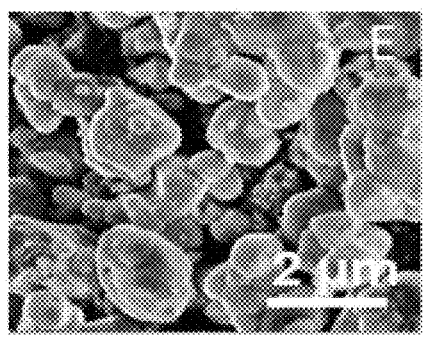
FIG. 45A          FIG. 45B
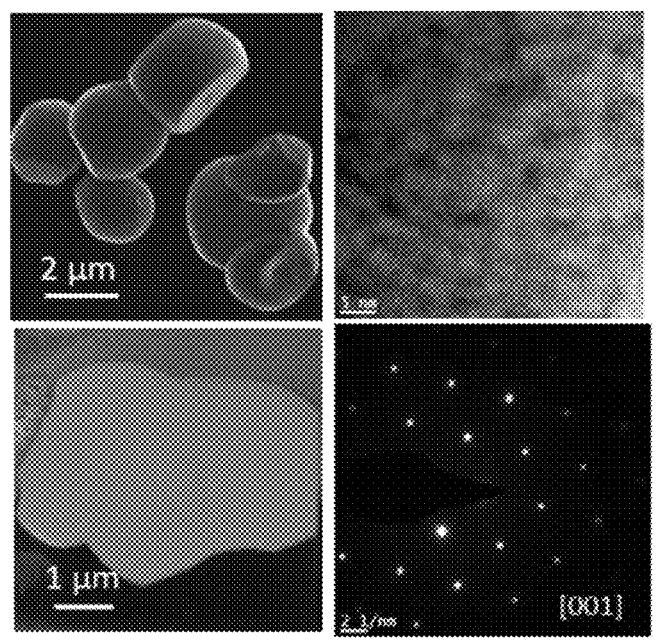
FIG. 46

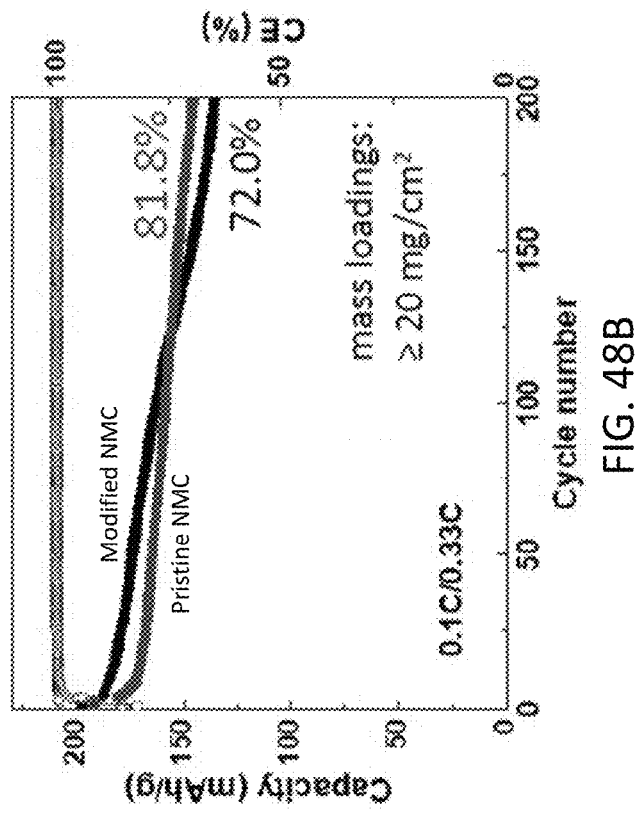
FIG. 48A
FIG. 48B
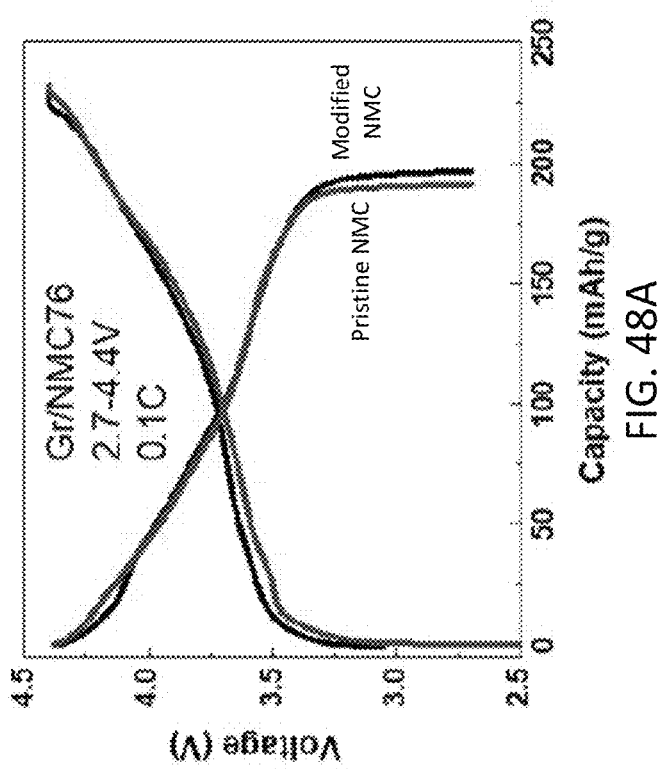
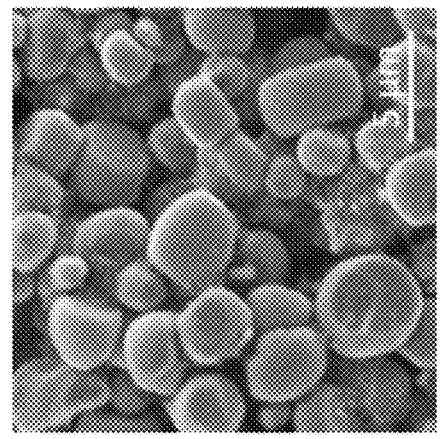
FIG. 49

COST EFFECTIVE SYNTHESIS OF OXIDE MATERIALS FOR LITHIUM ION BATTERIES

CROSS REFERENCE TO RELATED APPLICATIONS

This application claims the benefit of the earlier filing date of U.S. Provisional Application No. 63/028,146, filed May 21, 2020, and U.S. Provisional Application No. 63/020,621, filed May 6, 2020, each of which is incorporated by reference in its entirety herein.

ACKNOWLEDGMENT OF GOVERNMENT SUPPORT

This invention was made with Government support under Contract DE-AC05-76RL01830 awarded by the U.S. Department of Energy. The Government has certain rights in the invention.

FIELD

Methods of synthesizing crystalline oxide materials are disclosed, as well as cathodes including the crystalline oxide materials and lithium ion batteries including the cathodes.

SUMMARY

Embodiments of methods for synthesizing crystalline oxide materials are disclosed. Cathodes including the crystalline oxide materials and lithium ion batteries including the cathodes also are disclosed.

In some embodiments, a solid-state method includes making monocrystalline lithium nickel manganese cobalt oxide by: heating a solid hydroxide precursor comprising $Ni_xMn_yM_zCo_{1-x-y-z}(OH)_2$ at a temperature $T_{S1}$ in an oxygen-containing atmosphere for an effective period of time $t_1$ to convert the solid hydroxide precursor to a solid oxide precursor, where M represents one or more dopant metals, $x \geq 0.6$, $0.01 \leq y < 0.2$, $0 \leq z \leq 0.05$, and $x+y+z \leq 1.0$; combining the solid oxide precursor with a molar excess of a lithium compound; heating the solid oxide precursor and the lithium compound at a temperature $T_{S2}$ for an effective period of time $t_2$ to produce a first product; cooling the first product to ambient temperature; reducing a mean particle size of the first product to 0.1 μm to 10 μm; heating the first product having the reduced mean particle size at a temperature $T_{S3}$ for an effective period of time $t_3$ to produce a second product; cooling the second product to ambient temperature; reducing a mean particle size of the second product to 0.1 μm to 10 μm; and heating the second product having the reduced mean particle size at a temperature $T_{S4}$ for an effective period of time $t_4$ to produce monocrystalline lithium nickel manganese cobalt oxide having a formula $LiNi_xMn_yM_zCo_{1-x-y-z}O_2$.

In some embodiments, a molten-state method includes making monocrystalline lithium nickel manganese cobalt oxide by: heating a solid hydroxide precursor comprising $Ni_xMn_yM_zCo_{1-x-y-z}(OH)_2$ at a temperature $T_{M1}$ in an oxygen-containing atmosphere for an effective period of time $t_1$ to convert the solid hydroxide precursor to a solid oxide precursor, where M represents one or more dopant metals, $x \geq 0.6$, $0.01 \leq y < 0.2$, $0 \leq z \leq 0.05$, and $x+y+z \leq 1.0$; combining the solid oxide precursor with a molar excess of a lithium compound and a sintering agent to form a mixture; combining the solid oxide precursor with a molar excess of a lithium compound and a sintering agent to form a mixture; heating the mixture in an oxygen-containing atmosphere at a temperature $T_{M2}$ for a period of time $t_2$; increasing the temperature to a temperature $T_{M3}$, wherein the temperature $T_{M3}$ > the temperature $T_{M2}$, and heating the mixture at the temperature $T_{M3}$ for a period of time $t_3$ to produce a first product and the sintering agent; separating the sintering agent from the first product; drying the first product; and heating the first product in an oxygen-containing atmosphere at a temperature $T_{M4}$ for an effective period of time $t_4$ to produce monocrystalline lithium nickel manganese cobalt oxide having a formula $LiNi_xMn_yM_zCo_{1-x-y-z}O_2$.

In some embodiments, a flash-sintering method includes making monocrystalline lithium nickel manganese cobalt oxide by: combining a solid hydroxide precursor comprising $Ni_xMn_yM_zCo_{1-x-y-z}(OH)_2$ with a molar excess of a lithium compound to form a hydroxide mixture, where M represents one or more dopant metals, $x \geq 0.6$, $0.01 \leq y < 0.2$, $0 \leq z \leq 0.05$, and $x+y+z \leq 1.0$; heating the hydroxide mixture in an oxygen-containing atmosphere at a temperature $T_{F1}$ for an effective period of time $t_1$ to form an oxide mixture comprising oxides of nickel, manganese, cobalt, lithium, and, if present, the one or more dopant metals, or a combination thereof; increasing the temperature to a temperature $T_{F2}$ at a rate of $\geq 10°$ C./min; and heating the oxide mixture in an oxygen-containing atmosphere at the temperature $T_{F2}$ for an effective period of time $t_2$ to form monocrystalline lithium nickel manganese cobalt oxide having a formula $LiNi_xMn_yM_zCo_{1-x-y-z}O_2$.

In any of the foregoing embodiments, the solid hydroxide precursor may be prepared by: preparing a 1.5-2.5 M solution comprising metal salts in water, the metal salts comprising a nickel (II) salt, a manganese (II) salt, a cobalt (II) salt, and optionally one or more dopant metal salts, wherein a mole fraction x of the nickel (II) salt in the solution is $\geq 0.6$, a mole fraction y of the manganese (II) salt is $0.01 \leq y < 0.2$, a mole fraction z of the one or more dopant metal salts is $0 \leq z \leq 0.05$, a mole fraction of the cobalt (II) salt is $1-x-y-z$, and $x+y+z \leq 1.0$; combining the solution comprising metal salts in water with aqueous $NH_3$ and aqueous NaOH or KOH to provide a combined solution having a pH of 10.5-12 and a combined metal salt concentration of 0.1 M to 3 M; aging the combined solution for 5 hours to 48 hours at a temperature of 25° C. to 80° C. to co-precipitate hydroxides of nickel, manganese, and cobalt to provide the solid hydroxide precursor; and drying the solid hydroxide precursor, wherein the solid hydroxide precursor comprises particles having a mean particle size of 0.5 μm to 2.5 μm.

In some embodiments, a cathode comprises monocrystalline $LiNi_xMn_yM_zCo_{1-x-y-z}O_2$ wherein M represents one or more dopant metals; $x \geq 0.6$, $0.01 \leq y < 0.2$, $z \leq 0.05$, and $x+y+z \leq 1.0$; and a mean particle size of the monocrystalline $LiNi_xMn_yM_zCo_{1-x-y-z}O_2$ is 0.5 μm to 5 μm.

In some embodiments, a battery system includes the cathode, an anode, an electrolyte, and a separator positioned between the anode and the cathode.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a schematic diagram of one embodiment of a molten salt method for making monocrystalline lithium nickel manganese cobalt oxide.

FIG. 4 is a schematic diagram of one embodiment of a flash-sintering method for making monocrystalline lithium nickel manganese cobalt oxide.

FIGS. 7A-7H show characterization of single crystalline $LiNi_{0.76}M_{0.14}C_{0.1}O_2$ (NMC76).

FIG. 7A is a scanning electron microscope (SEM) image of single crystalline NMC76. FIG. 7B is a cross-section image of single crystalline NMC76. FIG. 7C is a selected area electron diffraction (SAED) pattern of single crystalline NMC76. FIG. 7D shows synchrotron X-ray diffraction and Rietveld refinement patterns. FIG. 7E is a high-resolution HAADF-STEM (high-angular dark-field scanning transmission electron microscopy) image of single crystalline NMC76 (corresponding to the square in FIG. 7B). FIG. 7F is a higher-magnification image of the corresponding boxed region in FIG. 7E. FIG. 7G shows EDS (energy-dispersive x-ray spectroscopy) elemental mapping of Ni, Mn, Co, and O. FIG. 7H is an EDS overlapped image with line scanning showing the elemental distribution intensity.

FIG. 8A is a cross-section image. FIG. 8B shows SAED results. FIG. 8C is an HRTEM image of a primary particle. FIGS. 8D and 8E are HRTEM images of surface structure. FIG. 8F is an HRTEM image of a grain boundary.

FIG. 22 shows electron energy loss spectra of O K-edge, Ni L-edge, Mn L-edge, and Co L-edge, EELS that correspond to test points 1-6 in FIG. 18B.

FIGS. 23A and 23B are SEM images of single crystalline NMC76 charged to 4.8 V (vs. $Li^+/Li$) (23A), and discharged to 2.7 V after charging to 4.8 V (23B).

FIGS. 24A-24D are STEM images of single crystalline NMC76 after 120 cycles at charged status (cycled between 2.2-4.4 V vs. graphite). FIG. 24A is a cross-sectional image of the cycled single crystal. FIG. 24B is a STEM image of the boxed region in FIG. 24A. FIGS. 24C-24D are STEM images of the lower (24C) and upper (24D) tip regions around internal micro-cracks at the charged status.

FIGS. 25A-25E are STEM images of single crystalline NMC76 after 120 cycles at discharge state (cycled between 2.2-4.4 V vs. graphite). FIG. 25A is a cross-sectional image of the cycled single crystalline NMC76. FIG. 25B is a STEM image of the cycled single crystalline NMC76. FIG. 25C is a STEM bright field image of the boxed area of FIG. 25B. FIG. 25D is a STEM-HAADF image of the boxed area. FIG. 25E is a comparison of two selected areas from FIG. 25D.

FIGS. 26A-26F show surface structure and morphology evolution by in situ AFM and mechanical analysis for single crystalline NMC76. FIG. 26A is an AFM image at OCV state. FIGS. 26B-26C are a comparison of selected surface evolution during in situ AFM testing. FIG. 26D shows COMSOL simulated shear stress along the yz direction during charge (delithiation) at scaled time of 0.1 T. FIG. 26E shows COMSOL simulated shear stress along the yz direction during discharge (lithiation) at scaled time of 0.1 T. FIG. 26F is a schematic illustration of structural evolution of single crystalline NMC76 upon cycling.

FIG. 28A shows the Li concentration gradient in the de-lithiation process. FIGS. 28B-28D show radial stress (28B), tangential stress (28C), and axial stress (28D) distribution at different times.

FIG. 29A shows the Li concentration gradient in the lithiation process. FIGS. 29B-29D show radial stress (29B), tangential stress (29C), and axial stress (29D) distribution at different times.

FIG. 31A shows the normal stress along the zz direction, which will be responsible for crack opening along (003) direction, during delithiation (charging). FIG. 31B shows the shear stress along the yz direction, which is responsible for gliding, during delithiation (charging). FIG. 31C shows the shear stress along the yz direction during lithiation (discharging). FIG. 31D shows the shear stress along the yz direction during lithiation (discharging) with anisotropic strain.

FIG. 34 is a schematic diagram showing one embodiment of a molten-salt process as disclosed herein, as well as SEM images of the hydroxide precursor, the oxide precursor, and the single crystal $LiNi_{0.76}Mn_{0.14}Co_{0.1}O_2$.

FIGS. 35A and 35B are SEM images of $Ni_{0.76}Mn_{0.14}Co_{0.1}O_2$ prepared without NaCl (35A) and with NaCl (35B).

FIGS. 40A-40B are SEM images of $LiNi_{0.76}Mn_{0.14}Co_{0.1}O_2$ prepared without preheating (40A) or with preheating (40B) prior to flash sintering.

FIG. 41 shows the charge-discharge curves of the flash-sintered $LiNi_{0.76}Mn_{0.14}Co_{0.1}O_2$ of FIGS. 40A and 40B.

FIGS. 42A-42C are SEM images of $Ni_{0.76}Mn_{0.14}Co_{0.1}(OH)_2$ (42A), oxide precursor (42B), and single crystal $LiNi_{0.76}Mn_{0.14}Co_{0.1}O_2$ (42C) prepared by a solid-state method as disclosed herein.

FIG. 43 shows charge-discharge curves of the $LiNi_{0.76}Mn_{0.14}Co_{0.1}O_2$ of FIG. 42C.

FIGS. 44A and 44B show the charge-discharge curves of a $LiNi_{0.76}Mn_{0.14}Co_{0.1}O_2$ cathode prepared by a molten-salt synthesis as disclosed herein (44A) and an SEM image of the $LiNi_{0.76}Mn_{0.14}Co_{0.1}O_2$ (44B).

FIGS. 45A and 45B show the charge-discharge curves of a $LiNi_{0.76}Mn_{0.14}Co_{0.1}O_2$ cathode prepared by a molten-salt synthesis as disclosed herein (45A) and an SEM image of the $LiNi_{0.76}Mn_{0.14}Co_{0.1}O_2$ (45B).

FIG. 46 shows SEM, HRTEM, and SAED images of single crystal $LiNi_{0.76}Mn_{0.12}Co_{0.1}Mg_{0.01}Ti_{0.01}O_2$.

FIGS. 48A and 48B compare the charge-discharge curves (48A) and cycling stability (48B) of $LiNi_{0.76}Mn_{0.14}Co_{0.1}O_2$ and $LiNi_{0.76}Mn_{0.12}Co_{0.1}Mg_{0.01}Ti_{0.01}O_2$.

FIG. 49 is an SEM image of $LiNi_{0.76}Mn_{0.12}Co_{0.1}Mg_{0.01}Ti_{0.01}O_2$ after cycling.

DETAILED DESCRIPTION

Figures 1, 2:
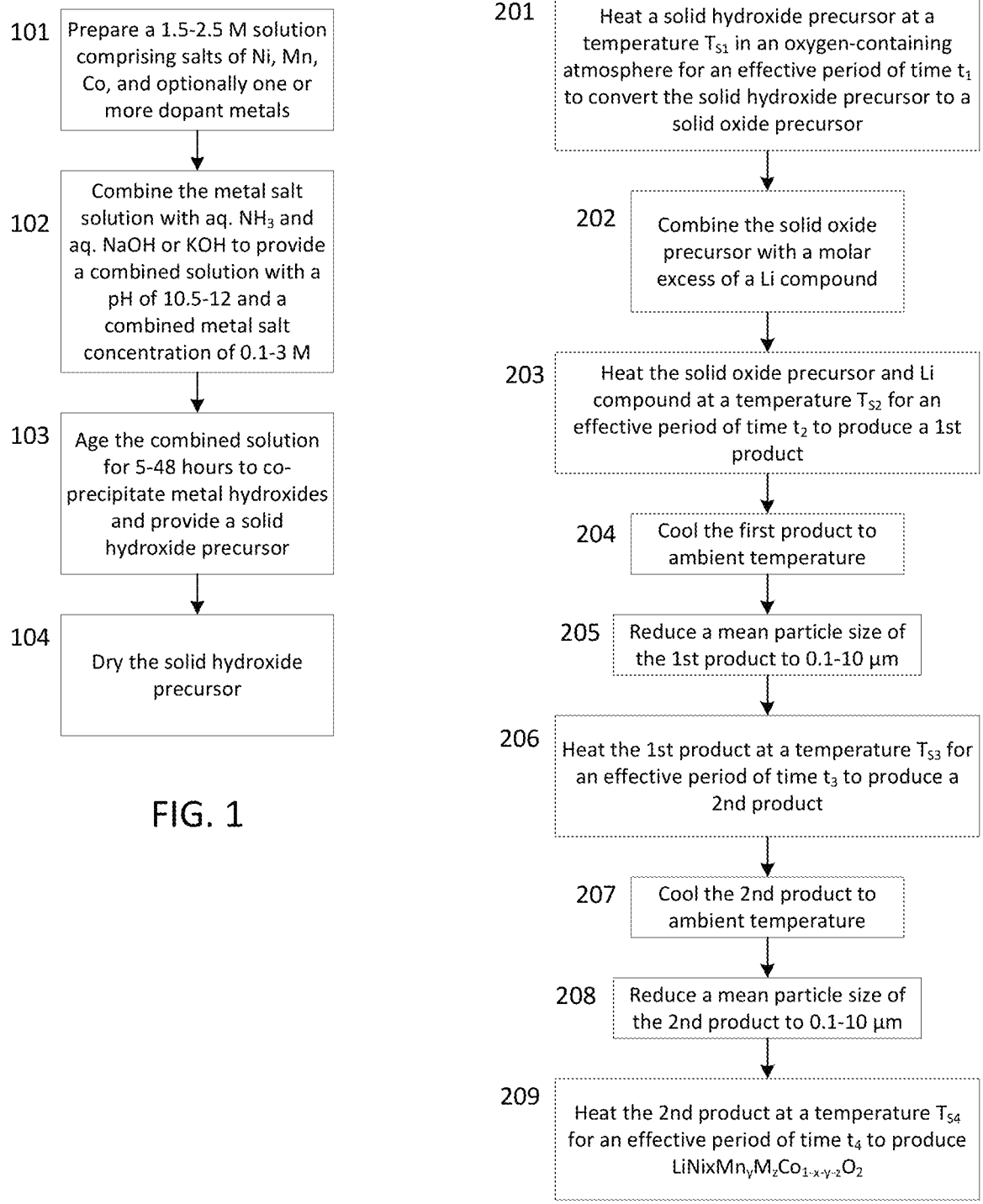
FIG. 1 is a schematic diagram of one embodiment of a method for making a nickel manganese cobalt hydroxide precursor.
FIG. 2 is a schematic diagram of one embodiment of a solid-state method for making monocrystalline lithium nickel manganese cobalt oxide.

Nickel-rich lithium-manganese-cobalt oxide (NMC) cathodes ($LiNi_xMn_yCo_{1-x-y}O_2$) are promising cathodes for next-generation lithium ion batteries. Such batteries may be used, for example, for long-range electrical vehicles. In particular, NMC cathodes where $x \geq 0.6$, the capacity is $\geq 200$ mAh/g, and the cathode is operable at high voltage (>3.8V) are desirable.

Traditionally, NMC cathodes are prepared by coprecipitation with aggregation of nano-sized primary particles into micro-sized secondary polycrystalline particles. This aggregated particle structure shortens the diffusion length of the primary particles and increases the number of pores and grain boundaries within the secondary particles, which accelerate the electrochemical reaction and improves the rate capability of NMC. Secondary micron-sized particles formed of agglomerated nano-sized primary particles are the most common morphology for conventional NMC cathodes. However, as the Ni content increases above 0.6, challenges arise. For example, such Ni-rich NMC cathodes are subject to moisture sensitivity, aggressive side reactions, and/or gas generation during cycling, raising safety concerns. These challenges are attributable to the large surface area of the secondary particles. Additionally, while creating spherical-secondary polycrystalline NMC particles reduces the surface/volume ratio, pulverization along the weak internal grain boundaries is generally observed after cycling. These cracks are induced by the non-uniform volume change of primary particles during cycling and exacerbated by the anisotropy among individual particles and grains in the polycrystalline NMC. The intergranular cracking exposes new surfaces to electrolyte for side reactions, which accelerates cell degradation. As the Ni content becomes $\geq 0.8$ in NMC, the major challenge in Ni-rich NMC cathodes becomes quite different from those in conventional NMC. For example, NMC811 is very sensitive to moisture, which creates challenges for manufacturing, storing and transporting the Ni-rich NMC. After extensive cycling gas generation by the side reactions raises safety concerns.

This disclosure concerns embodiments of methods for synthesizing single crystalline Ni-rich cathode materials.

Some embodiments of the disclosed methods may be used for synthesizing large batches, e.g., 1 kg or more, of single crystal lithium nickel manganese cobalt oxide. In some embodiments, the single crystalline Ni-rich cathodes comprise monocrystalline lithium nickel manganese cobalt oxide. In certain embodiments, single crystalline cathodes include reduced surface areas, phase boundaries, and/or more integrated crystal structures compared to polycrystalline cathodes. Advantageously some embodiments of the single crystalline Ni-rich cathodes demonstrate reduced gassing and/or particle cracking along grain boundaries during cycling. In some embodiments, the monocrystalline lithium nickel manganese cobalt oxide has a formula $LiNi_xM-n_yM_zCo_{1-x-y-z}O_2$, where M represents one or more dopant metals, $x \geq 0.6$, $0.02 \leq y < 0.2$, $0 \leq z \leq 0.05$, and $x+y+z \leq 1.0$. In certain embodiments, the formula is $Ni_xMn_yCo_{1-x-y}O_2$ where $x \geq 0.6$, $0.02 \leq y < 0.2$, and $x+y \leq 1.0$.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), Hawley's Condensed Chemical Dictionary, published by John Wiley & Sons, Inc., 2016 (ISBN 978-1-118-13515-0).

In order to facilitate review of the various embodiments of the disclosure, the following explanations of specific terms are provided:

Active salt: As used herein, the term "active salt" refers to a salt that significantly participates in electrochemical processes of electrochemical devices. In the case of batteries, it refers to charge and discharge processes contributing to the energy conversions that ultimately enable the battery to deliver/store energy. As used herein, the term "active salt" refers to a salt that constitutes at least 5% of the redox active materials participating in redox reactions during battery cycling after initial charging.

Annealing: A process in which a material is heated to a specified temperature for a specified period of time and then gradually cooled. The annealing process may remove internal strains from previous operations, and can eliminate distortions and imperfections to produce a stronger and more uniform material.

Anode: An electrode through which electric charge flows into a polarized electrical device. From an electrochemical point of view, negatively-charged anions move toward the anode and/or positively-charged cations move away from it to balance the electrons leaving via external circuitry.

Areal capacity or specific areal capacity is the capacity per unit area of the electrode (or active material) surface, and is typically expressed in united of $mAh\ cm^2$.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle.

Current density: A term referring to the amount of current per unit area. Current density is typically expressed in units of $mA/cm^2$.

Electrolyte: A substance containing free ions that behaves as an electrically conductive medium. Electrolytes generally comprise ions in a solution, but molten electrolytes and solid electrolytes also are known.

Microparticle: As used herein, the term "microparticle" refers to a particle with a size measured in microns, such as a particle with a diameter of 1-100 μm.

Nanoparticle: As used herein, the term "nanoparticle" particle that has a size measured in nanometers, such as a particle with a diameter of 1-100 nm.

Pouch cell: A pouch cell is a battery completely, or substantially completely, encased in a flexible outer covering, e.g., a heat-sealable foil, a fabric, or a polymer membrane. The term "flexible" means that the outer covering is easy to bend without breaking; accordingly, the outer covering can be wrapped around the battery components. Because a pouch cell lacks an outer hard shell, it is flexible and weighs less than conventional batteries.

Precursor: A precursor participates in a chemical reaction to form another compound. As used herein, the term "precursor" refers to metal-containing compounds used to prepare lithium nickel manganese cobalt oxide and metal-doped lithium nickel manganese cobalt oxide.

Separator: A battery separator is a porous sheet or film placed between the anode and cathode. It prevents physical contact between the anode and cathode while facilitating ionic transport.

Solid state: Composed of solid components. As defined herein, a solid-state synthesis proceeds with solid components directly without using sintering agents.

Specific capacity: A term that refers to capacity per unit of mass. Specific capacity may be expressed in units of mAh/g, and often is expressed as mAh/g carbon when referring to a carbon-based electrode in Li/air batteries.

Specific energy: A term that refers to energy per unit of mass. Specific energy is commonly expressed in units of Wh/kg or J/kg.

II. Synthesis of Crystalline Oxide Materials

Embodiments of methods for making monocrystalline lithium nickel manganese cobalt oxide (NMC) and metal-doped lithium nickel manganese cobalt oxide are disclosed. In some embodiments, the monocrystalline lithium nickel manganese cobalt oxide has a formula $LiNi_xMn_yM_zCo_{1-x-y-z}O_2$, where M represents one or more dopant metals, $x \geq 0.6$, $0.02 \leq y < 0.2$, $0 \leq z \leq 0.05$, and $x+y+z \leq 1.0$. More particularly, $0.62 \leq x+y+z \leq 1.0$. In certain embodiments, z is 0, and the monocrystalline lithium nickel manganese cobalt oxide has a formula $LiNi_xMn_yCo_{1-x-y}O_2$, where $x \geq 0.6$, $0.02 \leq y < 0.2$, and $x+y \leq 1.0$. More particularly, $0.62 \leq x+y \leq 1.0$. In some embodiments, $x=0.65-0.99$, $y=0.01-0.2$, $z=0-0.02$, and $x+y+z=0.66-1.0$. In certain embodiments, $x=0.65-0.9$, $y=0.05-0.2$, $z=0-0.02$, and $x+y+z=0.7-0.95$. In some examples, x is 0.7-0.9, such as 0.75-0.9 or 0.8-0.9; y is 0.05-0.15, such as 0.05-0.14 or 0.05-0.1; z is 0-0.02; and $x+y+z$ is 0.8-0.98, such as 0.8-0.95.

When the monocrystalline lithium nickel manganese cobalt oxide is doped, the general formula is $LiNi_xMn_yM_zCo_{1-x-y-z}O_2$, where M represents one or more dopant metals. In some embodiments, M represents two or more dopant metals. Thus, $M_z$ may refer collectively to $M1_{z1} + M2_{z2} + M3_{z3} \ldots + Mp_{zp}$, where M1, M2, M3, etc. represent the dopant metals, and $z1+z2+z3 \ldots +zp=z$. Suitable dopant metals include, but are not limited to, Mg, Ti, Al, Zn, Fe (e.g., $Fe^{3+}$), Zr, Sn (e.g., $Sn^{4+}$), Sc, V, Cr, Fe, Cu, Ga, Y, Nb, Mo, Ru, Ta, W, Ir, and combinations thereof.

The lithium nickel manganese cobalt oxide crystals prepared by embodiments of the disclosed methods are microparticles. In some embodiments, the single crystals have a mean particle size of 1-5 μm, such as 1-4 μm or 1-3 μm. This feature is in stark contrast to traditional NMC comprising primary nanoparticles particles aggregated into secondary polycrystalline microparticles.

A. Hydroxide Precursor Synthesis

In any the foregoing or following embodiments, the synthesis may begin with solid precursors comprising hydroxides of nickel, manganese, and cobalt. In some embodiments, the synthesis may further include solid hydroxide precursors of one or more dopant metals, e.g., hydroxides of Mg, Ti, Al, Zn, Fe, Zr, Sn, or any combination thereof. In some embodiments, the hydroxide precursor comprises $Ni_xMn_yM_zCo_{1-x-y-z}(OH)_2$, where M represents one or more dopant metals, $x \geq 0.6$, $0.01 \leq y < 0.2$, $z \leq 0.05$, and $x+y+z \leq 1.0$. More particularly, $0.62 \leq x+y+z \leq 1.0$. In some embodiments, $x=0.65-0.99$, $y=0.01-0.2$, $z=0-0.02$, and $x+y+z=0.66-1.0$. In an independent embodiment, $x=0.65-0.95$, $y=0.01-0.2$, $z=0-0.02$, and $x+y+z=0.66-0.98$. In another independent embodiment, $x=0.65-0.9$, $y=0.05-0.2$, $z=0-0.02$, and $x+y+z=0.7-0.95$. In some examples, x is 0.7-0.9, such as 0.75-0.9 or 0.8-0.9; y is 0.05-0.15, such as 0.05-0.14 or 0.05-0.1; z is 0-0.02; and $x+y+z$ is 0.8-0.98, such as 0.8-0.95.

In any the foregoing or following embodiments, the method of synthesizing monocrystalline lithium nickel manganese cobalt oxide (including doped variants), includes synthesizing the hydroxide precursors. In some embodiments (FIG. 1), the hydroxide precursors are synthesized by preparing a 1.5 M to 2.5 M solution comprising metal salts in water (101), the metal salts comprising a nickel salt, a manganese salt, a cobalt salt, and optionally one or more dopant metal salts; combining the solution comprising metal salts in water with aqueous $NH_3$ and aqueous NaOH or KOH to provide a combined solution having a pH of 10.5-12 (102), aging the solution for 5-48 hours to co-precipitate hydroxides of nickel, manganese; and cobalt to provide the solid hydroxide precursor (103); and drying the solid hydroxide precursor (104). In any of the foregoing or following embodiments, the metal salts may include a nickel (II) salt, a manganese (II) salt, and a cobalt (II) salt (if $x+y+z<1$).

The solution comprising metal salts in water has a concentration of 1.5-2.5 M, wherein 1.5 M to 2.5 M is a total concentration of all salts in the water. In some embodiments, the concentration is 1.7 M to 2.3 M, 1.8 M to 2.2 M, or 1.9 M to 2.1 M. In any of the foregoing or following embodiments, the salts may be sulfates, nitrates, chlorides, acetates, or a combination thereof. In one embodiment, the salts are sulfates. In another embodiment, the salts are nitrates. The concentration of each metal salt is selected based on a desired amount of the metal in the final product. For example, when a hydroxide precursor comprising $Ni_{0.76}Mn_{0.14}Co_{0.1}(OH)_2$ is prepared, nickel, manganese, and cobalt salts are combined in a Ni:Mn:Co molar ratio of 0.76:0.14:0.1. Similarly, if a hydroxide precursor comprising $Ni_{0.76}Mn_{0.12}Co_{0.1}Mg_{0.01}Ti_{0.01}(OH)_2$ is prepared, nickel, manganese, cobalt, magnesium, and titanium salts are combined in a Ni:Mn:Co:Mg:Ti molar ratio of 0.76:0.12:0.1:0.01:0.01.

In any of the foregoing or following embodiments, combining the solution comprising metal salts in water with aqueous $NH_3$ and aqueous NaOH or KOH to provide a pH of 10.5-12 may comprise preparing an aqueous $NH_3$ solution comprising 0.5 wt % to 1 wt % or 0.2-0.5 M $NH_3$ in water; preheating the aqueous $NH_3$ solution to 25° C. to 80° C.; adding the metal salt solution, additional concentrated aqueous ammonia (e.g., 25 wt % to 35 wt % or 13 M to 18 M $NH_3$—$H_2O$), and aqueous NaOH or KOH to provide a pH of 10.5-12 and a final metal salt concentration of 0.1 M to 3 M. In some embodiments, the aqueous $NH_3$ solution is preheated to 30° C. to 75° C., such as 35° C. to 70° C. 1-40° C. to 60° C., or 45° C. to 55° C. In some embodiments, the final metal salt concentration is 0.1 M to 2 M, 0.1 M to 1 M, or 0.2 M to 0.8 M. In some embodiments, the metal salt solution and additional concentrated ammonia are added at the same time at a volumetric ratio 2-4 parts metal salt solution to one part concentrated ammonia solution. The aqueous $NH_3$ solution may be stirred continuously as the metal salt solution and concentrated ammonia solution are added. In certain examples, the metal salt solution is added at a rate of 3 mL/minute, and the concentrated ammonia is added at a rate of 1 mL/minute. Sufficient aqueous NaOH or KOH is added to provide the combined solution with a pH of 10.5-12, such as a pH of 11-11.5. In some embodiments, the aqueous NaOH or KOH has a concentration of 6 M to 10 M. In any of the foregoing or following embodiments, the combined solution may be aged for 5-48 hours at a temperature of 25° C. to 80° C. to co-precipitate hydroxides of the metals (Ni, Mn, Co, and any dopant metals), thereby producing the hydroxide precursor. In some embodiments, the combined solution is stirred continuously while aging. In certain embodiments, the combined solution is aged for 10 hours to 48 hours, 15 hours to 45 hours, 20 hours to 40 hours, or 25 hours to 35 hours. In some embodiments, the temperature is 30° C. to 75° C., such as 35° C. to 70° C. 1-40° C. to 60° C., or 45° C. to 55° C. In some examples, the combined solution was aged for 30 hours at 50° C. with continuous stirring.

In any of the foregoing or following embodiments, the hydroxide precursor may be collected by any suitable method. In some embodiments, the aged combined solution is filtered to collect the co-precipitated hydroxides. The collected hydroxide precursor may be washed, e.g., with deionized water, to remove impurities, such as ammonia, residual NaOH or KOH, and/or soluble sulfate and/or nitrate salts. The hydroxide precursor is then dried. In some embodiments, the hydroxide precursor is dried at a temperature of 80° C. to 120° C., such as 90° C. to 110° C., for a period of 5 hours to 20 hours, such as 10 hours to 15 hours.

Advantageously, the low concentration, 1.5 M to 2.5 M, of the metal salt solution facilitates formation of small hydroxide precursor particles. In any of the foregoing embodiments, embodiments, the hydroxide precursor particles may have a mean size of 0.5 µm to 10 µm. In some embodiments, the hydroxide precursor particles have a mean size of 0.5 µm to 7.5 µm, 0.5 µm to 5 µm, or 0.5 µm to 2.5 µm.

B. Solid-State Method

In some embodiments, monocrystalline lithium nickel manganese cobalt oxide (or a doped variant thereof) is synthesized by a solid-state method. With reference to FIG. 2, in some embodiments, the solid-state method comprises heating a solid hydroxide precursor comprising $Ni_xMn_yM_zCo_{1-x-y-z}(OH)_2$ at a temperature $T_{S1}$ in an oxygen-containing atmosphere for an effective period of time $t_1$ to convert the solid hydroxide precursor to a solid oxide precursor (201); combining the solid oxide precursor with a molar excess of a lithium compound (202); heating the solid oxide precursor and the lithium compound at a temperature $T_{S2}$ for an effective period of time $t_2$ to produce a first product (203); cooling the first product to ambient temperature (204); reducing a mean particle size of the first product to 0.1 µm to 10 µm (205); heating the first product having the reduced mean particle size at a temperature $T_{S3}$ for an effective period of time $t_3$ to produce a second product (206); cooling the second product to ambient temperature (207); reducing a mean particle size of the second product to 0.1 µm to 10 µm (208); and heating the second product having the reduced mean particle size at a temperature $T_{S4}$ for an effective period of time $t_4$ to produce monocrystalline lithium nickel manganese cobalt oxide having a formula $LiNi_xMn_yM_zCo_{1-x-y-z}O_2$ (209). In the foregoing formulas, M represents one or more dopant metals, $x \geq 0.6$, $0.01 \leq y < 0.2$, $z \leq 0.05$, and $x+y+z \leq 1.0$. More particularly, $0.62 \leq x+y+z \leq 1.0$. In some embodiments, $x=0.65$-$0.99$, $y=0.01$-$0.2$, $z=0$-$0.02$, and $x+y+z=0.7$-$1.0$. In an independent embodiment, $x=0.65$-$0.95$, $y=0.01$-$0.2$, $z=0$-$0.02$, and $x+y+z=0.7$-$0.98$. In another independent embodiment, $x=0.65$-$0.9$, $y=0.05$-$0.2$, $z=0$-$0.02$, and $x+y+z=0.7$-$0.95$. In some examples, $x=0.7$-$0.9$, $y=0.05$-$0.15$, $z=0$-$0.02$, and $x+y+z=0.7$-$0.95$. In one embodiment, x is 0.76, y is 0.14, and z is 0. In an independent embodiment, x is 0.76, y is 0.12, and z is 0.02. In another independent embodiment, x is 0.8, y is 0.1, and z is 0. In still another independent embodiment, x is 0.9, y is 0.05, and z is 0.

In any of the foregoing or following embodiments, the temperature $T_{S1}$ may be 400° C. to 1000° C. and/or the effective period of time $t_1$ may be 1 hour to 30 hours. In some embodiments, the temperature $T_{S1}$ is 500° C. to 1000° C., 600° C. to 1000° C., 800° C. to 1000° C., or 850° C. to 950° C. In certain examples, the temperature $T_{S1}$ was 900° C. Advantageously, the temperature $T_{S1}$ is below a melting point of the hydroxide precursor. In any of the foregoing or following embodiments, the temperature may be increased to the temperature $T_{S1}$ at a ramping rate of 1° C./minute to 300° C./minute, such as a ramping rate of 1° C./minute to 200° C./minute, 1° C./minute to 100° C./minute, 1° C./minute to 50° C./minute, 5° C./minute to 25° C./minute, or 5° C./minute to 15° C./minute. In one example, the ramping rate was 10° C./minute. The temperature $T_{S1}$ is then maintained for the effective period of time $t_1$. In some embodiments, the effective period of time $t_1$ is 5 hours to 25 hours, 10 hours to 20 hours, or 12 hours to 18 hours. In certain examples, the effective period of time $t_1$ was 15 hours. In any of the foregoing or following embodiments, the oxygen-containing atmosphere may be pure oxygen or air. As used herein, "pure oxygen" means at least 95 mol % oxygen. In any of the foregoing or following embodiments, at a majority or all of the solid hydroxide precursor may be converted to the solid oxide precursor. In some embodiments, 90 wt % to 100 wt %, such as 95 wt % to 100 wt %, 97 wt % to 100 wt %, 98 wt % to 100 wt %, or 99 wt % to 100 wt % of the solid hydroxide precursor is converted to the solid oxide precursor. In certain embodiments, all of the solid hydroxide precursor is converted to the solid oxide precursor.

The solid oxide precursor is combined with a molar excess of a Li compound. In any of the foregoing or following embodiments, the Li compound may comprise lithium hydroxide, lithium carbonate, lithium nitrate, lithium oxide, lithium peroxide, lithium acetate, lithium oxalate or any combination thereof. In some embodiments, the Li compound comprises lithium hydroxide. The LiOH may be anhydrous or a hydrated salt, e.g., $LiOH.H_2O$. In any of the foregoing or following embodiments, the Li compound may have a mean particle size of 10 µm to 100 µm. In any of the foregoing or following embodiments, the solid oxide precursor and the lithium compound may be combined in a Li:solid oxide precursor molar ratio of 0.8:1 to 3:1, such as a molar ratio of 0.9:1 to 3:1, 1:05:1 to 2:1, 1:05:1 to 1.5:1, 1.1:1 to 1.4:1 or 1.1:1 to 1.2:1. The mixture of solid oxide precursor and the Li compound is subjected to a series of three annealing processes to form a first product, a second product, and the $LiNi_xMn_yM_zCo_{1-x-y-z}O_2$.

The mixture of solid oxide precursor and the Li compound is heated at a temperature $T_{S2}$ for an effective period of time $t_2$ to produce a first product. In any of the foregoing or following embodiments, the temperature $T_{S2}$ may be 400° C. to 1000° C. and/or the effective period of time $t_2$ may be 1 hour to 30 hours. In some embodiments, the temperature $T_{S2}$ is 400° C. to 800° C., 400° C. to 600° C., or 450° C. to 550° C. Advantageously the temperature $T_{S2}$ is less than a melting or vaporization temperature of the oxide precursor and lithium compound. In certain examples, the temperature $T_{S2}$ was 500° C. In some embodiments, the effective period of time h is 1 hour to 5 hours, 1 hour to 20 hours, 1 hours to 10 hours, or 2 hours to 6 hours. In certain examples, the effective period of time $t_2$ was 5 hours.

The first product is cooled to ambient temperature and a mean particle size of the first product is reduced to 0.1 μm to 10 μm. In some embodiments, the mean particle size is reduced to 0.2 μm to 10 μm, 0.5 μm to 10 μm, or 1 μm to 10 μm. In any of the foregoing or following embodiments, cooling the first product to ambient temperature may comprise cooling the first product to 20° C. to 30° C., such as to 20° C. to 25° C. In any of the foregoing or following embodiments, reducing a mean particle size of the first product to 0.1 μm to 10 μm may comprise grinding or milling the first product to achieve the desired particle size.

The first product having the reduced mean particle size is heated at a temperature $T_{S3}$ for an effective period of time $t_3$ to produce a second product. In any of the foregoing or following embodiments, the temperature $T_{S3}$ may be 600° C. to 1000° C. and/or the effective period of time $t_3$ may be 1-30 hours. In some embodiments, the temperature $T_{S3}$ is 700° C. to 1000° C., 700° C. to 900° C., or 750° C. to 850° C. In certain examples, the temperature $T_{S3}$ was 800° C. In some embodiments, the effective period of time $t_3$ is 1-25 hours, 1-20 hours, 1-10 hours, or 2-6 hours. In certain examples, the effective period of time $t_3$ was 5 hours.

The second product is cooled to ambient temperature and a mean particle size of the second product is reduced to 0.1 μm to 10 μm. In some embodiments, the mean particle size is reduced to 0.2 μm to 10 μm, 0.5 μm to 10 μm, or 1 μm to 10 μm. In any of the foregoing or following embodiments, cooling the second product to ambient temperature may comprise cooling the second product to 20° C. to 30° C., such as to 20° C. to 25° C. In any of the foregoing or following embodiments, reducing a mean particle size of the second product to 0.1 μm to 10 μm may comprise grinding or milling the second product to achieve the desired particle size.

The second product having the reduced mean particle size is heated at a temperature $T_{S4}$ for an effective period of time $t_4$ to produce monocrystalline lithium nickel manganese cobalt oxide having a formula $LiNi_xMn_yM_zCo_{1-x-y-z}O_2$. In any of the foregoing or following embodiments, the temperature $T_{S4}$ may be 500° C. to 1000° C. and/or the effective period of time $t_4$ may be 1-30 hours. In some embodiments, the temperature $T_{S4}$ is 600° C. to 1000° C., 700° C. to 1000° C., 700° C. to 900° C., or 750° C. to 850° C. In certain examples, the temperature $T_{S4}$ was 800° C. In some embodiments, the effective period of time $t_4$ is 1 hour to 25 hours, 1 hour to 20 hours, 1 hour to 10 hours, or 2 hours to 6 hours. In certain examples, the effective period of time $t_4$ was 5 hours.

In any of the foregoing or following embodiments, the solid hydroxide precursor may be prepared as discussed above. In any of the foregoing or following embodiments, the solid hydroxide precursor may have a mean particle size of 0.5-10 μm. In some embodiments, the hydroxide precursor particles have a mean size of 0.5 μm to 7.5 μm, 0.5 μm to 5 μm, or 0.5 μm to 2.5 μm. In any of the foregoing or following embodiments, monocrystalline lithium nickel manganese cobalt oxide may have a mean particle size of 0.5 μm to 5 μm. In some embodiments, the solid hydroxide precursor has a mean particle size of 1 μm to 2 μm. In certain embodiments, the monocrystalline lithium nickel manganese cobalt oxide has a mean particle size of 1 μm to 5 μm, or 1 μm to 3 μm. In any of the foregoing or following embodiments, the dopant metal(s) M may comprise Mg, Ti, Al, Zn, Fe, Zr, Sn, Sc, V, Cr, Fe, Cu, Ga, Y, Nb, Mo, Ru, Ta, W, Ir, or any combination thereof.

C. Molten-Salt Method

In some embodiments, monocrystalline lithium nickel manganese cobalt oxide (or a doped variant thereof) is synthesized by a molten-salt method. With reference to FIG. 3, in some embodiments, the molten-salt method comprises heating a solid hydroxide precursor comprising $Ni_xMn_yM_zCo_{1-x-y-z}(OH)_2$ at a temperature $T_{M1}$ in an oxygen-containing atmosphere for an effective period of time $t_1$ to convert the solid hydroxide precursor to a solid oxide precursor (301); combining the solid oxide precursor with a molar excess of a lithium compound and a sintering agent to form a mixture (302); heating the mixture in an oxygen-containing atmosphere at a temperature $T_{M2}$ for a period of time $t_2$ (303); increasing the temperature to a temperature $T_{M3}$, where $T_{M3}>T_{M2}$, and heating the mixture at the temperature $T_{M3}$ for a period of time $t_3$ to produce a first product and the sintering agent (304); cooling the first product and the sintering agent to ambient temperature (305); separating the sintering agent from the first product (306); drying the first product (307); and heating the first product in an oxygen-containing atmosphere at a temperature $T_{M4}$ for an effective period of time $t_4$ to restore any lost oxygen in the lattices and produce monocrystalline lithium nickel manganese cobalt oxide having a formula $LiNi_xMn_yM_zCo_{1-x-y-z}O_2$ (308). In the foregoing formulas, M represents one or more dopant metals, x≥0.6, 0.01≤y<0.2, z≤0.05, and x+y+z≤1.0. More particularly, 0.62≤x+y+z≤1.0. In some embodiments, x=0.65-0.99, y=0.01-0.2, z=0-0.02, and x+y+z=0.66-1.0. In an independent embodiment, x=0.65-0.95, y=0.01-0.2, z=0-0.02, and x+y+z=0.7-0.98. In another independent embodiment, x=0.65-0.9, y=0.05-0.2, z=0-0.02, and x+y+z=0.7-0.95. In some examples, x is 0.7-0.9, such as 0.75-0.9 or 0.8-0.9; y is 0.05-0.15, such as 0.05-0.14 or 0.05-0.1; z is 0-0.02; and x+y+z is 0.8-0.98, such as 0.8-0.95.

In any of the foregoing or following embodiments, the temperature $T_{M1}$ may be 400° C. to 1000° C. and/or the effective period of time $t_1$ may be 1 hour to 30 hours. In some embodiments, the temperature $T_{M1}$ is 500° C. to 1000° C., 600° C. to 1000° C., 800° C. to 1000° C., or 850° C. to 950° C. In certain examples, the temperature $T_{M1}$ was 800° C., 900° C., or 1000° C. Advantageously, the temperature $T_{M1}$ is below a melting point of the hydroxide precursor. In any of the foregoing or following embodiments, the temperature may be increased to the temperature $T_{M1}$ at a ramping rate of 1° C./minute to 300° C./minute, such as a ramping rate of 1° C./minute to 200° C./minute, 1° C./minute 100° C./minute, 1° C./minute 50° C./minute, 1° C./minute 25° C./minute, or 1° C./minute 15° C./minute. In one example, the ramping rate was 5° C./minute. The temperature $T_{M1}$ is then maintained for the effective period of time $t_1$. In some embodiments, the effective period of time $t_1$ is 5 hours to 25 hours, 10 hours to 20 hours, or 12 hours to 18 hours. In certain examples, the effective period of time $t_1$ was 15 hours. In any of the foregoing or following embodiments, the oxygen-containing atmosphere may be air or pure oxygen. In some embodiments, the oxygen-containing atmosphere is air. In any of the foregoing or following embodiments, at a majority or all of the solid hydroxide precursor may be converted to the solid oxide precursor. In some embodiments, 90 wt % to 100 wt %, such as 95 wt % to 100 wt %, 97 wt % to 100 wt %, 98 wt % to 100 wt %, or 99 wt % to 100 wt % of the solid hydroxide precursor is converted to the solid oxide precursor. In certain embodiments, all of the solid hydroxide precursor is converted to the solid oxide precursor.

The solid oxide precursor is combined with a molar excess of a Li compound and a sintering agent to form a mixture. In any of the foregoing or following embodiments, the Li compound may comprise lithium hydroxide, lithium carbonate, lithium nitrate, lithium oxide, lithium peroxide, or any combination thereof. In any of the foregoing or following embodiments, the Li compound may have a mean particle size of 10 μm to 100 μm. In some embodiments, the Li compound comprises lithium oxide ($Li_2O$). In any of the foregoing or following embodiments, the solid oxide precursor and the lithium compound may be combined in a Li:solid oxide precursor molar ratio of 1:1 to 5:1, such as a molar ratio of 1:1 to 4:1, 1:1 to 3:1, 1:1 to 2:1, 1:1 to 1.5:1, 1.1:1 to 1.4:1, or 1.1:1 to 1.2:1. In any of the foregoing or following embodiments, the sintering agent may be NaCl or KCl. In some embodiments, the sintering agent is NaCl. NaCl may reduce the sintering temperature and/or time. In any of the foregoing or following embodiments, a weight ratio of the sintering agent to the combined solid oxide precursor and lithium compound may be 0.2:1 to 1:0.2, such as weight ratio of 0.3:1 to 1:0.3, 0.4:1 to 1:0.4, 0.5:1 to 1:0.5, 0.6:1 to 1:0.6, 0.7:1 to 1:0.7, 0.8:1 to 1:0.8, 0.85:1 to 1:0.85, or 0.9:1 to 1:0.9. In certain examples, the weight ratio was 1:1.

The mixture is heated in an oxygen-containing atmosphere at a temperature $T_{M2}$ for a period of time $t_2$. In any of the foregoing or following embodiments, the temperature may be increased to the temperature $T_{M2}$ at a ramping rate of 1° C./minute to 300° C./minute, such as a ramping rate of 1° C./minute to 200° C./minute, 1° C./minute to 100° C./minute, 1° C./minute to 50° C./minute, 5° C./minute to 25° C./minute, or 5° C./minute to 15° C./minute. In one example, the ramping rate was 10° C./minute. The temperature $T_{M2}$ is then maintained for the effective period of time $t_2$. In any of the foregoing or following embodiments, the temperature $T_{M2}$ may be 400-1000° C. and/or the effective period of time $t_2$ may be 1-30 hours. In some embodiments, the temperature $T_{M2}$ is 500° C. to 1000° C., 600° C. to 1000° C., 700° C. to 900° C., or 750° C. to 850° C. In certain examples, the temperature $T_{M2}$ was 800° C. In some embodiments, the effective period of time $t_2$ is 1 hour to 25 hours, 5 hours to 20 hours, or 5 hours to 15 hours. In certain examples, the effective period of time $t_2$ was 10 hours. In any of the foregoing or following embodiments, the oxygen-containing atmosphere may be air or pure oxygen. In some embodiments, the oxygen-containing atmosphere is pure oxygen.

The mixture then is heated at a temperature $T_{M3}$ for a period of time $t_3$ to produce a first product and the sintering agent. The temperature $T_{M3}$ is greater than the temperature $T_{M2}$. In any of the foregoing or following embodiments, the temperature $T_{M3}$ may be 600° C. to 1000° C. and/or the effective period of time $t_3$ may be 1-30 hours. In some embodiments, the temperature $T_{M3}$ is 700° C. to 1000° C., 800° C. to 1000° C., or 850° C. to 950° C. In certain examples, the temperature $T_{M3}$ was 900° C. In some embodiments, the effective period of time $t_3$ is 1 hour to 25 hours, 1 hour to 20 hours, 1 hour to 10 hours, or 2 hours to 6 hours. In certain examples, the effective period of time $t_3$ was 5 hours.

The first product and sintering agent are cooled to ambient temperature. In any of the foregoing or following embodiments, cooling the first product to ambient temperature may comprise cooling the first product to 20° C. to 30° C., such as to 20° C. to 25° C. In some embodiments, a mean particle size of the first product is reduced to 0.1 μm to 10 μm. In any of the foregoing or following embodiments, reducing a mean particle size of the first product to 0.1 μm to 10 μm may comprise grinding the first product to achieve the desired particle size.

The sintering agent is separated from the first product. In any of the foregoing or following embodiments, separating the sintering agent may comprise washing the sintering agent and the first product with a solvent in which the sintering agent is soluble and the first product is insoluble or substantially insoluble (e.g., less than 5 wt % of the first product is soluble in the solvent). In some embodiments, the solvent is water. In certain embodiments, washing the sintering agent and first product comprises stirring the ground sintering agent and first product in water and/or ultrasonicating the ground sintering agent and first product in the water. The resulting solution may be filtered to collect the first product. The first product then is dried to remove water. In any of the foregoing or following embodiments, drying the first product may comprise heating the first product at a temperature effective to evaporate the solvent for a time effective to remove the solvent, e.g., to remove at least 80 wt %, at least 90%, at least 95 wt %, at least 97 wt %, or at least 99 wt % of the solvent. In some embodiments, the solvent is water and the temperature is 60° C. to 95° C., such as 70° C. to 90° C. In certain embodiments, the first product may be heated under a reduced pressure to facilitate solvent removal. In any of the foregoing or following embodiments, the time may be from 1-10 hours, such as from 1-5 hours or from 1-3 hours. In some examples, the first product is heated under vacuum at 80° C. for 2 hours.

The first product is heated in an oxygen-containing atmosphere at a temperature $T_{M4}$ for an effective period of time $t_4$ and produce monocrystalline lithium nickel manganese cobalt oxide having a formula $LiNi_xMn_yM_zCo_{1-x-y-z}O_2$. In any of the foregoing or following embodiments, the temperature $T_{M4}$ may be 500° C. to 1000° C. and/or the effective period of time $t_4$ may be 1 hour to 30 hours. In some embodiments, the temperature $T_{M4}$ is 500° C. to 800° C., 500° C. to 700° C., or 550° C. to 650° C. In certain examples, the temperature $T_{M4}$ was 580° C. In some embodiments, the effective period of time $t_4$ is 1 hour to 25 hours, 1 hour to 20 hours, 1 hour to 10 hours, or 2 hours to 6 hours. In certain examples, the effective period of time $t_4$ was 4 hours. In any of the foregoing or following embodiments, the oxygen-containing atmosphere may be air or pure oxygen. In some embodiments, the oxygen-containing atmosphere is pure oxygen.

In any of the foregoing or following embodiments, the hydroxide precursor may be prepared as discussed above. In any of the foregoing or following embodiments, the solid hydroxide precursor may have a mean particle size of 0.5 μm to 10 μm. In some embodiments, the hydroxide precursor particles have a mean size of 0.5 μm to 7.5 μm, 0.5 μm to 5 μm, or 0.5 μm to 2.5 μm. In any of the foregoing or following embodiments, monocrystalline lithium nickel manganese cobalt oxide may have a mean particle size of 0.5 μm to 5 μm. In some embodiments, the solid hydroxide precursor has a mean particle size of 1 μm to 2 μm. In certain embodiments, the monocrystalline lithium nickel manganese cobalt oxide has a mean particle size of 1 μm to 5 μm, or 1 μm to 3 μm. In any of the foregoing or following embodiments, the dopant metal(s) M may comprise Mg, Ti, Al, Zn, Fe, Zr, Sn, Sc, V, Cr, Fe, Cu, Ga, Y, Nb, Mo, Ru, Ta, W, Ir, or any combination thereof.

D. Flash-Sintering Method

In some embodiments, monocrystalline lithium nickel manganese cobalt oxide (or a doped variant thereof) is synthesized by a flash-sintering method. With reference to FIG. 4, in some embodiments, the flash-sintering method comprises combining a solid hydroxide precursor comprising $Ni_xMn_yM_zCo_{1-x-y-z}(OH)_2$ with a molar excess of a lithium compound to form a hydroxide mixture (401); heating the hydroxide mixture in an oxygen-containing atmosphere at a temperature $T_{F1}$ for an effective period of time $t_1$ to form an oxide mixture comprising oxides of nickel, manganese, cobalt, lithium, and, if present, the one or more dopant metals, or a combination thereof (402); increasing the temperature to a temperature $T_{F2}$ at a rate of ≥10° C./min (403); and heating the oxide mixture in an oxygen-containing atmosphere at the temperature $T_{F2}$ for an effective period of time $t_2$ to form monocrystalline lithium nickel manganese cobalt oxide having a formula $LiNi_xMn_yM_zCo_{1-x-y-z}O_2$ (404). In the foregoing formulas, M represents one or more dopant metals, x≥0.6, 0.01≤y<0.2, z≤0.05, and x+y+z≤1.0. More particularly, 0.62≤x+y+z≤1.0. In some embodiments, x=0.65-0.99, y=0.01-0.2, z=0-0.02, and x+y+z=0.7-1.0. In an independent embodiment, x=0.65-0.95, y=0.01-0.2, z=0-0.02, and x+y+z=0.7-0.98. In another independent embodiment, x=0.65-0.9, y=0.05-0.2, z=0-0.02, and x+y+z=0.7-0.95. In some examples, x is 0.7-0.9, such as 0.75-0.9 or 0.8-0.9; y is 0.05-0.15, such as 0.05-0.14 or 0.05-0.1; z is 0-0.02; and x+y+z is 0.8-0.98, such as 0.8-0.95.

The solid hydroxide precursor is combined with a molar excess of a Li compound to form a hydroxide mixture. In any of the foregoing or following embodiments, the Li compound may comprise lithium hydroxide, lithium carbonate, lithium nitrate, lithium oxide, lithium peroxide, or any combination thereof. In any of the foregoing or following embodiments, the Li compound may have a mean particle size of 10 μm to 100 μm. In some embodiments, the Li compound comprises lithium hydroxide. The LiOH may be anhydrous or a hydrated salt, e.g., $LiOH \cdot H_2O$. In any of the foregoing or following embodiments, the solid hydroxide precursor and the lithium compound may be combined in a Li:solid hydroxide precursor molar ratio of 0.8:1 to 3:1, such as a molar ratio of 0.9:1 to 3:1, 0.9:1 to 2:1, 0.9:1 to 1.5:1, 1:1 to 1.5:1, 1.1:1 to 1.4:1, or 1.1:1 to 1.2:1.

The hydroxide mixture is heated in an oxygen-containing atmosphere at a temperature $T_{F1}$ for an effective period of time $t_1$ to form an oxide mixture comprising oxides of nickel, manganese, cobalt, lithium, and, if present, the one or more dopant metals, or a combination thereof. In some embodiments, the hydroxide mixture is heated at the temperature $T_{F1}$ in an absence of a sintering agent. In any of the foregoing or following embodiments, the temperature $T_{F1}$ may be 400° C. to 1000° C. and/or the effective period of time $t_1$ may be 1 hour to 30 hours. In some embodiments, the temperature $T_{F1}$ is 400° C. to 900° C., 400° C. to 800° C., 400° C. to 600° C., or 450° C. to 550° C. In certain examples, the temperature $T_{F1}$ was 480° C. In any of the foregoing or following embodiments, the effective period of time $t_1$ is 1 hour to hours In some embodiments, the effective period of time $t_1$ is 1 hour to 25 hours, 1 hour to 20 hours, 1 hour to 15 hours, or 1 hour to 10 hours. In certain examples, the period of time $t_1$ was 5 hours. In any of the foregoing or following embodiments, the oxygen-containing atmosphere may be air or pure oxygen. In some embodiments, the oxygen-containing atmosphere is pure oxygen. In any of the foregoing or following embodiments, a portion or all of the hydroxide mixture is converted to an oxide mixture. In some embodiments, at least 25 wt %, at least 50 wt %, at least 75 wt %, or at least 90 wt % of the hydroxide mixture is converted to an oxide mixture. In certain embodiments, 25-100 wt %, 50-100 wt %, 75-100 wt %, 90-100 wt %, or 95-100 wt % of the hydroxide mixture is converted to an oxide mixture.

The temperature is then increased to a temperature $T_{F2}$ at a rate of ≥10° C./minute. In any of the foregoing or following embodiments, the ramping rate may be from 10° C./minute to 3000° C./minute (50° C./second). In some embodiments, the ramping rate is from 10° C./minute to 2000° C./minute, such as 10° C./minute to 1000° C./minute, 10° C./minute to 500° C./minute, 10° C./minute to 250° C./minute, or 10° C./minute to 100° C./minute. In certain examples, the ramping rate was 10-20° C./minute. In any of the foregoing or following embodiments, the temperature $T_{F2}$ may be 600° C. to 1000° C. In some embodiments, the temperature $T_{F2}$ is 700° C. to 800° C. or 750° C. to 850° C. In some examples, the temperature $T_{F2}$ was 800° C.

The oxide mixture is heated in an oxygen-containing atmosphere at the temperature $T_{F2}$ for an effective period of time $t_2$ to form monocrystalline lithium nickel manganese cobalt oxide having a formula $LiNi_xMn_yM_zCo_{1-x-y-z}O_2$. In any of the foregoing or following embodiments, the effective period of time $t_2$ may be 1 hour to 30 hours. In some embodiments, the effective period of time $t_2$ is 1 hour to 25 hours, 1 hour to 20 hours, 5 hours to 20 hours, or 5 hours to 15 hours. In certain examples, the period of time $t_2$ was 10 hours. In any of the foregoing or following embodiments, the oxygen-containing atmosphere comprises pure oxygen or air. In some embodiments, the oxygen-containing atmosphere is pure oxygen.

In any of the foregoing or following embodiments, the hydroxide precursor may be prepared as discussed above. In any of the foregoing or following embodiments, the solid hydroxide precursor may have a mean particle size of 0.5 μm to 10 μm. In some embodiments, the hydroxide precursor particles have a mean size of 0.5 μm to 7.5 μm, 0.5 μm to 5 μm, or 0.5 μm to 2.5 μm. In any of the foregoing or following embodiments, monocrystalline lithium nickel manganese cobalt oxide may have a mean particle size of 0.5 μm to 5 μm. In some embodiments, the solid hydroxide precursor has a mean particle size of 1 μm to 2 μm. In certain embodiments, the monocrystalline lithium nickel manganese cobalt oxide has a mean particle size of 1 μm to 5 μm, or 1 μm to 3 μm. In any of the foregoing or following embodiments, the dopant metal(s) M may comprise Mg, Ti, Al, Zn, Fe, Zr, Sn, Sc, V, Cr, Fe, Cu, Ga, Y, Nb, Mo, Ru, Ta, W, Ir, or any combination thereof.

III. Cathodes and Lithium Ion Batteries

Monocrystalline lithium nickel manganese cobalt oxide (NMC), and doped variants thereof, made by embodiments of the disclosed methods may be used in cathodes, such as cathodes for lithium ion batteries. In some embodiments, a cathode comprises monocrystalline $LiNi_xMn_yM_zCo_{1-x-y-z}O_2$ where M represents one or more dopant metals, x≥0.6, 0.01≤y<0.2, z≤0.05, and x+y+z≤1.0. In some embodiments, x=0.65-0.99, y=0.01-0.2, z=0-0.02, and x+y+z=0.66-1.0. In an independent embodiment, x=0.65-0.95, y=0.01-0.2, z=0-0.02, and x+y+z=0.66-0.98. In another independent embodiment, x=0.65-0.9, y=0.05-0.2, z=0-0.02, and x+y+z=0.7-0.95. In some examples, x is 0.7-0.9, such as 0.75-0.9 or 0.8-0.9; y is 0.05-0.15, such as 0.05-0.14 or 0.05-0.1; z is 0-0.02; and x+y+z is 0.8-0.98, such as 0.8-0.95.

In any of the foregoing or following embodiments, a mean particle size of the monocrystalline $LiNi_xMn_yM_zCo_{1-x-y-z}O_2$ may be 0.5 μm to 5 μm, such as 1 μm to 5 μm, or 1 μm to 3 μm. In one embodiment, the NMC is $LiNi_{0.76}Mn_{0.14}Co_{0.1}O_2$. In an independent embodiment, the NMC is $LiNi_{0.8}Mn_{0.1}Co_{0.1}O_2$. In another independent embodiment, the NMC is $LiNi_{0.9}Mn_{0.05}Co_{0.05}O_2$. In still another independent embodiment, the NMC is $LiNi_{0.76}Mn_{0.12}Co_{0.1}Mg_{0.01}Ti_{0.01}O_2$.

In any of the foregoing or following embodiments, the cathode may have a capacity >180 mAh/g. In some embodiments, the cathode has a capacity >185 mAh/g, >190 mAh/g, or even >200 mAh/g. In any of the foregoing or following embodiments, the cathode may be operable at high voltage, e.g., a voltage of >3.8 V. In some embodiments, the cathode is operable at a voltage from 2-4.6 V, such as a voltage of 2-4.5 V or 2-4.4 V. In any of the foregoing or following embodiments, the cathode may have an NMC loading of 15-25 mg/cm$^2$, such as 18-24 mg/cm$^2$ (ca. 3.5-4.5 mAh/cm$^2$). In some embodiments, the coating weight on each side of the cathode may be from 7.5-12.5 mg/cm$^2$, such as 9-12 mg/cm$^2$, providing an areal capacity on each side of 3.5-4.5 mAh/cm$^2$.

In any of the foregoing or following embodiments, the cathode may further comprise one or more inactive materials, such as binders and/or additives (e.g., carbon). In some embodiments, the cathode may comprise from 0-10 wt %, such as 2-5 wt % inactive materials. Suitable binders include, but are not limited to, polyvinyl alcohol, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, polyimide and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). In some embodiments, a slurry comprising the NMC and, optionally, inactive materials is coated onto a support, such as aluminum foil. In certain embodiments, the coating may have a thickness of 50-80 μm on each side, such as a thickness of 60-70 μm. In any of the foregoing or following embodiments, the cathode may have an electrode press density of 2.5-3.5 g/cm$^3$, such as 3 g/cm$^3$.

Figure 5:
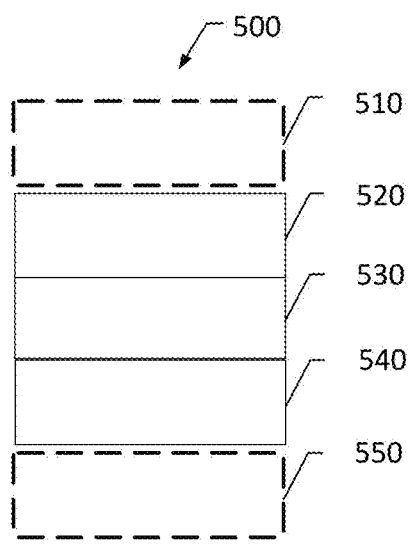
FIG. 5 is a schematic diagram of an exemplary lithium ion battery.

In some embodiments, a lithium ion battery includes a cathode comprising monocrystalline NMC as disclosed herein, an anode, an electrolyte, and optionally a separator. FIG. 5 is a schematic diagram of one exemplary embodiment of a rechargeable battery 500 including a cathode 520 as disclosed herein, a separator 530 which is infused with an electrolyte, and an anode 540. In some embodiments, the battery 500 also includes a cathode current collector 510 and/or an anode current collector 550. The electrolyte may be any electrolyte that is compatible with the anode and suitable for use in a lithium ion battery.

Figure 6:
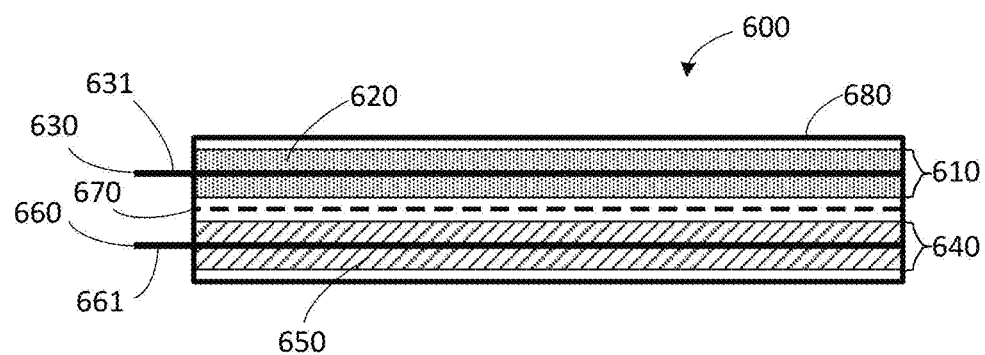
FIG. 6 is a schematic side elevation view of a simplified pouch cell.
Figure 8C:
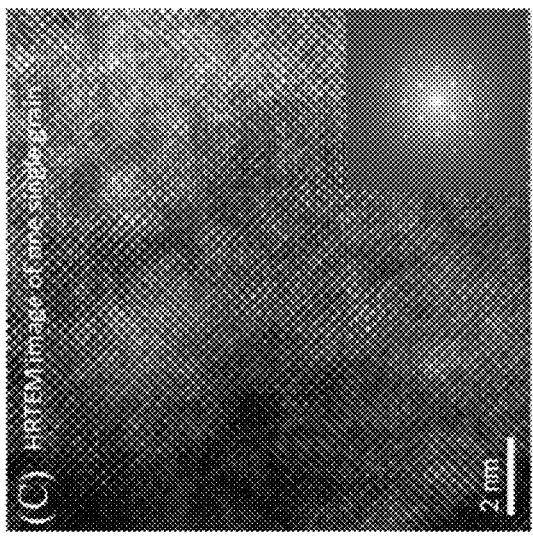
FIGS. 8A-8F show characterization of a NMC76 secondary (polycrystalline) particle.
Figure 8F:
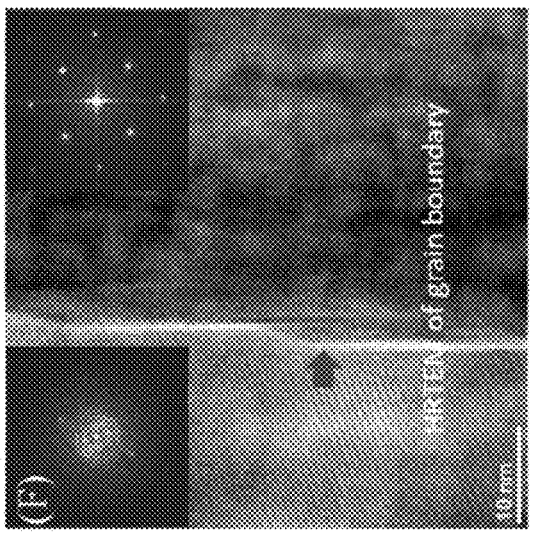
Figure 8B:
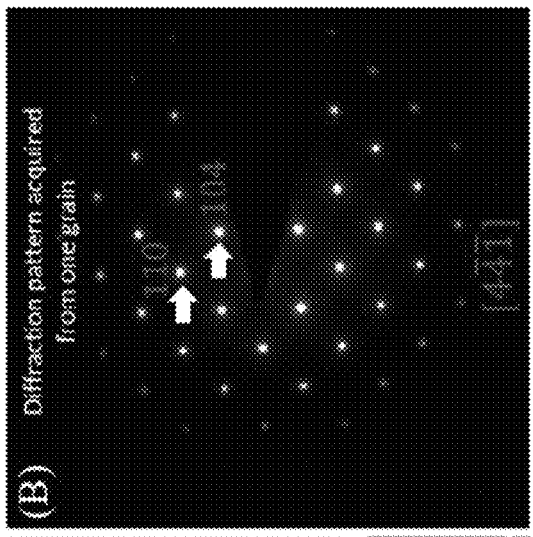
Figure 8E:
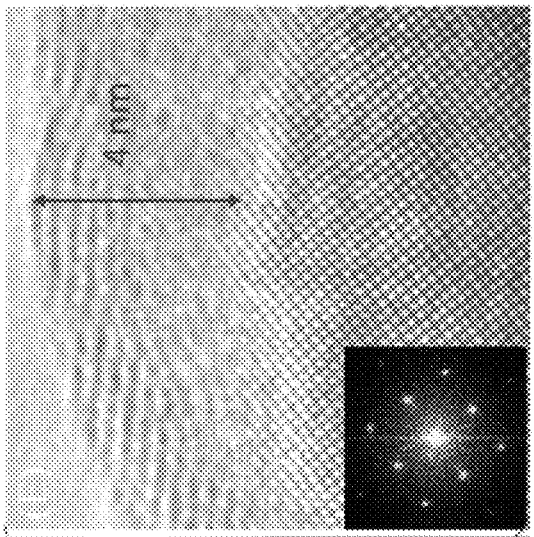
Figure 8A:
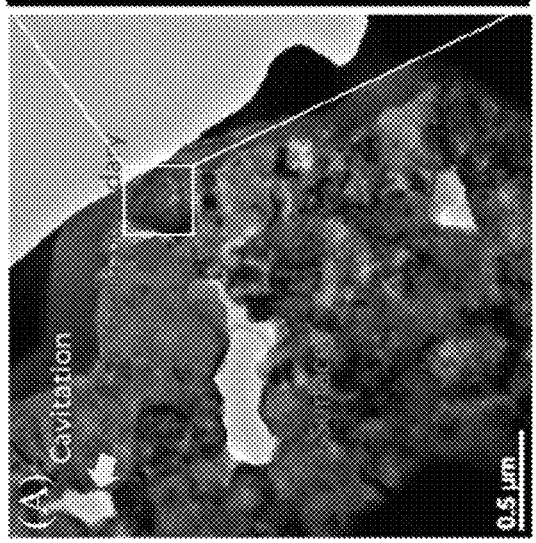
Figure 8D:
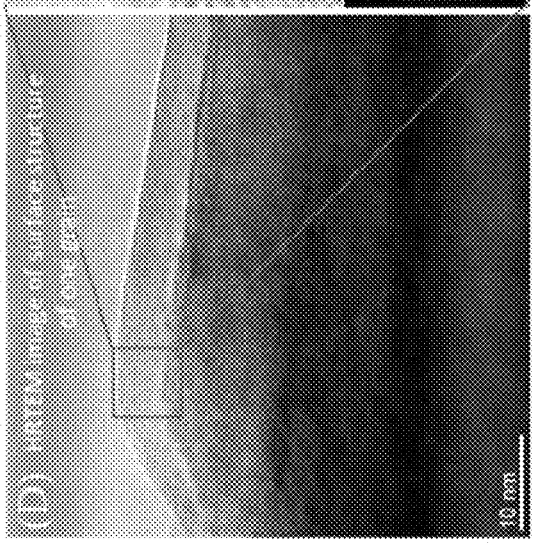

In any of the foregoing or following embodiments, the lithium ion battery may be a pouch cell. FIG. 6 is a schematic side elevation view of one embodiment of a simplified pouch cell 600. The pouch cell 600 comprises an anode 610 comprising graphite material, an anode current collector 630, a cathode 640 comprising an NMC cathode material 650 as disclosed herein and a cathode current collector 660, a separator 670, and a packaging material defining a pouch 680 enclosing the anode 610, cathode 640, and separator 670. The pouch 680 further encloses an electrolyte (not shown). The anode current collector 630 has a protruding tab 631 that extends external to the pouch 680, and the cathode current collector 660 has a protruding tab 661 that extends external to the pouch 680. The pouch cell weight includes all components of the cell, i.e., anode, cathode, separator, electrolyte, and pouch material. In some embodiments, the pouch cell has a ratio of anode (negative electrode) areal capacity to cathode (positive electrode) areal capacity—N/P ratio—of 0.02-5, 0.1-5, 0.5-5, or 1-5. In certain embodiments, the pouch cell has a ratio of electrolyte mass to cell capacity—E/C ratio—of 1-6 g/Ah, such as 2-6 g/Ah or 2-4 g/Ah.

In any of the foregoing or following embodiments, the current collectors can be a metal or another conductive material such as, but not limited to, nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (i.e., does not corrode or react) when in contact with the anode or cathode and the electrolyte in an operating voltage window of the battery. The anode and cathode current collectors may be omitted if the anode or cathode, respectively, are free standing, e.g., when the anode is a free-standing film, and/or when the cathode is a free-standing film. By "free-standing" is meant that the film itself has sufficient structural integrity that the film can be positioned in the battery without a support material.

In any of the foregoing or following embodiments, the anode may be any anode suitable for a lithium ion battery. In some embodiments, the anode is lithium metal, graphite, an intercalation material, or a conversion compound. The intercalation material or conversion compound may be deposited onto a substrate (e.g., a current collector) or provided as a free-standing film, typically, including one or more binders and/or conductive additives. Suitable binders include, but are not limited to, polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, polyimide and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). Exemplary anodes for lithium batteries include, but are not limited to, lithium metal, carbon-based anodes (e.g., graphite, silicon-based anodes (e.g., porous silicon, carbon-coated porous silicon, carbon/silicon carbide-coated porous silicon), $Mo_6S_8$, $TiO_2$, $V_2O_5$, $Li_4Mn_5O_{12}$, $Li_4Ti_5O_{12}$, C/S composites, and polyacrylonitrile (PAN)-sulfur composites. In some embodiments, the anode is lithium metal. In certain embodiments, the anode may have a lithium coating weight on each side of a current collector of 5-15 mg/cm$^2$, providing an areal capacity on each side of 2-5.1 mAh/cm$^2$.

In any of the foregoing or following embodiments, the separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard® K1640 polyethylene (PE) membrane. Another exemplary polymeric separator is a Celgard® 2500 polypropylene membrane. Another exemplary polymeric separator is a Celgard® 3501 surfactant-coated polypropylene membrane. The separator may be infused with the electrolyte.

In any of the foregoing or following embodiments, the electrolyte may comprise a lithium active salt and a solvent.

In some embodiments, the lithium active salt comprises LiPF$_6$, LiAsF$_6$, LiBF$_4$, lithium bis(fluorosulfonyl)imide (LiFSI), lithium bis(trifluoromethanesulfonyl)imide (LiTFSI), lithium bis(oxalato)borate (LiB(C$_2$O$_4$)$_2$, LiBOB), lithium difluoro(oxalato)borate (LiBF$_2$(C$_2$O$_4$), LiDFOB), lithium bis(pentafluoroethanesulfonyl)imide (LiN(SO$_2$CF$_2$CF$_3$)$_2$, LiBETI), lithium (fluorosulfonyl trifluoromethanesulfonyl)imide (LiN(SO$_2$F)(SO$_2$CF$_3$), LiFTFSI), lithium (fluorosulfonyl pentafluoroethanesulfonyl)imide (LiN(SO$_2$F)N(SO$_2$CF$_2$CF$_3$), LiFBETI), lithium cyclo(tetrafluoroethylenedisulfonyl)imide (LiN(SO$_2$CF$_2$CF$_2$SO$_2$), LiCTFSI), lithium (trifluoromethanesulfonyl)(n-nonafluorobutanesulfonyl)imide (LiN(SO$_2$CF$_3$)(SO$_2$-n-C$_4$F$_9$), LiTNFSI), lithium cyclo-hexafluoropropane-1,3-bis(sulfonyl)imide, or any combination thereof. The solvent is any nonaqueous solvent suitable for use with the lithium active salt, lithium metal anode, and packaging material. Exemplary solvents include, but are not limited to, triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, 1,2-dimethoxyethane (DME), 1,3-dioxolane (DOL), tetrahydrofuran (THF), allyl ether, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), 4-vinyl-1,3-dioxolan-2-one (vinyl ethylene carbonate, VEC), 4-methylene-1,3-dioxolan-2-one (methylene ethylene carbonate, MEC), 4,5-dimethylene-1, 3-dioxolan-2-one, dimethyl sulfoxide (DMSO), dimethyl sulfone (DMS), ethyl methyl sulfone (EMS), ethyl vinyl sulfone (EVS), tetramethylene sulfone (i.e. sulfolane, TMS), trifluoromethyl ethyl sulfone (FMES), trifluoromethyl isopropyl sulfone (FMIS), trifluoropropyl methyl sulfone (FPMS), diethylene glycol dimethyl ether (diglyme), triethylene glycol dimethyl ether (triglyme), tetraethylene glycol dimethyl ether (tetraglyme), methyl butyrate, ethyl propionate, gamma-butyrolactone, acetonitrile (AN), succinonitrile (SN), adiponitrile, triallyl amine, triallyl cyanurate, triallyl isocyanurate, or any combination thereof. In some embodiments, the solvent comprises a flame retardant compound. The flame retardant compound may comprise the entire solvent. Alternatively, the solvent may comprise at least 5 wt % of the flame retardant compound in combination with one or more additional solvents and/or diluents. Exemplary flame retardant compounds include, but are not limited to, triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, and combinations thereof. In some embodiments, the electrolyte has a lithium active salt concentration of 0.5-8 M, such as a concentration of 1-8 M, 1-6 M, or 1-5 M. In some examples, the electrolyte comprises LiPF$_6$ in a carbonate solvent, such as 1.0 M LiPF$_6$ in EC/EMC.

In some embodiments, the electrolyte is a localized superconcentrated electrolyte (LSE), also referred to as a localized high concentration electrolyte. A LSE includes an active salt, a solvent in which the active salt is soluble, and a diluent, wherein the active salt has a solubility in the diluent at least 10 times less than a solubility of the active salt in the solvent. In an LSE, lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution. In an LSE, the electrolyte as a whole is not a concentrated electrolyte, but there are localized regions of high concentration where the lithium cations are associated with the solvent molecules. There are few to no free solvent molecules in the diluted electrolyte, thereby providing the benefits of a superconcentrated electrolyte without the associated disadvantages. The solubility of the active salt in the solvent (in the absence of diluent) may be greater than 3 M, such as at least 4 M or at least 5 M. In some embodiments, the solubility and/or concentration of the active salt in the solvent is of 3 M to 10 M, such as from 3 M to 8 M, from 4 M to 8 M, or from 5 M to 8 M. However, in some embodiments, the molar concentration of the active salt in the LSE as a whole is of 0.5 M to 3 M, 0.5 M to 2 M, 0.75 M to 2 M, or 0.75 M to 1.5 M.

Exemplary salts and solvents for LSEs are those disclosed above. In some embodiments, the diluent comprises a fluoroalkyl ether (also referred to as a hydrofluoroether (HFE)), a fluorinated orthoformate, or a combination thereof. Exemplary diluents include, but are not limited to, 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl)orthoformate (TFEO), tris(hexafluoroisopropyl) orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof. In certain embodiments where the diluent and solvent are immiscible, the electrolyte may further include a bridge solvent having a different composition than the solvent and a different composition than the diluent, wherein the bridge solvent is miscible with the solvent and with the diluent. Exemplary bridge solvents include acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), or any combination thereof. Additional information regarding LSEs may be found in US 2018/0254524 A1, US 2018/0251681 A1, and US 2019/148775 A1, each of which is incorporated in its entirety herein by reference.

In any of the foregoing or following embodiments, the lithium ion battery may have a cell energy density of 200 Wh/kg to 400 Wh/kg, such as 200 Wh/kg to 350 Wh/kg, 250 Wh/kg to 300 Wh/kg, or 250 Wh/kg to 275 Wh/kg. In any of the foregoing or following embodiments, the lithium ion battery may have a first cycle capacity of 2 Ah to 5 Ah. In any of the foregoing or following embodiments, the lithium ion battery may be operable at a rate of up to 3 C, such as a rate of 0.1 C to 3 C. In any of the foregoing or following embodiments, the lithium ion battery may demonstrate an average coulombic efficiency of at least 80%, such as 80-100%, 85-100%, 90-100%, 95-100%, or 95-99% over at least 100 cycles, at least 150 cycles, or at least 200 cycles. In any of the foregoing or following embodiments, the lithium ion battery may have a capacity retention of at least 70%, at least 75%, or at least 80% after at least 100 cycles, at least 150 cycles, or at least 200 cycles. In some embodiments, the capacity retention is 70-90%, such as 70-85%, after 200 cycles. Advantageously, the cathode may be more stable (e.g., resistant to cracking) over extensive cycling, undergo fewer side reactions, be less moisture sensitive, and/or generate less gas during cycling compared to conventional Ni-rich cathodes (e.g., Ni≥0.6) prepared with polycrystalline and/or monocrystalline NMC.

IV. Examples

Example 1

Molten-Salt Synthesis and Characterization of Single Crystal $LiNi_{0.76}M_{0.14}Co_{0.1}O_2$ (NMC76)

Synthesis

A $Ni_{0.76}Mn_{0.14}Co_{0.1}(OH)_2$ precursor was synthesized by co-precipitation method using a 5 L reactor at 55° C. Before the co-precipitation reaction, 1.5 L deionized (DI) $H_2O$ and 65 mL concentrated $NH_3$—$H_2O$ (~28 wt %) were added to the reactor and heated to 55° C. as a starting solution. A 2 mol/L transition metal (TM) sulfate solution (Ni:Mn:Co=0.76:0.14:0.10 in molar ratio) was prepared with $Ni(SO_4)_2·6H_2O$, $MnSO_4$—$H_2O$, and $Co(SO_4)_2·7H_2O$, and then pumped into reactor along with 8 M NaOH as well as 10 mol/L $NH_3$—$H_2O$ buffer solution. The pumping rates of the TM sulfate and $NH_3$—$H_2O$ solution were set at 3 and 1 mL/min, respectively. The pH value was controlled at 11.2 during reaction by adjusting NaOH adding rate. The synthesized precursor was filtered and washed by DI $H_2O$ to remove impurities. After drying at 100° C. for 12 hours, the $Ni_{0.76}Mn_{0.14}Co_{0.1}(OH)_2$ precursor was obtained. $Ni_{0.76}Mn_{0.14}Co_{0.1}(OH)_2$ was heated at 900° C. for 15 hours in air to prepare the oxide precursor. The stoichiometry of the oxide precursor was analyzed by ICP-OES. The oxide precursor and lithium oxide were mixed at 1:0.6 molar ratio (TM:Li=1:1.2), then NaCl (1:1.1 weight ratio) was added to the precursor and mixed uniformly. The mixture was sintered at 800° C. for 10 hours and then 900° C. for 5 hours using a 10° C./minute ramping rate in an oxygen atmosphere. The sintered products were washed and dried at 80° C. in vacuum for 2 hours. Post annealing at 580° C. (10° C./min ramping) in oxygen atmosphere was carried out before collecting the end products. Pure NaCl was used as the molten salt media to lower the sintering time/temperature of the single crystals, thereby reducing the cost of synthesizing the single crystals.

Characterization

Scanning electron images (SEM) were collected on a Helios NanoLab scanning electron microscope (FEI, Hillsboro, Oreg.). Powder X-ray diffraction (XRD) data were collected at the 28-ID-2 (XPD) beamline of the National Synchrotron Light Source II (NSLS II), Brookhaven National Laboratory (BNL). A Perkin Elmer amorphous-Si flat panel detector was used. The wavelength was 0.1821 Å. Pristine powder was loaded in Kapton® polyimide capillary tubes (1.0 mm diameter) in an Ar-filled glove box and mounted on bases at the beamline. Rietveld refinement of the XRD data was carried out in TOPAS6 (Coelho, J. Appl. Crystallogr. 2018, 51:210-218). Transmission electron microscopy (TEM) specimen preparation was conducted on a FEI Helios Dual-Beam FIB operating at 2-30 kV. TEM images, selected area electron diffraction (SAED), high resolution TEM (HRTEM) images and scanning TEM energy-dispersive X-ray spectroscopy (STEM-EDS) were performed on a FEI Titan 80-300 S/TEM microscope at 300 kV which was equipped with a probe spherical aberration corrector. HRSTEM high-angle annular dark-field (HRSTEM-HAADF) images and STEM-electron energy loss spectroscopy (STEM-EELS) were performed on a probe aberration-corrected JEOL JEM-ARM200CF microscope (JEOL USA, Peabody, Mass.) at 200 kV.

Since the TEM sample was very thin and self-absorption in the TEM sample was negligible, EDS quantitation was performed by using a simple ratio technique (Cliff-Lorimer quantification). In this method, peak intensities are proportional to concentration and specimen thickness, and the effects of variable specimen thickness are removed by taking ratios of intensities for elemental peaks and introduced a "k-factor" to relate the intensity ratio to concentration ratio:

$$C_A/C_B = k_{AB} \cdot I_A/I_B \tag{1}$$

Where $I_A$ is Peak intensity for element A and $C_A$ is concentration in weight %. Each pair of elements requires a different k-factor which depends on detector efficiency, ionization cross section and fluorescence yield of the two elements concerned, k-factor kab is calculated as follows:

$$k_{ab} = (A_a \omega_b Q_b)/(A_b \omega_a Q_a) \tag{2}$$

Where $A_a$ and $A_b$ are the atomic weights of elements giving rise to the analytical lines a and b respectively, $Q_a$ and $Q_b$ are the ionization cross sections of the shells, that once ionized give rise to the analytical lines at the specified accelerating voltage. The fluorescent yields $\omega_a$ and $\omega_b$ give probability of emission of the lines once the appropriate shell has been ionized. Once the k factor is known, the element concentration in weight % can be calculated.

The as-prepared single crystalline NMC76 had a tap density of 2.12 mg/cm³, while polycrystalline NMC76 is 2.08 mg/cm³. The increased tap density will benefit the cell-level energy due to the reduced porosity and improved electrode press density.

Electrochemical Test

To understand the electrochemical properties of single crystal NMC76 at industry relevantscales, a cathode with reasonably high loading is needed. However, half cells are not a good testing vehicle to evaluate high mass loading of the cathode materials due to the accelerated Li metal degradation when coupled with a thick cathode. Electrochemical performance was evaluated with 2032 type coin cells. Single crystalline MNC76 was mixed with carbon additive (C65 carbon black) and PVDF at 96:2:2 weight ratio in NMP (N-methyl-2-pyriolidone) solvent and loaded on carbon coated Al foil. The areal loading of 5-26 mg/cm² electrodes were prepared by adjusting the height of doctor blade. After drying at 80° C. under vacuum, thick electrodes (~20 mg/cm²) were calendared (~32% porosity) and cut into Φ½ inch size discs for assembling cells. Prior to calendaring, the porosity was 62%. Graphite powder was mixed with carbon additive (C65), CMC and SBR at weight ratio of 94.5:1:2.25:2.25 and loaded on copper foil. The dried graphite electrodes were calendared and cut into Φ15 mm size discs. 1.0 M $LiPF_6$ in EC/EMC (3:7 weight ratio) with 2 wt % VC was used as electrolyte for both half cell and full cell tests. Half cells were assembling using 450 μm thick Li metal as anode. Negative/Positive (N/P) ratio for full cells assembling was controlled 1.15-1.2 (including ~0.1 mg Li metal in graphite anode). In all the cell tests, 1 C is named as 200 mA/g.

In Situ Electrochemical AFM Measurements (EC-AFM)

Fabrication of working electrodes for in situ EC-AFM: Aluminum (Al) foil was chosen as the substrate because of its electronic conductivity and stability during the electrochemical cycles. The synthesized Ni-rich NMC single crystals were dropped on Al foil. Then the Al foil with Ni-rich NMC was placed under a 5 tonnage press machine and held for 100 s. The weakly bound and unfixed Ni-rich NMC crystals were removed by flowing $N_2$ gas. The Al foil was then mounted onto the AFM sample holder with epoxy and an electrical contact was made to the bottom side of Al foil with a flattened nickel wire. Silicone grease was used to cover the outer rim of the O-ring to enhance the sealing of solution. The nickel wire was isolated from solution due to the larger diameter of Al foil than O-ring. The cell was ready for in situ AFM testing after cell assembly with an O-ring, sealing cap with Li wire for the counter and reference electrode, and another free sealing cap.

All in situ EC-AFM images were captured in peak force or tapping mode at room temperature (23° C.) with a Nanoscope 8 atomic force microscope (J scanner, Bruker, Santa Barbara, Calif.) (Habraken et al., Nat Commun 2013, 4:1507; Tao et al., PNAS USA 2019, 116:13867-13872). The AFM probe consisted of silicon tips on silicon nitride cantilevers (HA_C Series of ETALON probes, k=0.26 N/m, tip radius <10 nm; K-TEK Nanotechnology, https://kteknano.com/product-category/etalon/). The electrolyte solution of 1.0 M $LiPF_6$ in EC/EMC (3:7 weight ratio) was used as the testing solution. A working cathode electrode (described above) was connected to Solartron 1287 electrochemistry workstation (Solartron, Farnborough, Hampshire, UK) by the nickel wire. A thin Li wire (counter and reference electrode) with sealing cap was inserted into the testing solution via another channel in liquid cell (Lv etai, Nano Lett 2017, 17:1602-1609). An electric signal was input into an AFM liquid cell with a two-electrode configuration by a Solartron 1287 electrochemistry workstation. The applied voltage started at OCV, increased up to 4.50 V and down to 2.70 V with a uniform scan rate of 0.3 mV/s. For typical imaging conditions, images were collected at scanning speeds of 1 Hz.

Several protocols were followed to ensure that the AFM images were typical representations of the surface topography evolution. First, the imaging force was reduced to the minimum possible value (~100 pN) that still allowed the tip to track the surface and no measurable effect of the scanning on the surface cracks. We verified this by zooming out to a larger scan box and comparing the crack number density with the smaller scan area. A consequence of imaging in the same area is that it may cause the less bound particles to move on the surface. This operation ensures that the crack growth kinetics are minimally affected. Images were also collected at different scan angles and trace and retrace images regularly compared to eliminate the possibility of imaging artifacts from tip contamination. The images were analyzed using the image processing software package Nanoscope Analysis 2.0 (Bruker).

The average width of these steps almost linearly increases with the higher voltage (vs. Li+/Li) during charging process followed by linear decreases with the lower voltage during the discharge process, with its value of 30.3±0.7 nm at open circuit voltage (OCV), up to 52.5±2.5 nm at 4.50 V at charge status, and down to 38.4±1.3 nm at 4.19 V during discharge. The average step width is calculated by dividing the total width of the lateral face by the total number of steps (between 21 and 43 steps) for each voltage during the in situ AFM monitoring. The error bars in the step width are evaluated by averaging of three times of measurement of lateral face width at each time point.

Simulation

A cylindrical electrode particle diffusion-induced-stress model was used here along with material properties predicted by density functional theory (DFT) (28, 33). The particle is considered as an isotropic solid with Young's modulus (E) increasing linearly with Li concentration. In the layered Ni-rich electrode, the diffusion of lithium ion is limited in the two-dimensional channels, namely, between the layers, so lithium diffusion along the radial direction is assumed in the model. The dimensionless particle size, time, Li concentration, and stress are used following the definitions in Deshpande et al., J Electrochem Soc 2010, 157: A967-A971). For the parameters in simulation, $\alpha$=0.0067; $E_0$=59.8 GPa; $E=E_0+204.2$ C; $v$=0.3 (Qi et al. J Electrochem Soc 2014, 161:F3010-F3018); and $\gamma$=2.1 J/m$^2$ was computed for $Li_{16}(Ni_{14}CoMn)O_{32}$ (Stein et al., Acter Mater 2018, 159:225-240). The analytical solutions are provided in FIGS. 29A-29D, 30A-30D. The numerical solution by COMSOL5.5 model is provided in FIGS. 31A-31D. For the anisotropic chemical strain solved in FIG. 31D, the $\alpha$=(0, 0, 0.02).

Results and Discussion

Figure 9:
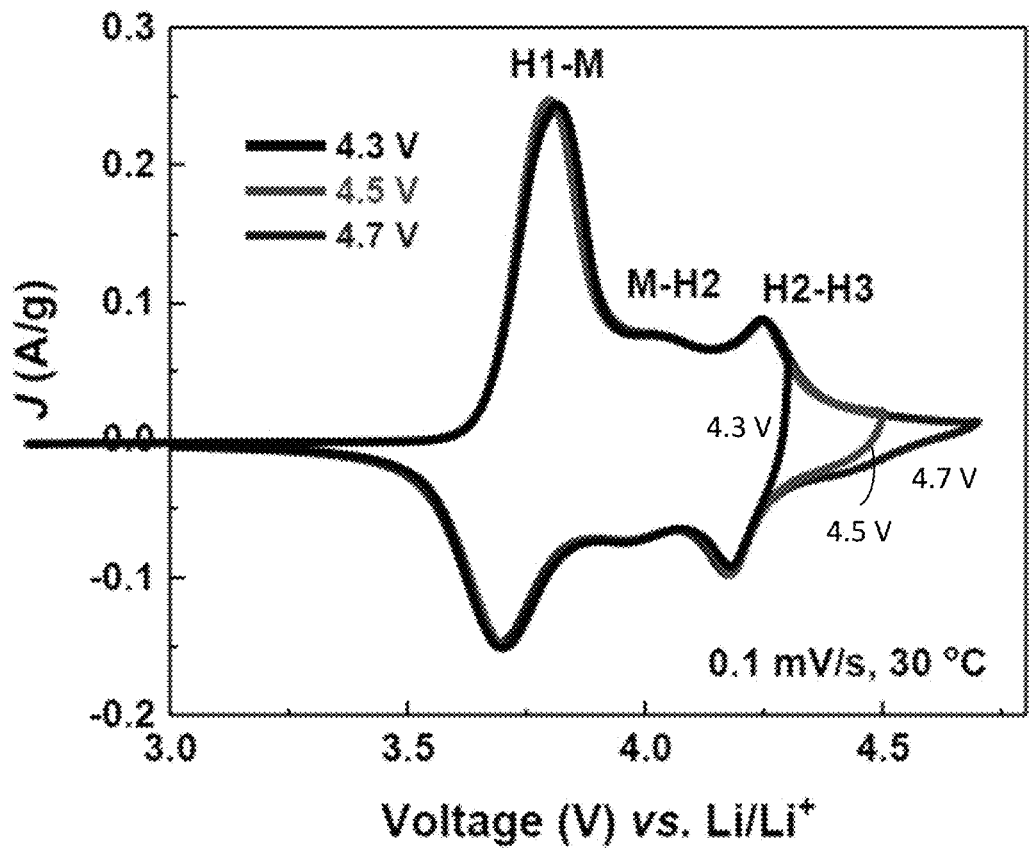
FIG. 9 shows cyclic voltammetry curves of single crystalline NMC76 in different voltage windows using Li metal as the anode; scanning rate 0.1 mV/s.
Figure 17A:
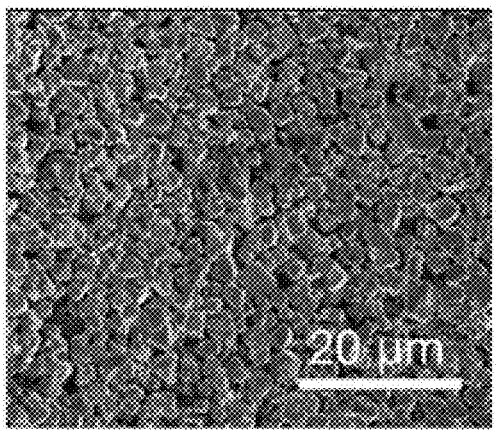
FIGS. 17A-17F are SEM images of single crystal NMC76 after cycling tests: 2.7-4.2 V vs. graphite (17A-B); 2.7-4.3 V vs. graphite (17C-D); 2.7-4.4 V vs. graphite (17E-F).
Figure 17B:
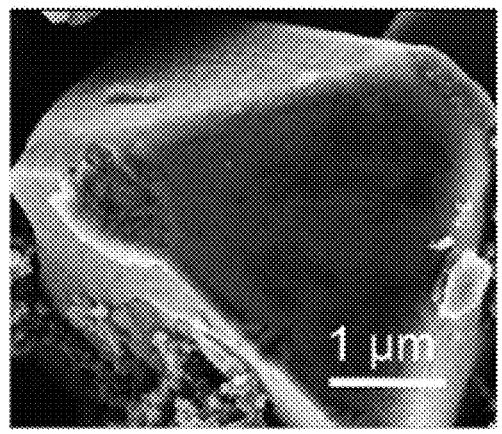
Figure 17C:
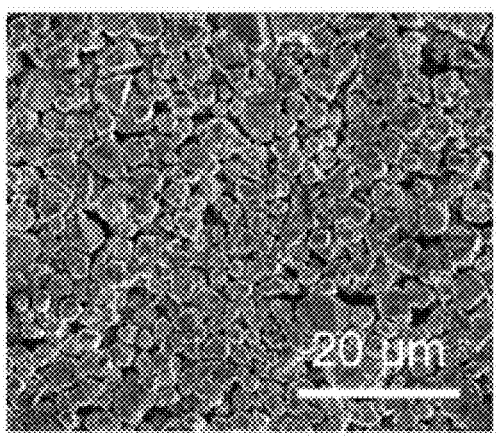
Figure 17D:
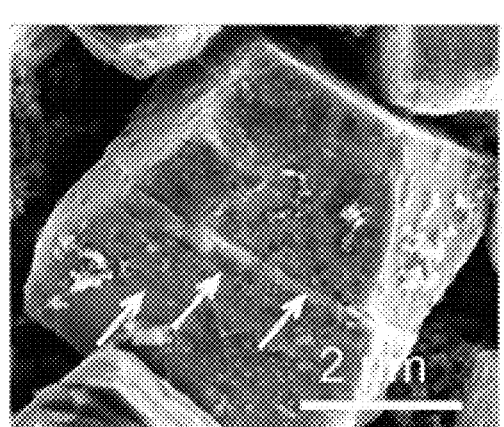
Figure 17E:
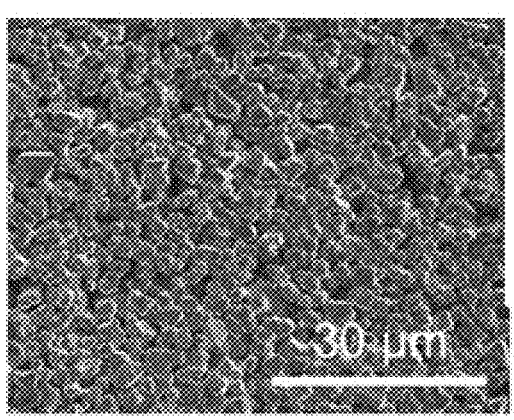
Figure 17F:
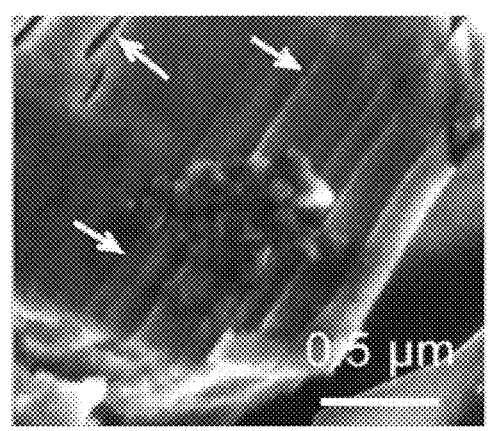

The synthesized NMC76 has a mean particle size of 3 μm (FIG. 7A). A cross-section view (FIG. 17B) shows that NMC76 has a dense structure without cavities or grain boundaries. Pure phases of $\alpha$-NaFeO$_2$-type layered structures are confirmed by both selected area electron diffraction (SAED, FIG. 7C) and X-ray Diffraction (XRD, FIG. 7D). Lattice parameters a and c are 2.8756(1) Å and 14.2221 (1) Å, respectively, from Rietveld refinement (Table 1). For comparison, polycrystalline NMC76 is found to contain many internal pores and intergranular boundaries along with surface films (FIGS. 8A-8F) formed from the reactions between NMC and air (Jung et al., J Electrochem Soc 2018, 165:A132-A141). In contrast, the surface of single crystal-line NMC76 is very uniform (FIGS. 7E and 7F). Elemental mapping (FIGS. 7G and 7H) indicates a homogeneous distribution of Ni, Mn and Co with a stoichiometric ratio as designed (Table 2). Continuous phase transitions happen when potential changes (FIG. 9), similar to polycrystalline NMC76 (Zheng et al., Nano Energy 2018, 49:538-548). During charge, phase transitions happen in the order of from H1 to M (H and M are hexagonal phase and monoclinic phase, respectively), M to H2, and H2 to H3, similar to polycrystalline NMC76.

TABLE 1

Rietveld refinement result of the pristine NMC76.
a = 2.8756(1) Å, c = 14.2221(1) Å

| Atom | Site | x | y | z | Fraction | Uiso |
|---|---|---|---|---|---|---|
| Li | 3a | 0 | 0 | 0 | 0.986(1) | 0.004(1) |
| Ni | 3a | 0 | 0 | 0 | 0.014(1) | 0.004(1) |
| Ni | 3b | 0 | 0 | 0.5 | 0.746(1) | 0.005(2) |
| Li | 3b | 0 | 0 | 0.5 | 0.014(1) | 0.005(2) |
| Mn | 3b | 0 | 0 | 0.5 | 0.14 | 0.005(2) |
| Co | 3b | 0 | 0 | 0.5 | 0.1 | 0.005(2) |
| O | 6c | 0 | 0 | 0.2403(1) | 1 | 0.009(4) |

TABLE 2

Elemental Ratio obtained from STEM-EDS

| Element | Wt % | Stdev |
|---|---|---|
| Ni | 48.28 | 1.45 |
| Mn | 7.62 | 0.9 |

TABLE 2-continued

Elemental Ratio obtained from STEM-EDS

| Element | Wt % | Stdev |
|---|---|---|
| Co | 6.98 | 1.13 |
| O | 37.12 | 1.69 |

Figure 10:
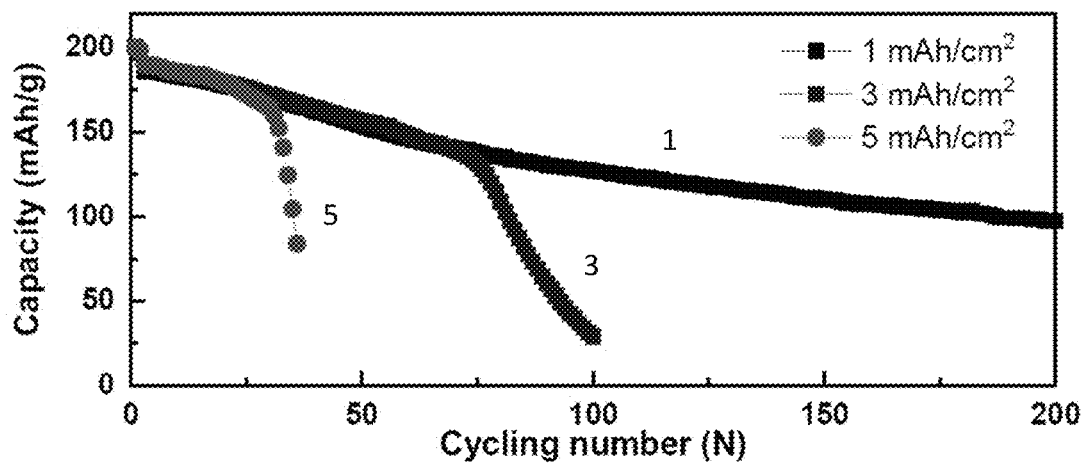
FIG. 10 shows cycling stability of single crystalline NMC76 with different areal density between 2.7 and 4.5 V in half cells using Li metal as anode. Charge at 0.1 C and discharge at 0.33 C.
Figure 11:
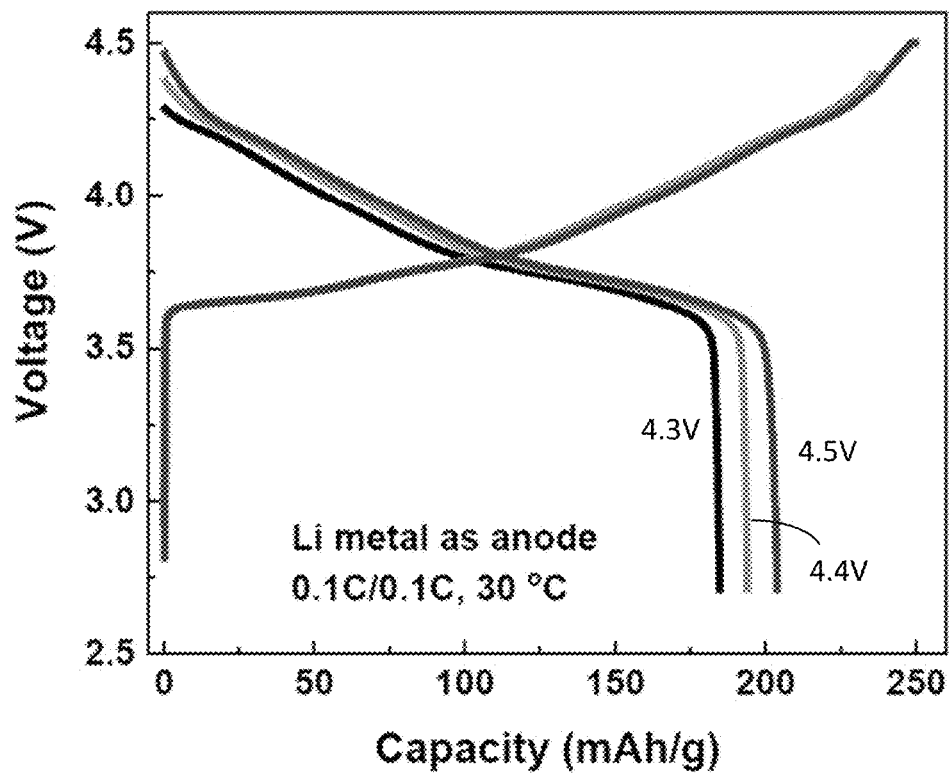
FIG. 11 shows initial charge-discharge curves between different cutoff voltages at 0.1 C using Li metal as anode. Discharge capacity at 4.3, 4.4 and 4.5 V cutoff voltage are 184.9, 194.1 and 203.1 mAh/g, respectively.
Figure 12A:
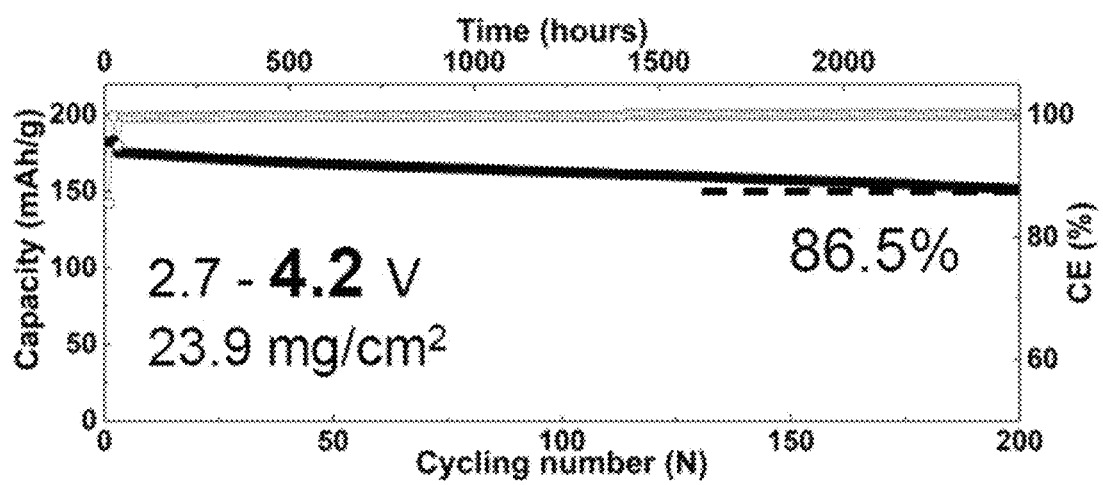
FIGS. 12A-12C show electrochemical performance of single crystalline NMC76 at 4.2 V cutoff (12A), 4.3 V cutoff (12B), and 4.4 V cutoff (12C) tested in a full cell using graphite as the anode.
Figure 12B:
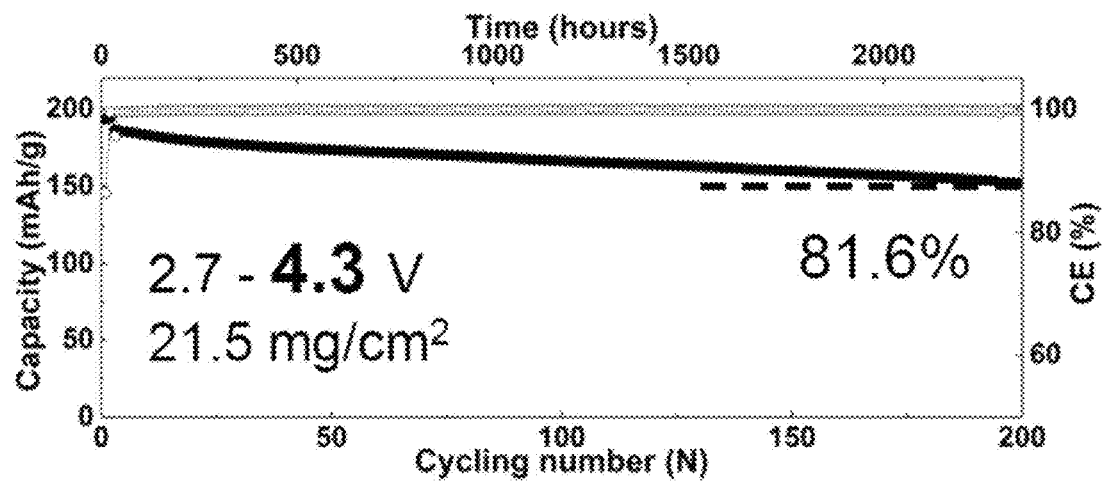
Figure 12C:
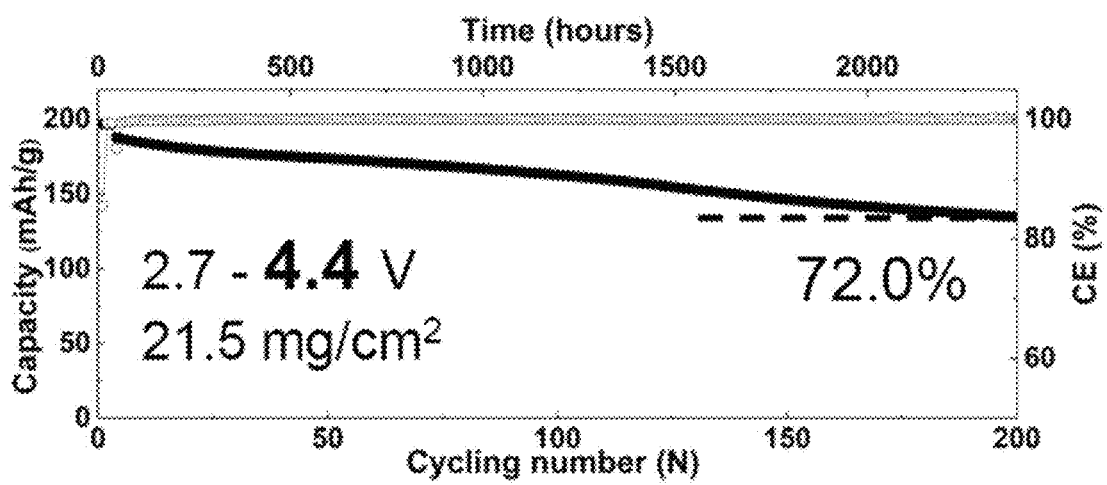
Figure 13A:
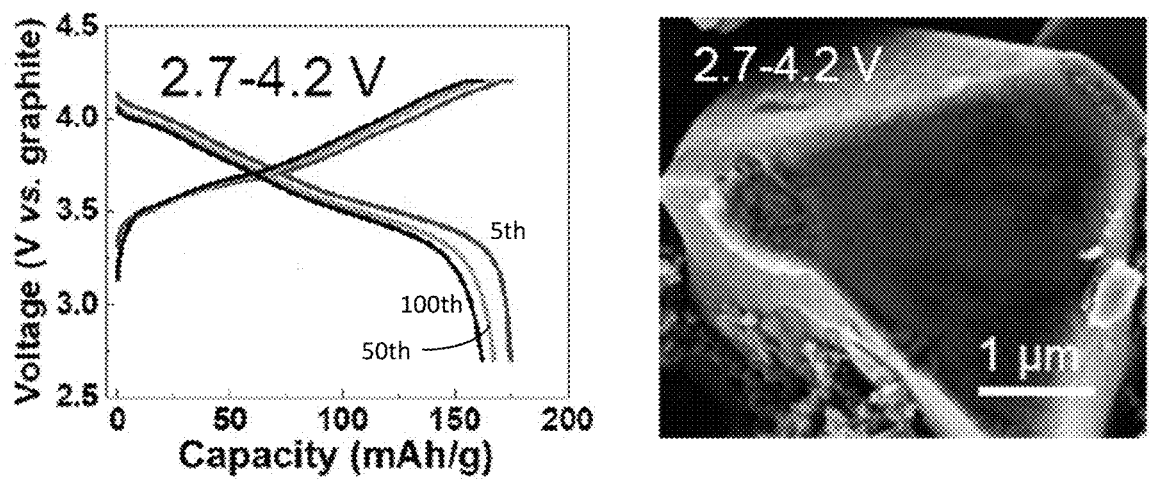
FIGS. 13A-13C show the corresponding charge-discharge curves of the cells in FIGS. 12A-12C, and accompanying SEM images of the single crystalline NMC76 after cycling.
Figure 13B:
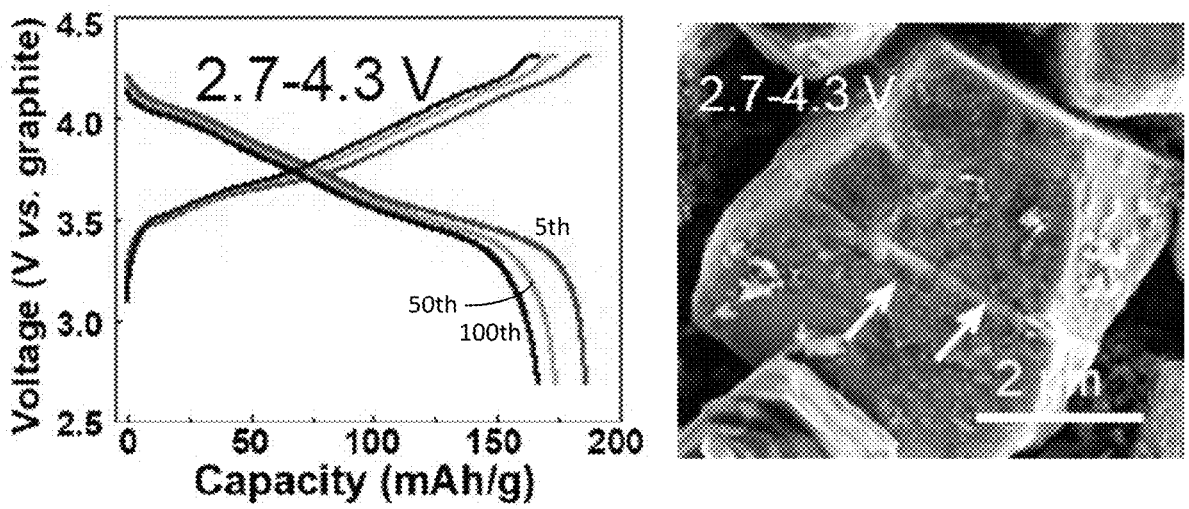
Figure 13C:
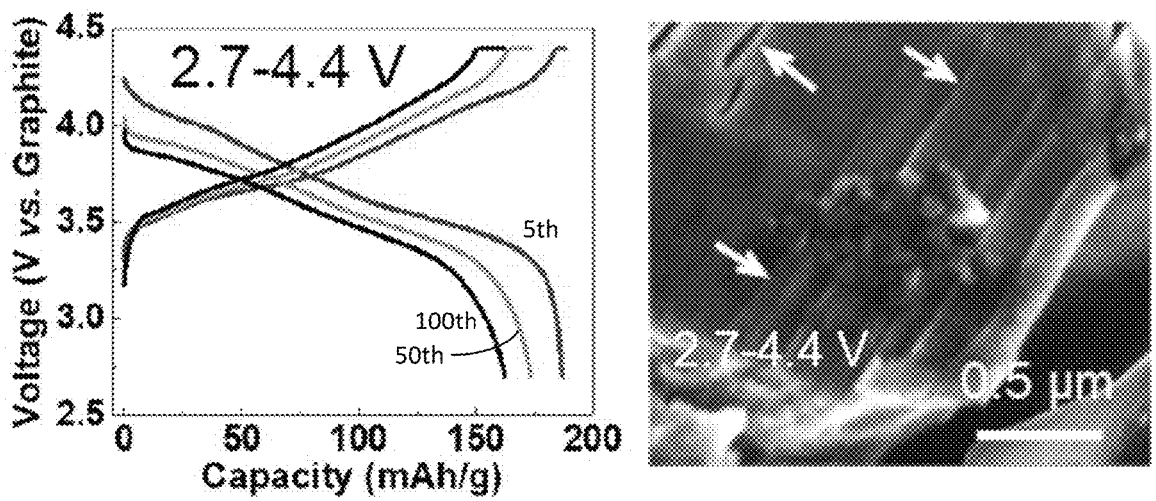
Figure 14A:
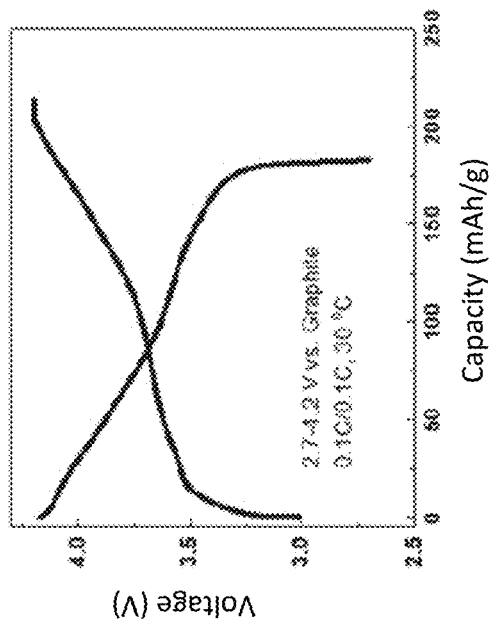
FIGS. 14A-14B show an initial charge-discharge curve of single crystal NMC76 between 2.7-4.2 V (vs. graphite) (14A), and the middle voltage of the charge-discharge curves and the voltage difference over 200 cycles (14B).
Figure 14B:
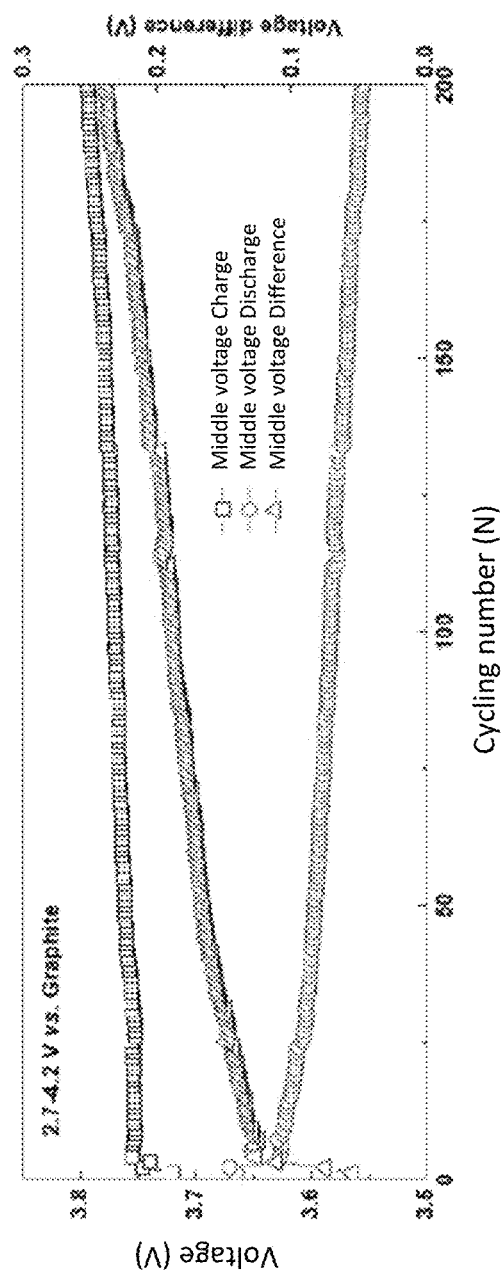
Figure 15A:
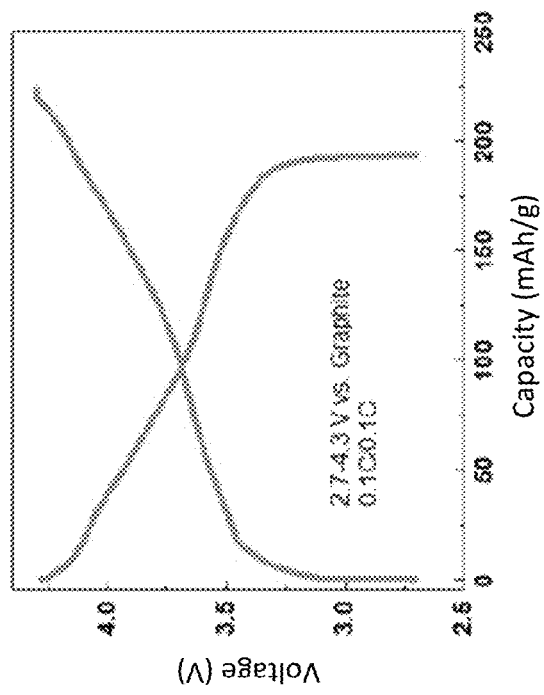
FIGS. 15A-15B show an initial charge-discharge curve of single crystal NMC76 between 2.7-4.3 V (vs. graphite) (15A), and the middle voltage of the charge-discharge curves and the voltage difference over 200 cycles (15B).
Figure 15B:
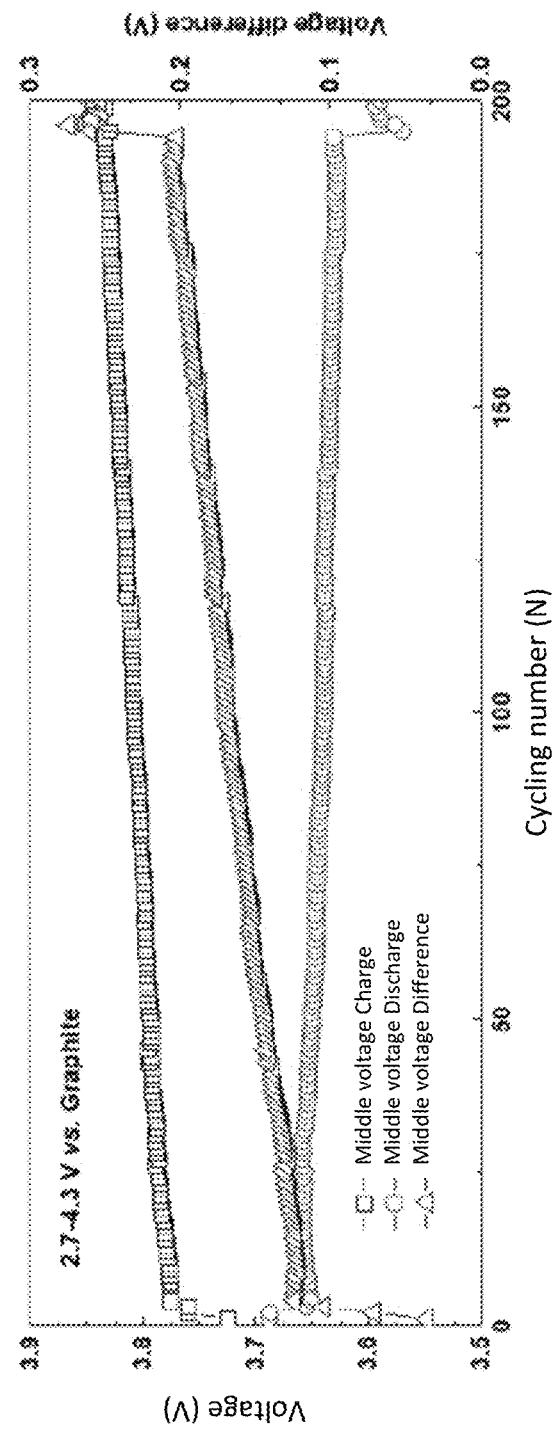
Figure 16A:
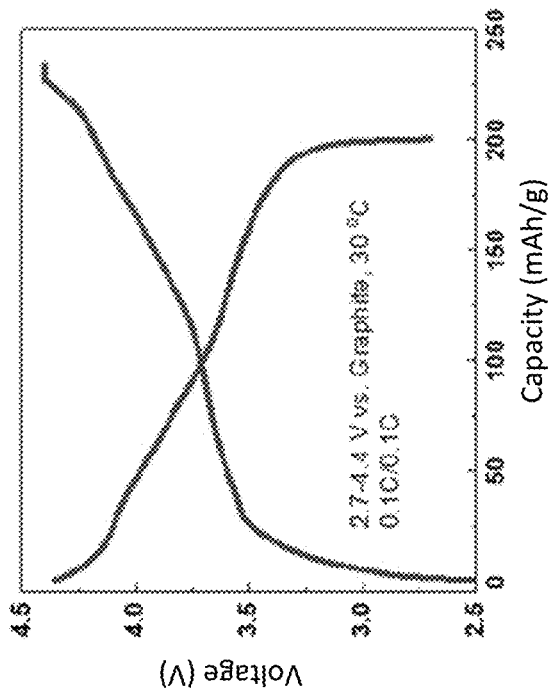
FIGS. 16A-16B show an initial charge-discharge curve of single crystal NMC76 between 2.7-4.4 V (vs. graphite) (16A), and the middle voltage of the charge-discharge curves and the voltage difference over 200 cycles (16B).
Figure 16B:
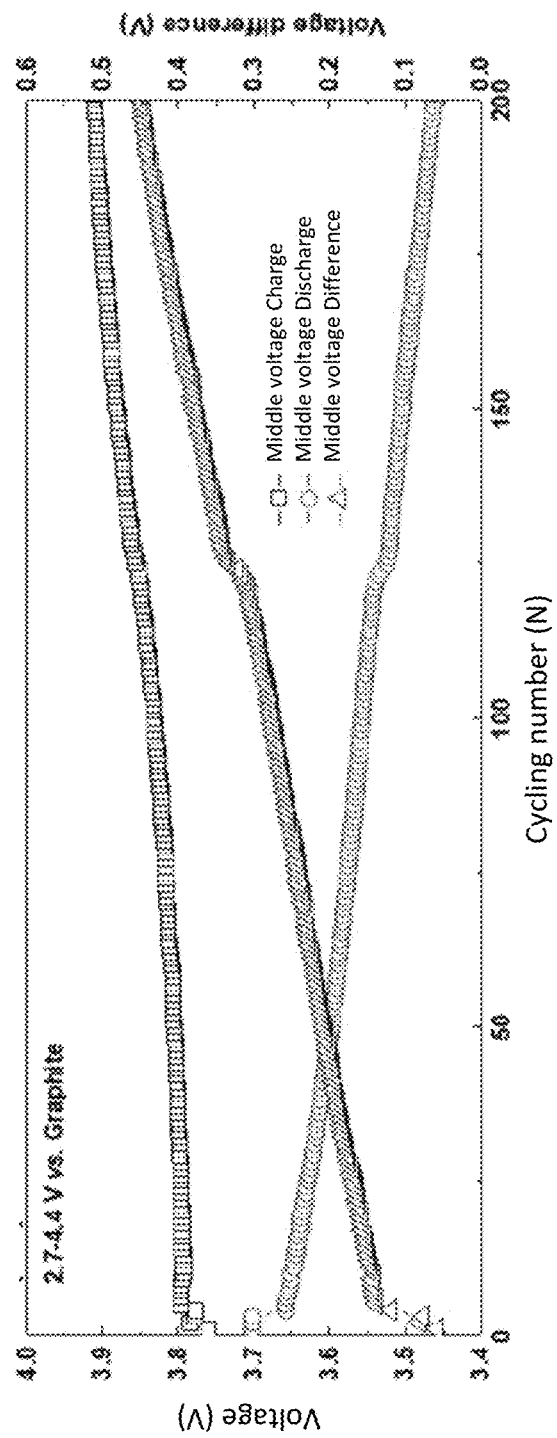

Single crystalline NMC76 was further tested in graphite/NMC full cells at realistic conditions. The typical loading of NMC76 cathodes is ca. 20 mg/cm$^2$ (=4 mAh/cm$^2$) with ca. 32% porosity, which is needed to build a 250 Wh/kg Li-ion cell (Table 3). At such a high cathode loading, Li metal will worsen the cycling stability (FIGS. 10, 11) due to the deepened stripping/deposition process of Li. Between 2.7 V and 4.2 V (vs. graphite), single crystalline NMC76 delivered 182.3 mAh/g discharge capacity at 0.1 C, and retained 86.5% of its original capacity after 200 cycles (FIG. 12A). With a cutoff of 4.3 V, single crystalline NMC76 delivered 193.4 mAh/g capacity with 81.6% capacity retention after 200 cycles (FIG. 12B). Further increasing to 4.4 V, 196.8 mAh/g discharge capacity was seen (FIG. 12C) along with a 72.0% capacity retention after 200 cycles. Note that 200 cycles at C/10 charge rate and C/3 discharge rate mean 2600 hours of cycling. The total testing time was equal to a cell undergoing 1300 cycles at 1 C. Increased polarization (FIGS. 13A-13C) was observed when the cutoff voltage increased which is presumably assigned to intensified electrolyte decomposition at elevated voltages (FIGS. 14A-B, 15A-B, 16A-B) and thus higher impedance resulting from cathode passivation films and single crystal lattice change. Crystalline gliding and cracking were seen when the cutoff voltage was beyond 4.3V (FIGS. 13A-13C). Table 4 summarizes the electrochemical performances and testing conditions of all previously published single crystalline Ni-rich NMC (Ni>0.6) cathode materials.

TABLE 3

Cell design parameters for 250 Wh/kg lithium ion pouch cell based on graphite/NMC76 chemistry

| | Material | LiNi$_{0.76}$Mn$_{0.14}$Mn$_{0.10}$O$_2$ |
|---|---|---|
| Cathode | 1$^{st}$ discharge capacity/mAh g$^{-1}$ | 200 |
| | Active material loading | 96% |
| | Cathode weight (each side)/mg cm$^{-2}$ | 21 |
| | Areal capacity (each side)/mAh cm$^{-2}$ | 4.0 |
| | Electrode press density/g cm$^{-3}$ | 3.0 |
| | Electrode thickness (each side)/μm | 70 |
| | Number of double side layers | 13 |
| | Electrode dimension W*L/mm | 36*54 |
| Al foil | Thickness/μm | 12 |
| Anode | Material | Graphite |
| | Specific capacity/mAh g$^{-1}$ | 360 |
| | Active material loading | 96% |
| | N/P ratio (cell balance) | 1.16 |
| | Coating weight (each side)/mg cm$^{-2}$ | 13.5 |
| | Electrode dimension W*L/mm | 37.5*55.5 |
| Cu foil | Thickness/μm | 8 |
| Electrolyte | E/C ratio/g Ah$^{-1}$ | 2.5 |
| Separator | Thickness/μm | 20 |
| Packaging foil | Thickness/μm | 88 |
| Cell | Average voltage (1$^{st}$ cycle)/V | 3.65 |
| | Capacity (1$^{st}$ cycle)/Ah | 2.0 |
| | Cell energy density/Wh kg$^{-1}$ | 250 |

TABLE 4

Summary of single crystalline Ni-rich NMC (Ni > 0.6) reported in literature

| | | Initial Capacity | | | | Cycling | | | |
|---|---|---|---|---|---|---|---|---|---|
| Ref. | Composition | Capacity (mAh/g) | Rate | Voltage (V) | Loading | No. | Retention (%) | Rate | Total cycling time (hr)* |
| This work | LiNi$_{0.75}$M$_{0.14}$C$_{0.1}$O$_2$ | 196.8 | 0.1 C | 4.4 vs. Gr | 20 mg/cm$^2$ | 200 (full cell) | 72 | 0.1/0.33 C | 2389 |
| 1 | LiNi$_{0.8}$M$_{0.1}$C$_{0.1}$O$_2$ | 185 | 0.1 C | 4.2 vs. Li | 3 mg/cm$^2$ | 25 | 50 | 0.1/0.1 C | ~500 |
| | LiNi$_{0.8}$M$_{0.1}$C$_{0.1}$O$_2$ | 240 | 0.1 C | 4.6 vs. Li | — | 25 | 50 | 0.1/0.1 C | |
| 2 | LiNi$_{0.58}$M$_{0.09}$C$_{0.03}$O$_2$ | 192 | 0.2 C | 4.3 vs. Li | 12 mg/cm$^2$ | 100 (full cell) | 88 | 0.2/0.2 C | ~1000 |
| 3 | LiNi$_{0.8}$M$_{0.1}$C$_{0.1}$O$_2$ | 190 | 0.1 C | 4.3 vs. Li | 3 mAh/cm$^2$ | 100 | ~90 | 1/1 C | ~200 |
| 4 | LiNi$_{0.83}$M$_{0.08}$C$_{0.11}$O$_2$ | 184.1 | 1 C | 4.2 vs Gr/SiO | 47 mg/cm$^2$ | 600 (tested at 45° C. full cell) | 84.8 | 1/1 C | ~1200 |
| 5** | LiNi$_{0.92}$M$_{0.01}$C$_{0.06}$AlW$_x$Mo$_x$O$_2$ | 221.4 | 0.1 C | 4.3 vs. Li | 7.8 mg/cm$^2$ | 100 | 95.7 | 0.5/1 C | 100 |

*Testing time of single crystalline LiNi$_{0.75}$M$_{0.14}$C$_{0.1}$O$_2$ is captured from testing data. Testing time for reference results are evaluated according to the current density.
**x corresponds to 1000 ppm for W and Mo
[1]Zhu et al., *J Mater Chem A* 2019, 7: 5463-5474.
[2]Li et al., *J Electrochem Soc* 2019, 166: A1956-A1963;
[3]Qian et al., *Energy Storage Meter* 2020, 27: 140-159;
[4]Fan et al., *Nano Energy* 2020, 70: 104450;
[5]Yan et al., *J Electrochem Soc* 2020, 167: 120514.

Figure 18A:
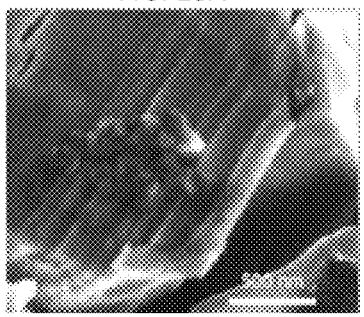
FIGS. 18A-18L show the morphology and structure study of single crystalline NMC76. (18A) SEM image of single crystalline NMC76 after 200 cycles. (18B) Cross-section STEM bright field image of single crystalline NMC76 after 200 cycles. (18C) STEM bright field image of internal slicing. (18D) STEM-HAADF image around slicing area. Upper inset is zoomed image of gliding area. (18E) SAED of gliding area. (18F) EELS mapping of selected area in (18B). (18G) SEM images of single crystalline NMC76 initially charged to 4.8 V (vs. $Li^+/Li$). (18H) SEM images of single crystalline NMC76 discharged to 2.7 V (after being charged to 4.8 V vs. □+/□). (18I-J) STEM images of single crystalline NMC76 at 4.4 V charge status (cycled in a full cell between 2.7-4.4 V for 120 cycles). (18K-L) STEM images of single crystalline NMC76 at discharge status (cycled in full cell between 2.7-4.4 V for 120 cycles).
Figure 18B:
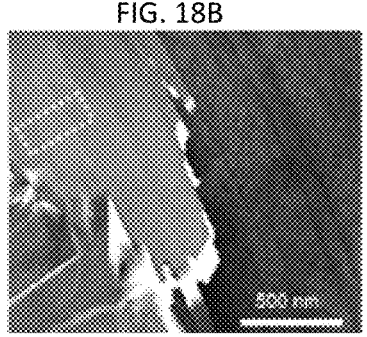
Figure 18C:
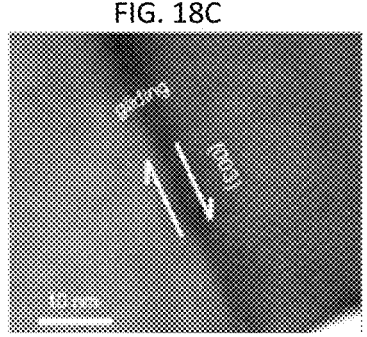
Figure 18D:
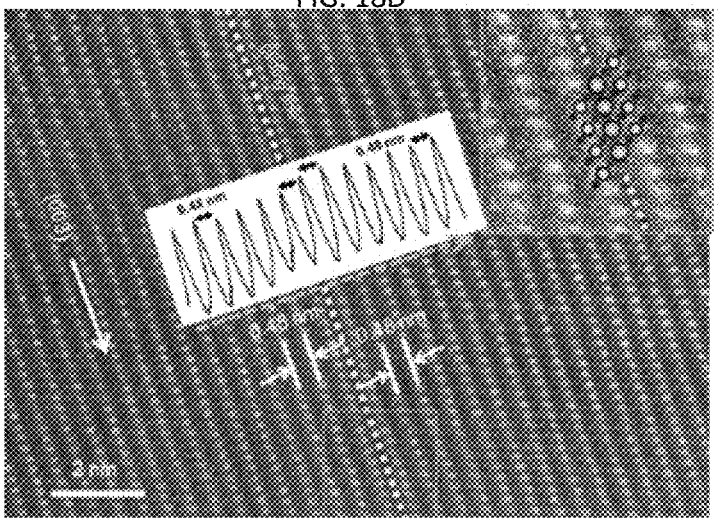
Figure 18E:
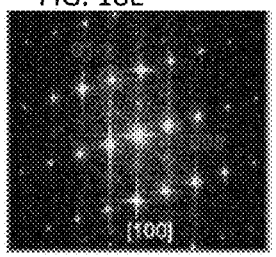
Figure 18F:
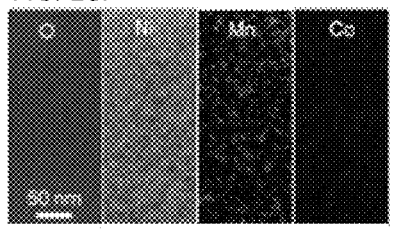
Figures 19, 20, 21:
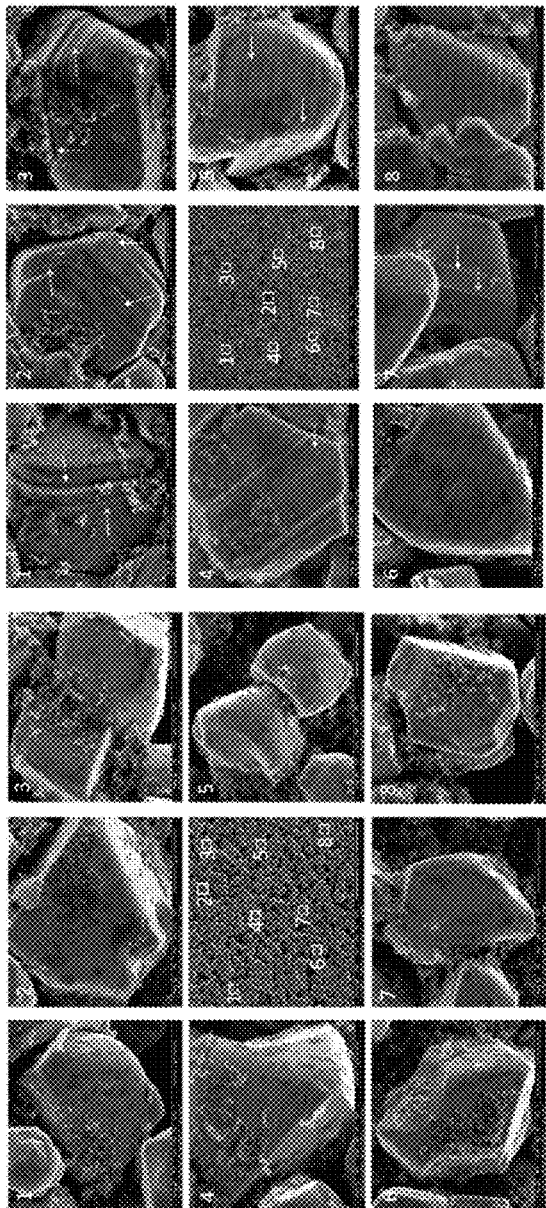
FIG. 19 shows SEM images of single crystals on the same electrode before cycling. Eight different regions are randomly selected and analyzed in the SEM images 1-8. No pre-existing "gliding" lines are presenting in the pristine single crystalline NMC76.
FIG. 20 shows SEM images of single crystalline NMC76 located at eight different locations of the same electrode after 120 cycles (2.7-4.4 V vs. graphite). Gliding steps are obviously observed on cycled single crystals.
FIG. 21 shows SEM images of single crystalline NMC76 located at eight different locations of the same electrode after 200 cycles (between 2.7-4.4 V vs. graphite).

Lattice gliding was clearly observed in single crystalline NMC76 at high voltages. Between 2.7 and 4.2 V (vs. graphite), the entire single crystal was well maintained after 200 cycles (FIG. 13A). Increasing cutoff voltage to 4.3 V, there were some gliding lines seen on the crystal surfaces after 200 cycles (FIG. 13B). Cycled to 4.4 V, single crystals appeared to be "sliced" (FIGS. 13C, 17A-17F) in parallel, along the (003) plane and vertical to c-axis of the layered structure (FIG. 18C), which indicated a model II type crack (in-plane shear) in fracture mechanics. Additionally, small cracks that indicate a model I type fracture (opening) were also discovered at 4.4 V (FIG. 13C). All characterizations were done by selecting various regions of NMC76 electrodes and the same phenomenon was repeatedly found (FIGS. 19-21). Although single crystalline NMC76 as a whole particle was still intact (FIG. 12A), gliding was the major mechanical degradation mode especially when cutoff voltage is above 4.3 V. Of note, the "gliding steps" formed in cycled crystals are quite different from cracking along intergranular boundaries of polycrystalline NMC particles. The scanning transmission electron microscopy (STEM) image for single crystalline NMC76 (FIGS. 18B-18D) confirmed that on both sides of a gliding plane (yellow line in FIG. 18D), the d-spacing of (003) plane (0.48 nm) was unchanged and the layered structure was well maintained after the "gliding" marks occurred. The long-range lattice symmetry of the bulk material will thereby not be altered. Ni, Mn, Co and O were still uniformly distributed in the vicinity of glided planes based on electron energy loss spectroscopy (EELS) analysis (FIG. 18F and FIG. 22). The uniform element distribution and intimately attached lattices across the gliding planes strongly demonstrated that although planar gliding occurs, no new boundary was generated, and the "sliced" area maintained the same lattice structure and chemical conditions as in the bulk phase. It should be noted that the gliding line (or the slicing marks) cannot be observed on the cross section of bulk particles by SEM, and are only visible by STEM bright field (BF) on thin sliced TEM samples. Although the internal lattice symmetry was well maintained after the gliding, the repeated gliding near surface eventually will evolve into microcracks exposing new surfaces to the electrolyte (FIGS. 13A-13C).

Figure 18G:
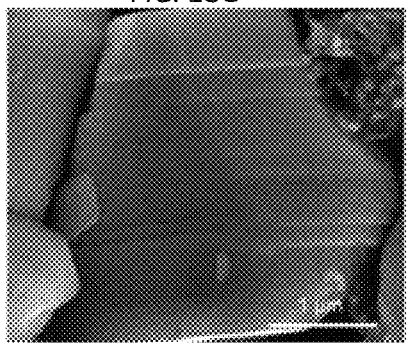
Figure 18I:
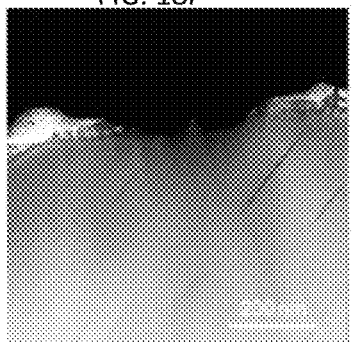
Figure 18J:
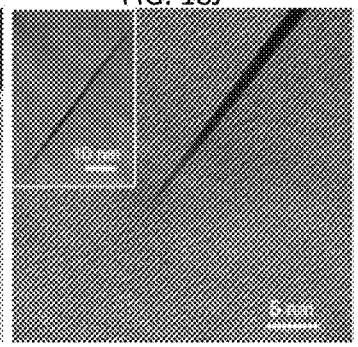
Figure 18H:
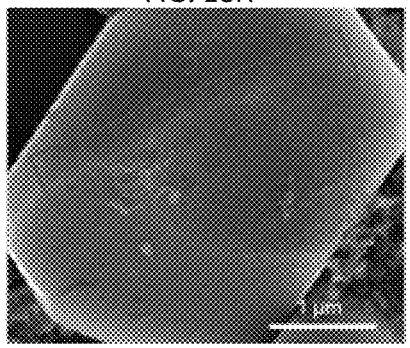
Figure 18K:
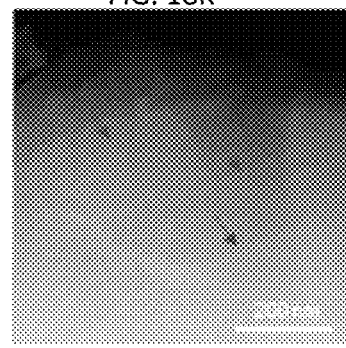
Figure 18L:
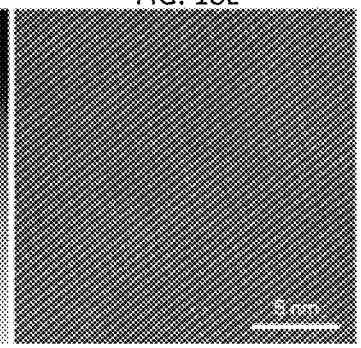

To further induce lattice gliding, the cutoff voltage of NMC76 single crystal is raised to 4.8 V (vs. □+/□). "Slicing marks" and microcracks are present in almost every charged single crystal (FIG. 23A). Slight deformation of individual single crystals is clearly observed (FIG. 18G), probably because the gliding of each layer equally likely moves towards symmetrically equivalent directions. Surprisingly, after discharging back to 2.7 V, the majority of single crystals revert to their original morphologies and the previously observed steps and microcracks disappear (FIG. 23B). The "glided" layers within single crystals almost completely "glided" back to their original locations (FIG. 18H), fully recovering from the deformation (FIG. 18G), although some "traces" are visible (labeled in FIG. 18H). Within the "regular" electrochemical window of 2.7-4.4 V (vs. graphite), after extensive cycling, lattice gliding and microcracking are also seen within crystal lattice at charged status (FIG. 18I). STEM analysis of the NMC76 crystal (FIG. 18J) indicates that the microcracks initiate from inside of the crystal. At the discharge status of those cycled crystals (cut off at 4.4 V), few ridges or cracks are found on the crystals. Although not as visible as in charged crystals, STEM still uncovers some "slicing marks" (FIG. 18K) on discharged single crystal NMC76 which probably undergoes reversible "sliding" process back and forth during 120 cycles. No microcracking is identified in those "self-healed" single crystals (FIG. 18L), suggesting that the lattice gliding and cracking in some of the crystals are still reversible after 120 cycles. As cycling continues, particle deformation will become dominant. Dislocation was also observed near the tip regions of microcrack of single crystals charged at 4.4 V (FIGS. 24A-24D). The accumulation of dislocation was accompanied by the microcrack propagation. A trace amount of nano-sized NiO-like rock salt phase (FIGS. 25A-25E) was observed on the gliding exposure step area of single crystalline NMC76 after cycling.

Figure 27A:
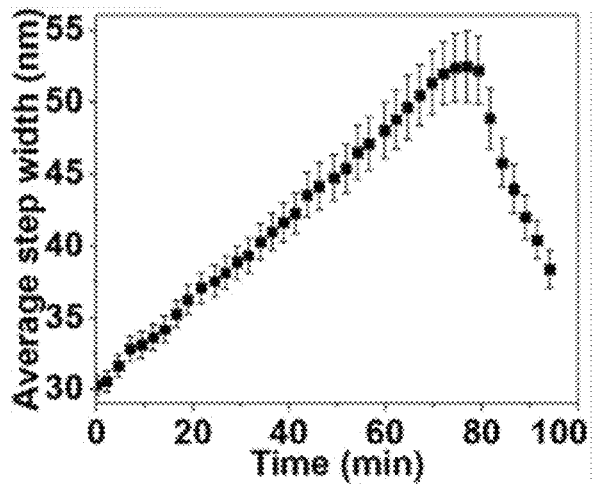
FIGS. 27A and 27B are graphs showing gliding step width vs. testing time (FIG. 27A), and gliding step width vs. voltage (FIG. 27B).
Figure 27B:
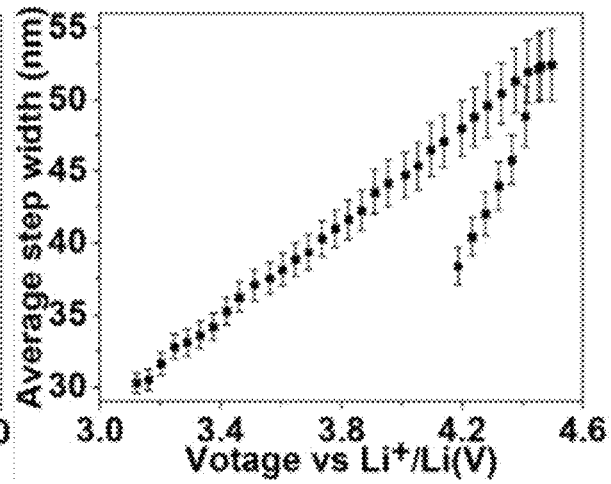
Figure 28A:
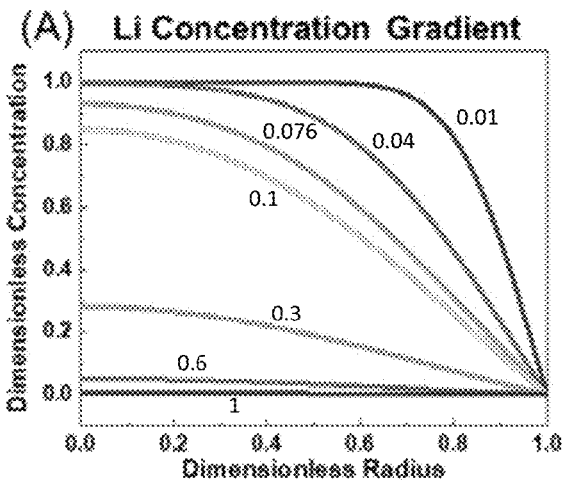
FIGS. 28A-28D show the time evolution of Li concentration and stress during the de-lithiation process.
Figure 28B:
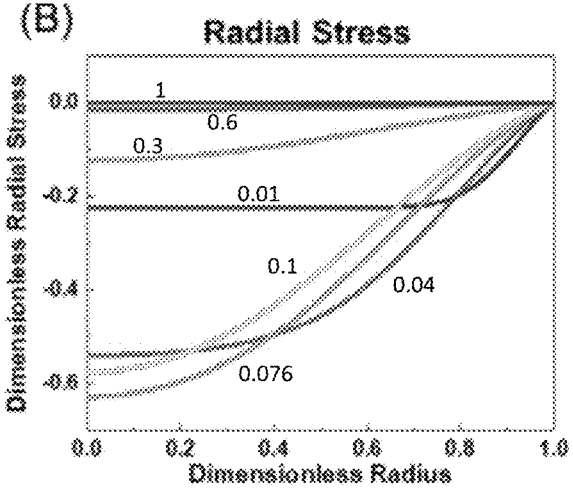
Figure 28C:
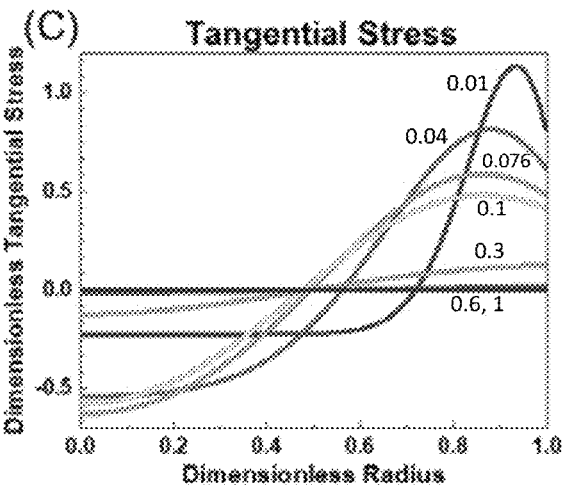
Figure 28D:
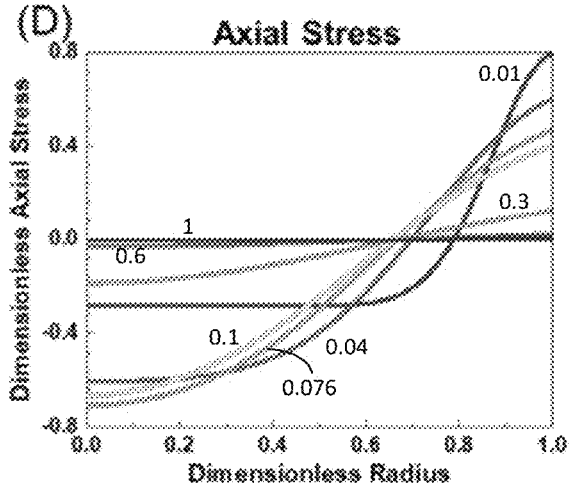
Figure 29A:
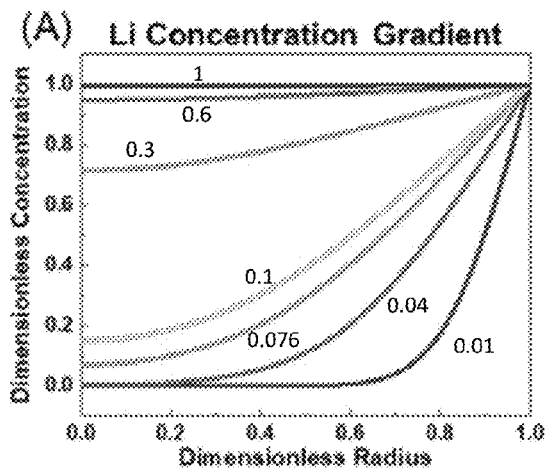
FIGS. 29A-29D show the time evolution of Li concentration and stress during the lithiation process.
Figure 29B:
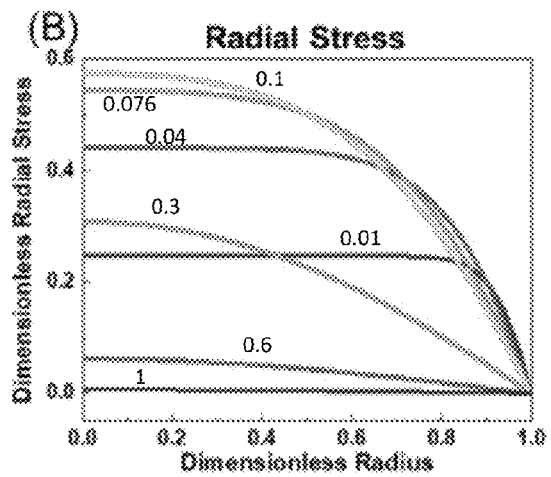
Figure 29C:
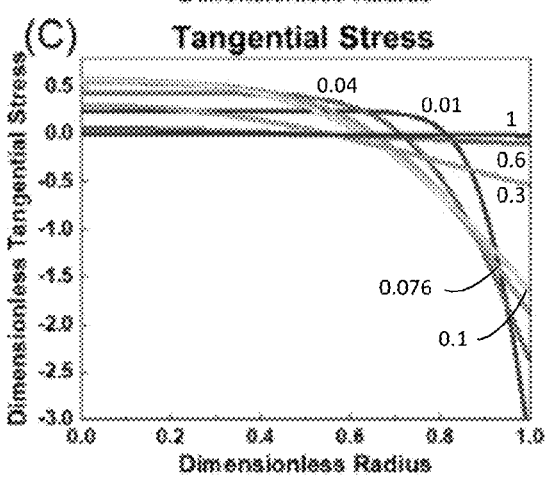
Figure 29D:
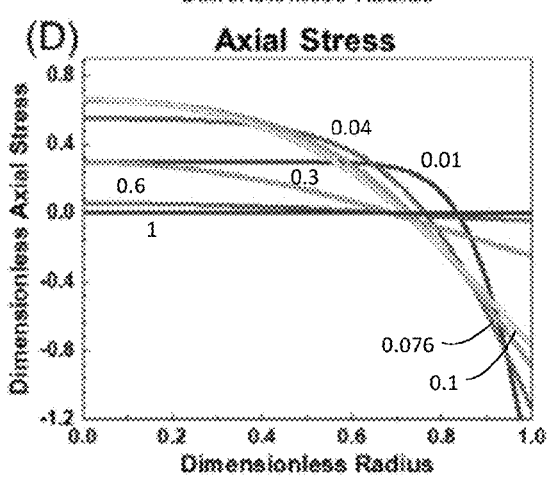

In situ AFM has been used to image the crystal surface in real time in an electrochemical cell. A ~3 μm sized NMC76 single crystal was studied by in situ AFM during charge and discharge (FIGS. 26A-26F). Regions B and C in FIG. 26A are enlarged in FIGS. 26B and 26C, respectively, to probe the origin and evolution of "gliding steps" and microcracks under the electrical field. The formation of nanosized crack domains was observed on the side surface from open circuit voltage (OCV) to 4.50 V (vs. Li$^+$/Li) during charge, while these domains disappeared in the discharge process (FIG. 26B). Moreover, planar gliding was characterized by the appearance of wide crystal steps on the side surface due to the uneven movement between neighboring layers during polarization. More wide gliding steps were observed on the side surface starting at 4.20 V charging process and led to the more and wider (~85 nm) gliding steps at 4.50 V (FIG. 26C). When the cell potential decreased to 4.19 V, a few wide gliding steps decreased in their width (FIGS. 27A-27B), indicating the atomic layer recovered back to their original position (FIG. 26C). The average width of the steps almost linearly increased with increasing voltages (vs. Li+/Li) during the charging process followed by linear decreases with decreasing voltages during the discharge process, with its value of 30.3±0.7 nm at open circuit voltage (OCV), up to 52.5±2.5 nm at 4.50 V at charge status, and down to 38.4±1.3 nm at 4.19 V during discharge. The average step width was calculated by dividing the total width of the lateral face by the total number of steps (between 21 and 43 steps) for each voltage during the in situ AFM monitoring. The error bars in the step width were evaluated by averaging of three times of measurement of lateral face width at each time point. This "first increase then decrease" behavior of average step width vs. voltage indicates the reversible gliding process of these NMC crystals in each cycle. The reversible gliding process is further illustrated in FIG. 26F. The observed lattice gliding is a direct observation of the "Lattice-Invariant Shear (LIS)" (Radin et al., *Nano Lett* 2017, 17:7789-7795). LIS should exist in many layered electrode materials, which experience stacking-sequence-change phase transformations due to lithium concentration change. It was also predicted that LIS will lead to particle deformation and ridges on the particle surface, but these signals are likely to be buried in the internal boundaries in a spherical-secondary polycrystalline. The micron-sized single crystal provides a clear platform to observe gliding or LIS induced mechanical degradation.

Figure 30A:
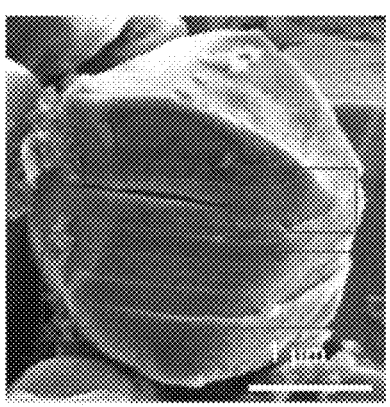
FIGS. 30A-30C are SEM images and STEM images of single crystalline NMC76 showing microcracks, which propagate from the center to the surface, forming fractures.
Figure 30B:
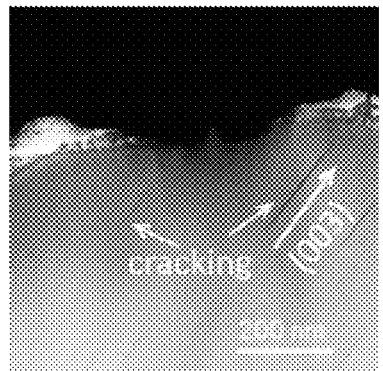
Figure 30C:
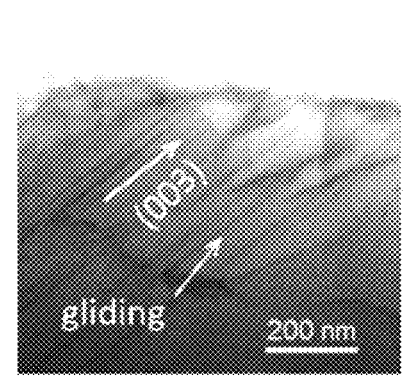

Electrochemical potential difference is the driving force of lithium-ion diffusion and the formation of the lithium concentration gradient (Xiao, *Sci* 2019, 366:426-427). Stress will be generated during Li$^+$ diffusion after establishing a lithium concentration gradient in the lattice. An analytical cylindrical isotropic diffusion-induced stress model was applied to understand the stress generation when lithium ions diffuse along the radial direction in the particle. The analytical solution of the dimensionless principal tress along axial, tangential and radial directions inside this cylindrical particle experienced compression or tension forces during cycling and reached maximum stresses when the Li+ concentration gradient was the highest. The peak tensile stress along tangential and axial directions occurred near the surface at the onset of delithiation (or 0.01 T) (FIGS. 28A-28D). Conversely, the peak tensile stress in all three directions occurred at the center of the particle (FIGS. 29A-29D) during lithiation. During charge (delithiation), the tensile stress along axial and tangential directions was localized on the surfaces of single crystals, leading to microcrack opening normal to (003) planes. FIGS. 30A-30C are SEM images showing microcracks, which propagate from the center to the surface, forming fractures.

Figures 31A, 31B:
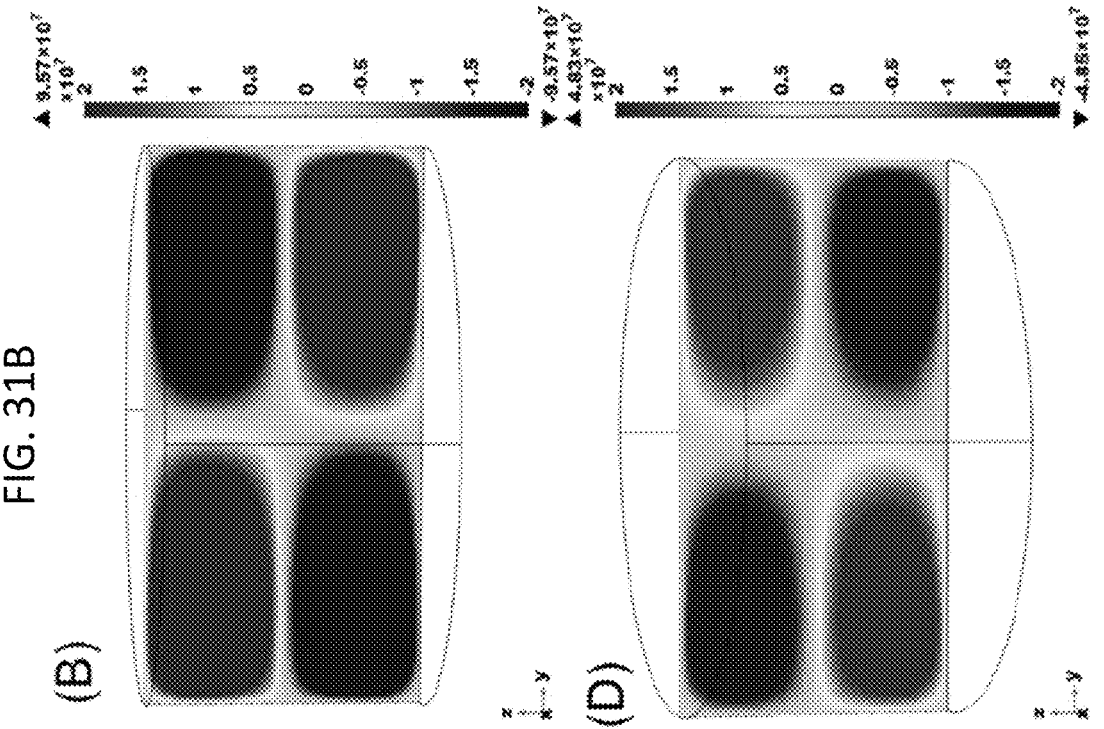
FIGS. 31A-31D show the elastic stress tensor in the local Cartesian coordinate system on the yz plane at a scaled time of 0.1 T solved numerically by the COMSOL model.
Figures 31C, 31D:
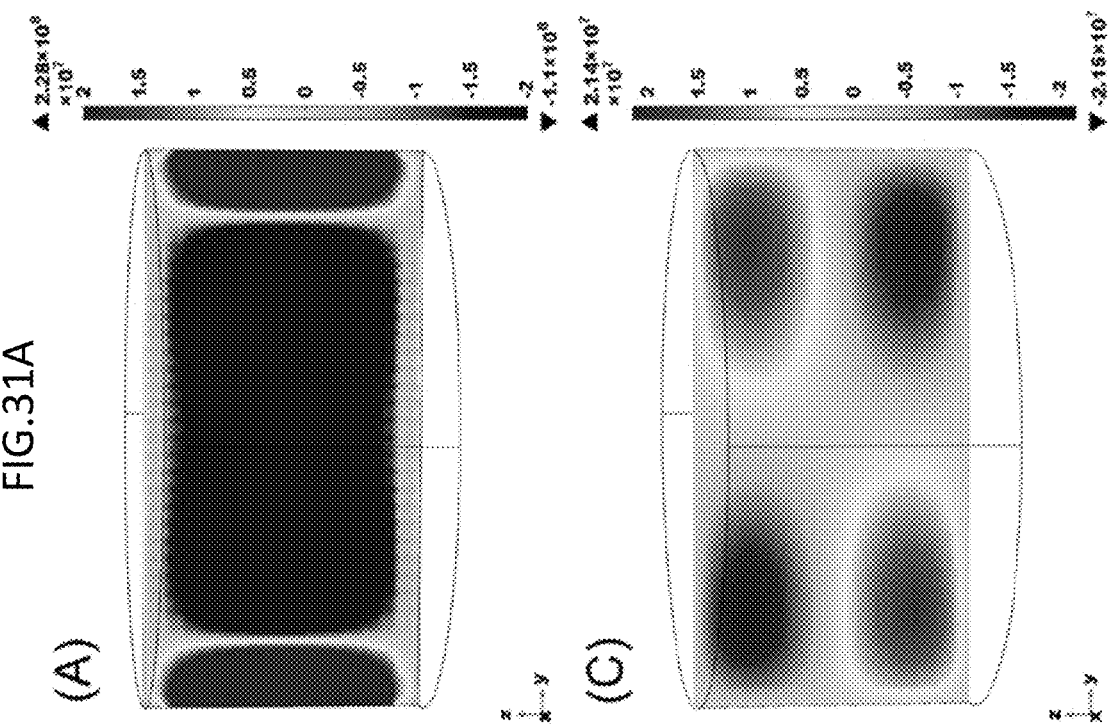

Local stress also has a shear component along other directions, which is solved numerically via COMSOL. The shear stress component along yz direction that can trigger the gliding along the (003) planes is shown in FIGS. 20D and 20E. Although the signs of the shear stress during lithiation and delithiation are opposite, which explains the reversible gliding, the absolute values are not the same (FIGS. 31A-31D), since the elastic modulus is a function of Li concentration. Therefore, the gliding motion should be largely but not completely reversible. The peak stresses in FIGS. 31C and 31D are not exactly the same which provides the explanation of the largely but not completely reversible gliding in single crystalline NMC76 particles. Comparing the stress difference between FIGS. 31C and 31D, the anisotropic volume expansion (chemical strain) will lead to increased shear stress. The peak shear stresses are inside the particle during lithiation and delithiation, suggesting the sliding is likely to initiate inside of the particles. The irreversible gliding can generate small damages, being accumulated into the crack opening over long time cycling, an analog of fatigue crack nucleation. These lead to the ridges and microcracks seen on the surfaces of single crystals after cycling.

The simple isotropic diffusion-induced-stress model can be used to predict if the cracks can be stabilized inside of the single crystal. Since the strain energy inside the particle reaches a maximum around the scaled time of Tp=0.1 T during delithiation (FIGS. 22A-22D), its comparison with the fracture energy (2γ) is used as a criterion to evaluate the critical size of single crystal NMC76. If the accumulated strain energy is not large enough to cleave entire the crystal, the crack will be stabilized inside of the particle.

$$\prod\bigg|_{T_p} = \int \frac{\sigma^2}{2E} dV = \pi * h * \left[\frac{\alpha * E_0 * (C_R - C_0)}{1 - v}\right]^2 * \int_0^r \xi^2 \frac{1}{E} r dr < 2\gamma \quad (1)$$

where h is the height of the cylindrical particle, α is the concentration expansion coefficient, $E_0$ is Young's modulus of the nonlithiated particle, E is Young's modulus at a given lithium-ion concentration, $C_R$ is the lithium-ion concentration at the surface, $C_0$ is the lithium-ion concentration at the center, v is Poisson's ratio and ξ represents the dimensionless stress (FIGS. 22A-D, 23A-D), and γ is the surface energy, A lower bound estimation of the critical size of the single crystal is predicted to be ~3.5 μm, below which cracks can be considered stable inside of the particle. The simulation result suggests that although fractures along (003) direction appear in single crystals during cycling, the cracks are stable once formed and will not initiate catastrophic reactions to produce a fracture zone that eventually pulverizes the entire single crystal. Increasing the applied current density will lead to higher concentration gradient and higher stress generation. Increasing the cutoff voltage is equivalent to increasing ($C_R$–$C_0$) in equation (1). It means higher stress generation and large strain energies at elevated voltages, which causes more "gliding" and "cracking" (FIGS. 7A-7C). The findings provide some strategies to stabilize single crystalline Ni-rich NMC by either reducing the crystal size to below 3.5 μm, absorbing accumulated strain energy through modification of the structure symmetry, or simply optimizing the depth of charge without sacrificing much reversible capacity.

Figure 32:
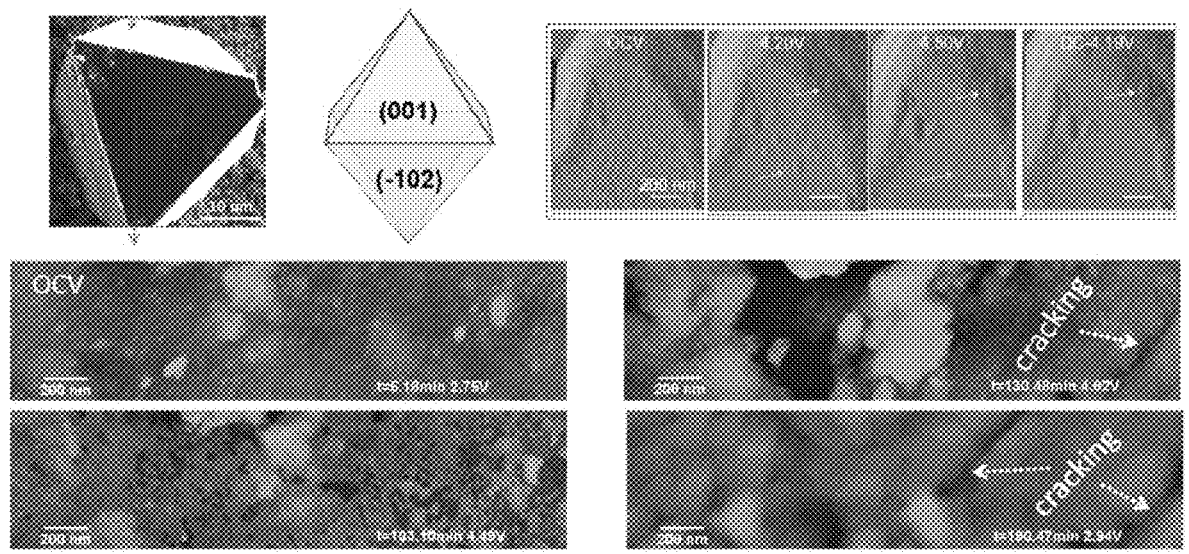
FIG. 32 shows an SEM image of a 20 μm single crystal NMC76 and images obtained by in situ AFM.
Figures 33A, 33B, 33C, 33D:
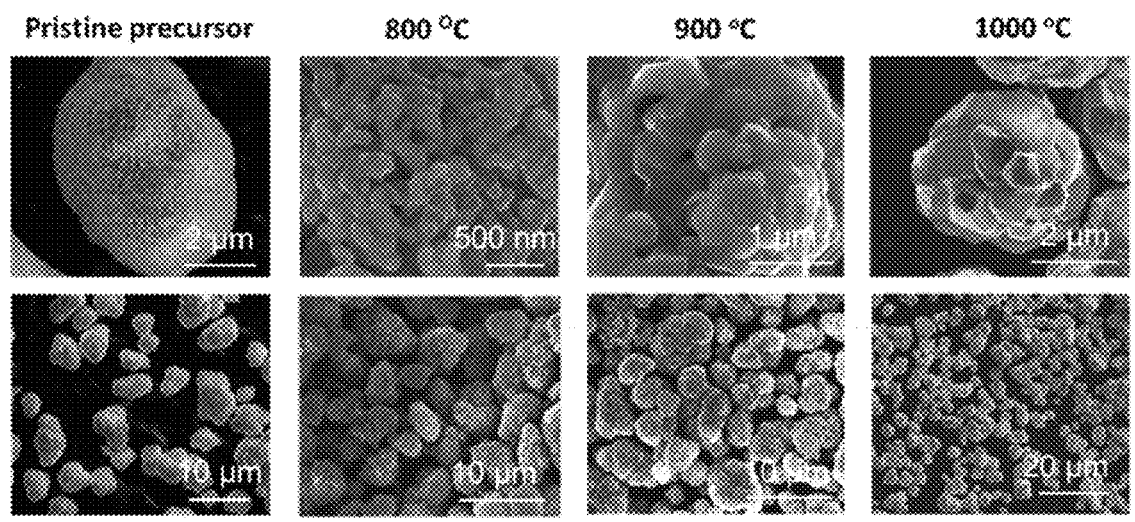
FIGS. 33A-33D are SEM images of pristine $Ni_{0.76}Mn_{0.14}Co_{0.1}(OH)_2$ (33A), and oxides prepared by heating the $Ni_{0.76}Mn_{0.14}Co_{0.1}(OH)_2$ for 15 hours at 800° C. (33B), 900° C. (33C), or 1000° C. (33D).

FIG. 32 shows an SEM image of a 20 μm single crystal NMC76 and images obtained by in situ AFM. Selective formation of a passivation film on certain planes of the NMC76 was found. Dissolution and recrystallization were seen on surfaces of the single crystal. Parallel cracking along the [001] surface was directly captured.

Example 2

Molten-Salt Synthesis and Characterization of Single Crystal $LiNi_{0.76}M_{0.14}Co_{0.1}O_2$ (NMC76)

Synthesis

A hydroxide precursor was prepared as follows. A 2 M solution of transition metal (TM) sulfate solution (Ni:Mn:Co=0.76:0.14:0.10 in molar ratio) was prepared in 805 g deionized water $Ni(SO_4)_2 \cdot 6H_2O$, $MnSO_4 \cdot H_2O$, and $Co(SO_4)_2 \cdot 7H_2O$. Separately 160 g NaOH was dissolved in 500 g $H_2O$. Concentrated $NH_3$—$H_2O$ (28%) was diluted using DI $H_2O$ at 1:1 volume ratio. 1.5 L DI $H_2O$ and 50 mL concentrated $NH_3 \cdot H_2O$ (28%) were added into the reactor as the starting solution. The reactor was heated to 50° C. The $TMSO_4$ solution, NaOH and $NH_3 \cdot H_2O$ were pumped into the reactor at same time. The pump rates were 3 mL/min and 1 mL/min for $TMSO_4$ and $NH_3 \cdot H_2O$, respectively. The pH was controlled at 11.0-11.5. When all $TMSO_4$ solution was added into the reactor, the co-precipitated hydroxides were aged in the reactor for hrs. The precipitates were filtered and washed with DI $H_2O$ ·200 g DI $H_2O$ was used for every 100 g precipitates in washing for 3-5 times. After drying at 100° C. for 12 hours, the hydroxide precursor $Ni_{0.76}Mn_{0.14}Co_{0.1}(OH)_2$ was obtained. Each batch produced ~150 g of the hydroxide precursor.

The mixed hydroxide precursor was heated in air for 15 hours to decompose into mixed oxides. Three different temperatures, 800, 900, and 1000° C., were used to study the influence of temperature on the oxide particle size. The ramping rate was 5° C./minute. The morphology of the pristine hydroxide precursor and the oxides obtained at 800, 900, and 1000° C. are shown in FIGS. 33A-33D, respectively. The optimal calcination temperature was found to be 900° C. for $Ni_{0.76}Mn_{0.14}Co_{0.1}(OH)_2$. Suitable temperatures range from 400–1000° C.

The oxide precursors were mixed with $Li_2O$ at 1:0.6 molar ratio (TM:Li=1:1.2), then the TM-Li mixture was mixed with sintering agent NaCl using a 1:1 weight ratio. The TM-Li—NaCl mixture was heated in a tube furnace filled by flowing pure oxygen gas. The temperature was increased at 10° C./min ramping rate. The mixture was maintained at 800° C. for 10 hours, then at 900° C. for an additional 5 hours. The product was cooled to room temperature. The sintered product (brick) was ground with an agate mortar and then transferred to a beaker for washing away NaCl. For each 15 g of sample, 30 g of water was added. The ground sample was stirred in water for two minutes. After ultrasonication for 2 minutes, the mixture was stirred for an additional 10 minutes to dissolve all residual NaCl. After filtration, the washed powders were heated at 80° C. in vacuum for 2 hours to remove water. The dried samples were further sintered at 580° C. in pure oxygen for four hours to restore some lost oxygen in the lattices.

A schematic diagram of the process is shown in FIG. 34. FIG. 34 also shows SEM images of the hydroxide precursor, the oxide precursor, and the single crystal product.

In the absence of NaCl as a sintering agent, agglomerated of $LiNi_{0.76}Mn_{0.14}Co_{0.1}O_2$ (NMC76) particles are formed instead of single crystals. NaCl is an inexpensive sintering agent, lowering the cost for scaling up the synthesis. FIGS. 35A-35B are SEM images of NMC76 prepared without NaCl sintering agent (FIG. 35A) and with NaCl (FIG. 35B). Without NaCl, the sample was polycrystalline (FIG. 35A). With NaCl, the sample was monocrystalline (FIG. 35B).

Figure 36A:
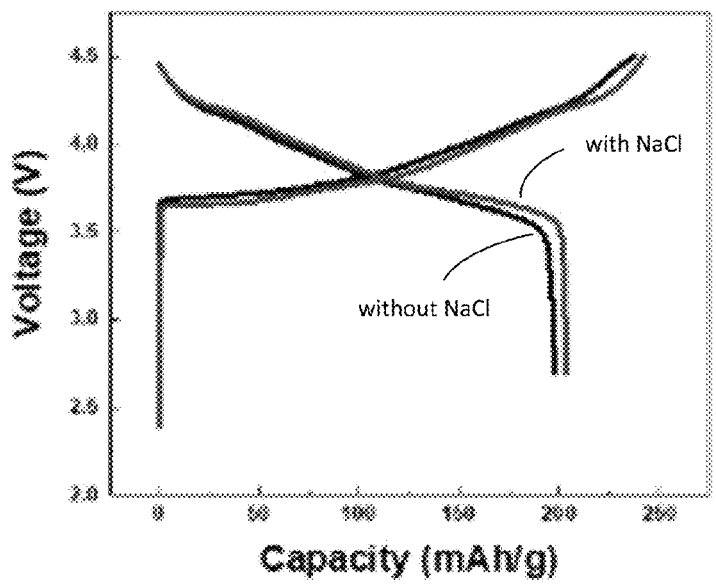
FIGS. 36A-36C show the initial charge-discharge curve of $LiNi_{0.76}Mn_{0.14}Co_{0.1}O_2$ prepared with and without NaCl (36A), the cycling stability of a single crystal NMC76 electrode (20 mg/cm²) in a full cell using graphite as the anode between 2.7-4.2V, charge at 0.1 C and discharge at 0.33 C (36B), and the cycling stability of a single crystal NMC76 electrode (21.5 mg/cm²) in a full cell using graphite as the anode between 2.7-4.3V. 1 C=200 mA/g (36C).
Figure 36B:
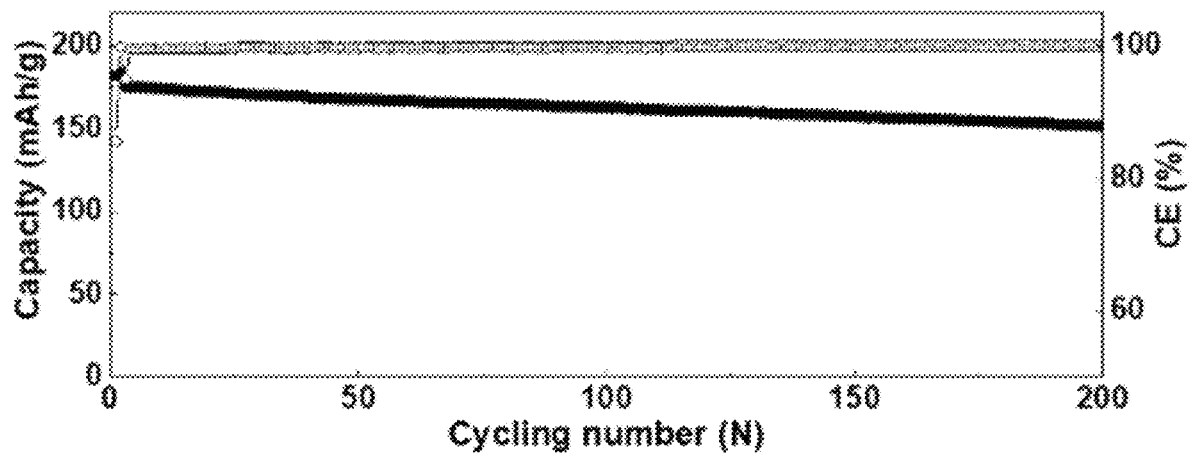
Figure 36C:
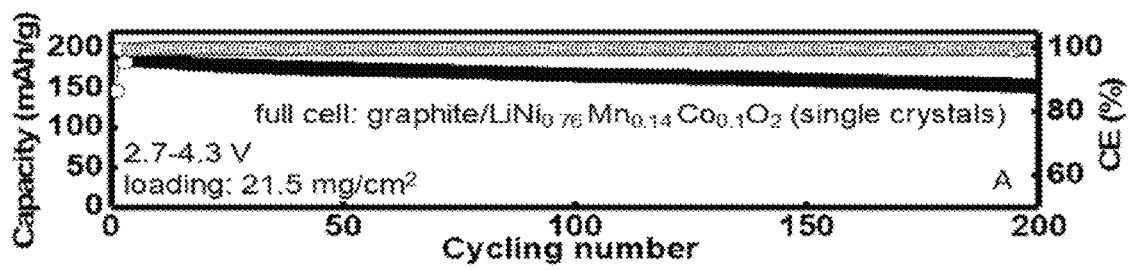

FIG. 36A shows the initial charge-discharge curve of NMC76 prepared with and without NaCl. FIG. 36B shows the cycling stability of a thick single crystal NMC76 electrode (20 mg/cm$^2$) in a full cell using graphite as the anode between 2.7-4.2V, charge at 0.1 C and discharge at 0.33 C. 1 C=200 mA/g. FIG. 36C shows the cycling stability of a single crystal NMC76 electrode (21.5 mg/cm$^2$) in a full cell using graphite as the anode between 2.7-4.3V.

Figure 37A:
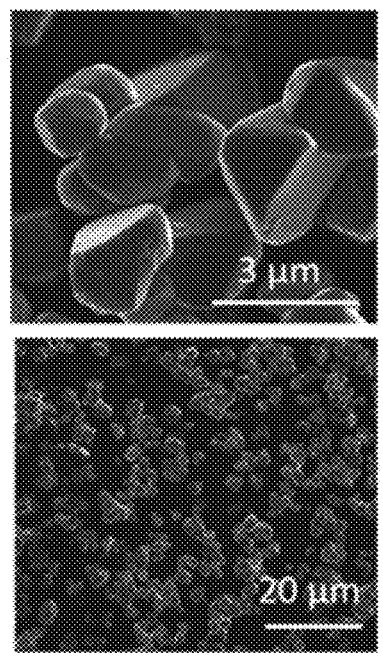
FIGS. 37A-37C are SEM images of $LiNi_{0.7}Mn_{0.22}Co_{0.08}O_2$ washed with water (37A) and formamide (FM) (37B), and the initial charge-discharge curves of the samples (37C).
Figure 37B:
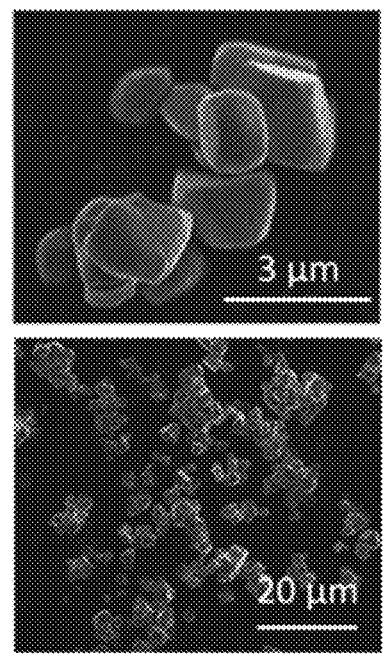
Figure 37C:
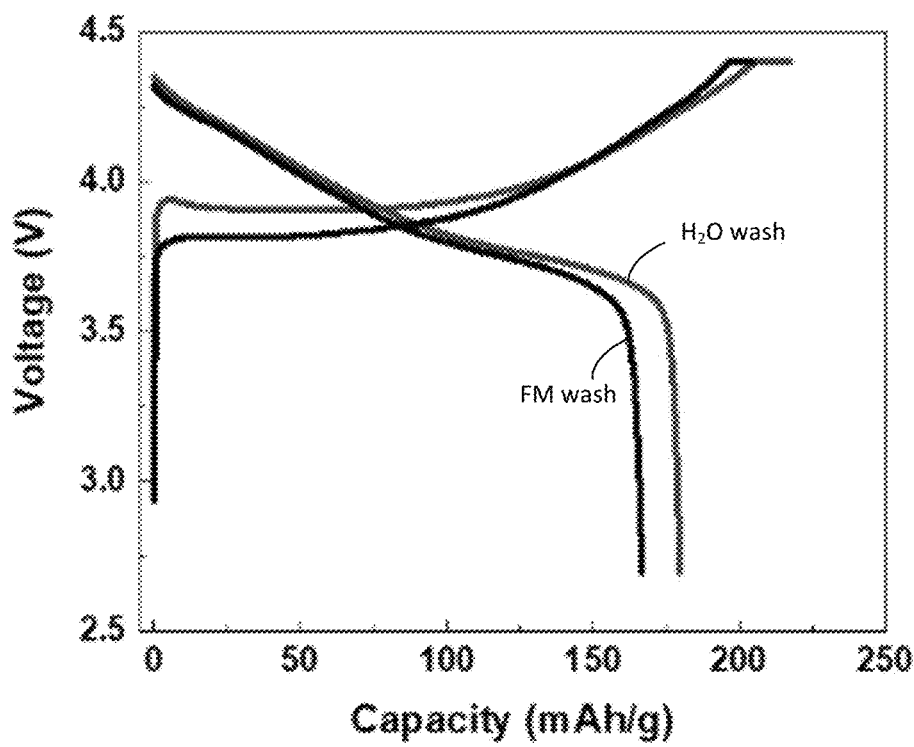

Additional samples were prepared to compare washing with water and other solvents. The samples washed with deionized water displayed the best structural integrity and best electrochemical performance. FIGS. 37A and 37B are SEM images of single crystal $LiNi_{0.7}Mn_{0.22}Co_{0.08}O_2$ washed with water (37A) or formamide (FM) (37B). FIG. 37C shows the initial charge-discharge curves of the two samples.

Figure 38:
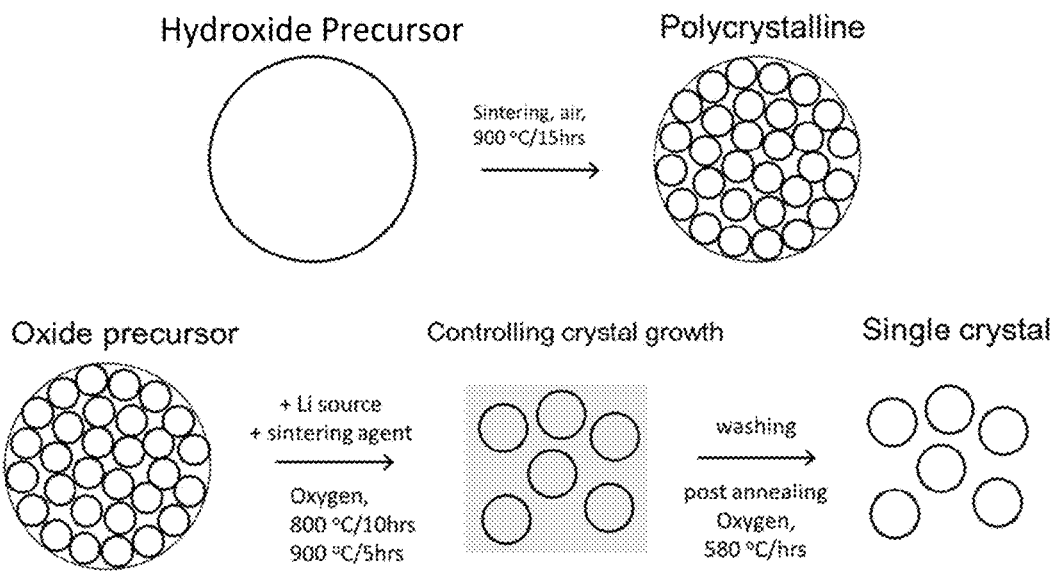
FIG. 38 is a schematic diagram comparing synthesis processes for polycrystalline and monocrystalline $LiNi_xMn_yCo_{1-x-y}O_2$.

FIG. 38 is a schematic diagram comparing synthesis processes for polycrystalline and monocrystalline $LiNi_xMn_yCo_{1-x-y}O_2$. When synthesis proceeds directly from hydroxide precursors, a polycrystalline product is formed. However, when synthesis precedes via oxide precursors as described herein, single crystals are obtained.

Example 3

Flash-Sintering Synthesis and Characterization of Single Crystal $LiNi_{0.76}M_{0.14}C_{0.1}O_2$ (NMC76)

Synthesis

Hydroxide precursors were prepared as described in Example 2. The hydroxide precursors and LiOH were mixed in a molar ratio of 1:1.2 and ground with an agate mortar. The mixture was transferred to a flash sintering furnace and heated to 800° C. in a pure oxygen atmosphere at ramping rates ranging from 2° C./minute to 20° C./minute. The temperature was maintained at 800° C. for 10 hours. No sintering agent was used. Ramping rates up to 50° C./second or faster may be used.

Figures 39A, 39B, 39C:
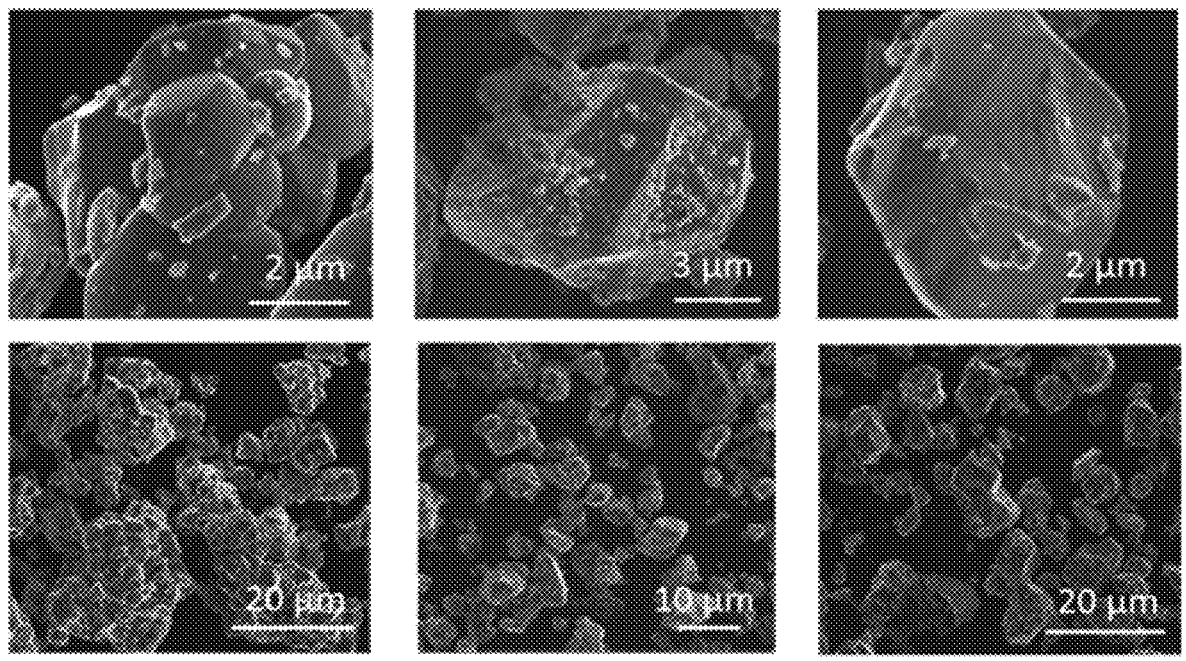
FIGS. 39A-39C are SEM images of $LiNi_{0.76}Mn_{0.14}Co_{0.1}O_2$ prepared by flash sintering at ramping rates of 2° C./min (39A), 10° C./min (39B), and 20° C./min (39C).

FIGS. 39A-39C are SEM images of $LiNi_{0.76}Mn_{0.14}Co_{0.1}O_2$ prepared at ramping rates of 2° C./min (39A), 10° C./min (39B), and 20° C./min (39C). As the ramping rate increased, the particle size increased. The agglomeration of particles was also significantly reduced when heating rate was increased at 20° C., leading to the formation of large single crystals (FIG. 39C).

At a ramping rate of 2° C., however, the particles are mostly aggregated together forming secondary particles instead of individual single crystals. A preheating process was found to facilitate flash sintering. Without wishing to be bound by a particular theory of operation, preheating reduces mismatch of reaction rates. The hydroxide precursor and lithium hydroxide mixtures were pre-heated at 480° C. for 5 hours before flash sintering. During this pre-heating treatment, mixed oxides (including Li oxide) formed. It was also found that the NMC single crystals derived from preheated precursors demonstrated smaller particle sizes which improved the electrochemical kinetics of single crystal NMC. FIGS. 40A and 40B are SEM images of $LiNi_{0.76}Mn_{0.14}Co_{0.1}O_2$ prepared without preheating (40A) or with preheating (40B) prior to flash sintering at a ramping rate of 50° C./minute. FIG. 41 shows the charge-discharge curves of the single crystal NMC samples prepared with and without the preheating process, showing a clear improvement in the reversible capacity with preheating.

Example 4

Solid-State Synthesis and Characterization of Single Crystal $LiNi_{0.76}M_{0.14}C_{0.1}O_2$ (NMC76)

Synthesis

A hydroxide precursor was prepared as follows. A 2 M solution of transition metal (TM) sulfate solution (Ni:Mn:Co=0.76:0.14:0.10 in molar ratio) was prepared in 805 g deionized water using $Ni(SO_4)_2 \cdot 6H_2O$, $MnSO_4 \cdot H_2O$, and $Co(SO_4)_2 \cdot 7H_2O$. Separately 160 g NaOH was dissolved in 500 g $H_2O$. Concentrated $NH_3$—$H_2O$ (28%) was diluted using DI $H_2O$ at 1:1 volume ratio. 3 L DI $H_2O$ and 50 mL concentrated $NH_3 \cdot H_2O$ (28%) were added into the reactor as the starting solution. The reactor was heated to 50° C. The $TMSO_4$ solution, NaOH and $NH_3 \cdot H_2O$ were pumped into the reactor at same time. The pump rates were 3 mL/min and 1 mL/min for $TMSO_4$ and $NH_3 \cdot H_2O$, respectively. The pH was controlled at 10.8. When all $TMSO_4$ solution was added into the reactor, the co-precipitated hydroxides were aged in the reactor for 30 hrs. The precipitates were filtered and washed with DI $H_2O \cdot 200$ g DI $H_2O$ was used for every 100 g precipitates in washing for 3-5 times. After drying at 100° C. for 12 hours, the hydroxide precursor $Ni_{0.76}Mn_{0.14}Co_{0.1}(OH)_2$ was obtained. Each batch produced ~150 g of the hydroxide precursor.

The $Ni_{0.76}Mn_{0.14}Co_{0.1}(OH)_2$ was heated at 900° C. for 15 hours in an oxygen atmosphere with a 10° C./min ramping rate. The hydroxide precursors were converted to oxide precursors in this step.

The oxide precursors were mixed with LiOH at a Li:TM molar ratio of 1:1.07 and annealed at 500° C. for 5 hours. The product was cooled to room temperature and ground. A second annealing was performed at 800° C. for 5 hours. After grinding again at room temperature, a third annealing was performed at 800° C. for an additional 5 hours. The final product was passed through a 400-mesh sieve and collected.

FIGS. 42A and 42B are SEM images of the small particles of $Ni_{0.76}Mn_{0.14}Co_{0.1}(OH)_2$ and the $Ni_{0.76}Mn_{0.14}Co_{0.1}O_2$ precursors, respectively. FIG. 42C is an SEM image of the single crystal $LiNi_{0.76}Mn_{0.14}Co_{0.1}O_2$. Use of small hydroxide precursor particles facilitates synthesis of the desired monocrystalline $LiNi_{0.76}Mn_{0.14}Co_{0.1}O_2$. FIG. 43 shows the first charge and discharge curve of the $LiNi_{0.76}Mn_{0.14}Co_{0.1}O_2$ at 0.1 C between 2.7-4.4 V.

Cathodes comprising the monocrystalline $LiNi_{0.76}Mn_{0.14}Co_{0.1}O_2$ prepared by the molten salt method of Example 2 and the monocrystalline $LiNi_{0.76}Mn_{0.14}Co_{0.1}O_2$ prepared by the solid-state method were compared. FIGS. 44A and 45A show the charge-discharge curves of the two cathodes. The monocrystalline $LiNi_{0.76}Mn_{0.14}Co_{0.1}O_2$ prepared by the solid-state method delivered ~184 mAh/g. It is expected that further development will provide a reversible capacity of NMC811 single crystals of >200 mAh/g, competitive with commercially available polycrystalline NMC, but with greatly enhance stability and safety. FIGS. 44B and 45B are SEM images of the monocrystalline LiNi$_{0.76}$Mn$_{0.14}$Co$_{0.1}$O$_2$ used in each cathode. The individual crystal size in FIG. 44B is ~3 μm. The individual crystal size in FIG. 45B is ~1 μm.

Example 5

Synthesis and Characterization of Single Crystal LiNi$_{0.76}$M$_{0.12}$C$_{0.1}$Mg$_{0.01}$Ti$_{0.01}$O$_2$ Synthesis A hydroxide precursor was prepared as follows. A 2 M solution of transition metal (TM) sulfate solution (Ni:Mn:Co:Mg:Ti=0.76:0.12:0.10:0.01:0.01 in molar ratio) was prepared in 805 g deionized water using Ni(SO$_4$)$_2$·6H$_2$O, MnSO$_4$·H$_2$O, Co(SO$_4$)$_2$·7H$_2$O, MgSO$_4$, and TiOSO$_4$. Separately 160 g NaOH was dissolved in 400 g H$_2$O. Concentrated NH$_3$·H$_2$O (28%) was diluted using DI H$_2$O at 1:1 volume ratio. 1.5 L DI H$_2$O and 50 mL concentrated NH$_3$·H$_2$O (28%) were added into the reactor as the starting solution and preheated to 50° C. The TMSO$_4$ solution, NaOH and NH$_3$·H$_2$O were pumped into the reactor at same time. The pump rates were 3 mL/min and 1 mL/min for TMSO$_4$ and NH$_3$.H$_2$O, respectively. The pH was controlled at 11.5. When all TMSO$_4$ solution was added into the reactor, the co-precipitated hydroxides were aged in the reactor for 30 hrs at 50° C. The precipitates were filtered and washed with DI H$_2$O·200 g DI H$_2$O was used for every 100 g precipitates in washing for 3-5 times. After drying at 100° C. for 12 hours, Mg—Ti-doped hydroxide precursors were obtained.

The doped hydroxide precursors were heated at 900° C. for 15 hours in an oxygen atmosphere with a 10° C./minute ramping rate. The hydroxide precursors were converted to oxide precursors in this step.

The oxide precursors were mixed with Li$_2$O (1:1.4 molar ratio). NaCl was then added in a NaCl:TM-Li mixture of 1:1.1 by weight. The resulting mixture was then annealed at 800° C. for 10 hours and then 900° C. for 5 hours. The product was cooled to room temperature. The sintered product was ground with an agate mortar and then transferred to a beaker for washing away NaCl. For each 15 g of sample, 30 g of water was added. The ground sample was stirred in water for two minutes. After ultrasonication for 2 minutes, the mixture was stirred for an additional 10 minutes to dissolve all residual NaCl. After filtration, the washed powders were heated at 80° C. in vacuum for 2 hours to remove water. The dried samples were further sintered at 580° C. in pure oxygen for four hours to restore some lost oxygen in the lattices and provide LiNi$_{0.76}$Mn$_{0.12}$Co$_{0.1}$Mg$_{0.01}$Ti$_{0.01}$O$_2$, which includes 1 at % Mg and 1 at % Ti.

Figure 47A:
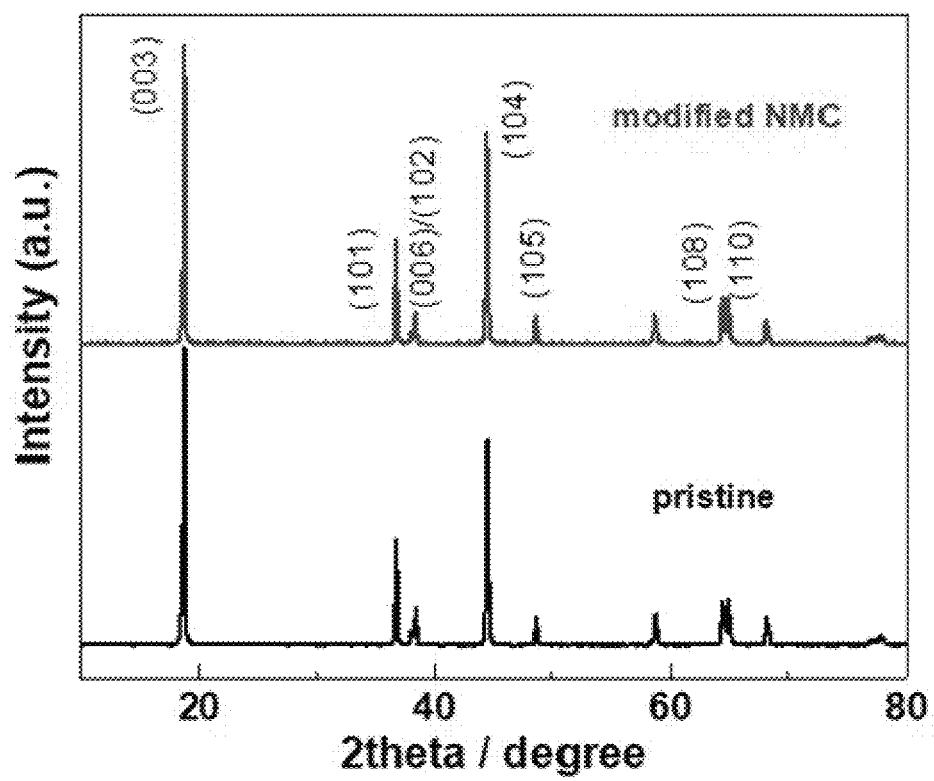
FIGS. 47A and 47B are x-ray diffraction patterns comparing $LiNi_{0.76}Mn_{0.14}Co_{0.1}O_2$ and $LiNi_{0.76}Mn_{0.12}Co_{0.1}Mg_{0.01}Ti_{0.01}O_2$.
Figure 47B:
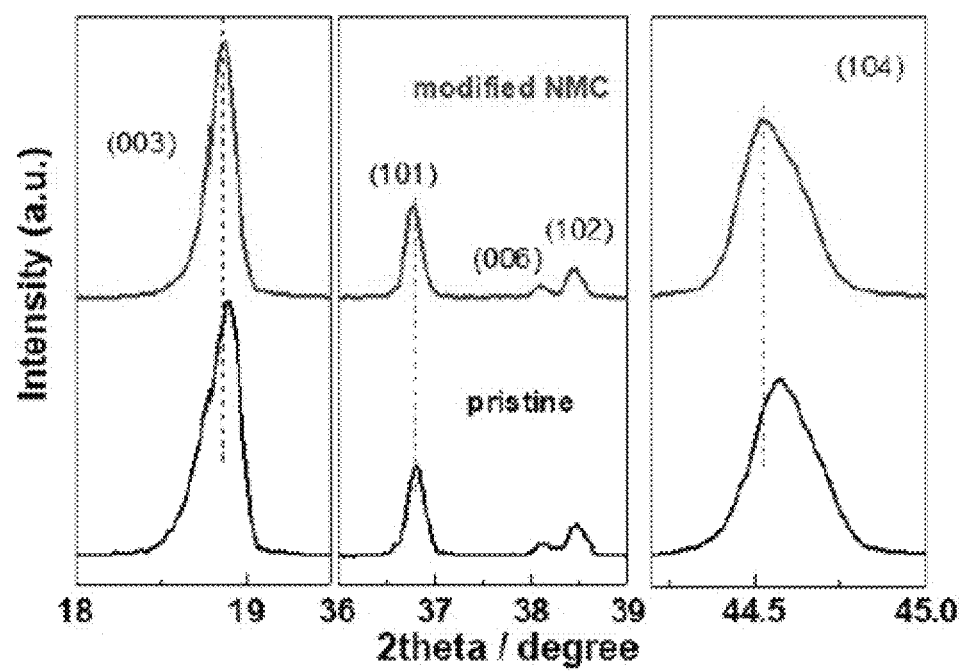

The modified single crystal has a slightly reduced particle size at ca. 2 μm with a very dense structure (FIG. 46). The modified single crystal has a reduced peak ration of (003)/(104), suggesting increased cation disorder (FIG. 47A). Peak shifting to a lower angle in the modified single crystal indicates expansion of the crystal lattice compared to pristine single crystal NMC76 (47B).

FIGS. 48A and 48B compare the charge-discharge curves (48A) and cycling stability (48B) of LiNi$_{0.76}$Mn$_{0.14}$Co$_{0.1}$O$_2$ and LiNi$_{0.76}$Mn$_{0.12}$Co$_{0.1}$Mg$_{0.01}$Ti$_{0.01}$O$_2$. The modified single crystal NMC76 delivered at slightly slower capacity at ca. 191 mAh/g capacity compared to the pristine single crystal NMC76 in a full cell tested at relevant conditions—high mass loading and thick electrodes. The modified NMC76 displayed improved cycling stability with 81.8% capacity retention after 200 cycles, compared to pristine NMC76 with 72.0% capacity retention. As shown in FIG. 49, no obvious cracking was observed in the modified NMC76 after cycling.

Example 6

Pouch Cell Design

Table 5 provides parameters for 2.2-2.3 Ah pouch cells using graphite/NMC811 and graphite/NMC955 chemistries. Coin cells with similar cathode loading, areal capacity, porosity, press density, N/P ratio, and the like, will be used for initial testing. Replacing graphite with Si or Li metal may increase the cell level energy to 300-350 Wh/kg with the single crystal NMC cathode.

TABLE 5

Cell design parameters for 2.2-2.3 Ah pouch cell designs based on graphite/NMC chemistry

| | Material | NMC811 | NMC955 |
|---|---|---|---|
| Cathode | 1$^{st}$ discharge capacity (mAh g$^{-1}$) | 200 | 210 |
| | Active material loading | 96% | 96% |
| | Cathode weight (each side) (mg cm$^{-2}$) | 18.3 | 18.3 |
| | Areal capacity (each side) (mAh cm$^{-2}$) | 3.5 | 3.7 |
| | Electrode press density (g cm$^{-3}$) | 3.0 | 3.0 |
| | Electrode thickness (each side) (μm) | 61 | 61 |
| | Number of double side layers* | 16 | 16 |
| Al foil | Thickness (μm) | 10 | 10 |
| Anode | Material | graphite | graphite |
| | Specific capacity (mAh g$^{-1}$) | 360 | 360 |
| | Active material loading | 96% | 96% |
| | Coating weight (each side) (mg cm$^{-2}$) | 11.4 | 12.0 |
| | Areal capacity (each side) (mAh cm$^{-2}$) | 3.9 | 4.1 |
| | N/P ratio (cell balance) (μm) | 1.12 | 1.12 |
| Cu foil | Thickness/μm | 8 | 8 |
| Electrolyte | Electrolyte/Capacity ratio (g Ah$^{-1}$) | 3.5 | 3.4 |
| Separator | Thickness/μm | 20 | 20 |
| Packet foil | Thickness/μm | 88 | 88 |
| Cell | Average voltage (1$^{st}$ cycle) (V) | 3.65 | 3.7 |
| | Capacity (1$^{st}$ cycle) (Ah) | 2.2 | 2.3 |
| | Cell energy density (Wh kg$^{-1}$) | 250 | 264 |

*number of cathodes comprising Al foil sandwiched between two NMC coating layers In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A solid-state method comprising:
    making monocrystalline lithium nickel manganese cobalt oxide by
        heating a solid hydroxide precursor comprising Ni$_x$M-n$_y$M$_z$Co$_{1-x-y-z}$(OH)$_2$ at a temperature T$_{S1}$ in an oxygen-containing atmosphere for an effective period of time t$_1$ to convert the solid hydroxide precursor to a solid oxide precursor;

combining the solid oxide precursor with a molar excess of a lithium compound;

heating the solid oxide precursor and the lithium compound at a temperature $T_{S2}$ for an effective period of time $t_2$ to produce a first product;

cooling the first product to ambient temperature;

reducing a mean particle size of the first product to 0.1 μm to 10 μm;

heating the first product having the reduced mean particle size at a temperature $T_{S3}$ for an effective period of time $t_3$ to produce a second product;

cooling the second product to ambient temperature;

reducing a mean particle size of the second product to 0.1 μm to 10 μm; and heating the second product having the reduced mean particle size at a temperature $T_{S4}$ for an effective period of time $t_4$ to produce monocrystalline lithium nickel manganese cobalt oxide having a formula $LiNi_xMn_yM_zCo_{1-x-y-z}O_2$, where M represents one or more dopant metals, x≥0.6, 0.01≤y<0.2, 0≤z≤0.05, and x+y+z≤1.0.

2. The solid-state method of claim 1, wherein:
(i) the solid hydroxide precursor has a mean particle size of 0.5 μm to 2.5 μm; or
(ii) the monocrystalline lithium nickel manganese cobalt oxide has a mean particle size of 0.5 μm to 5 μm; or
(iii) the dopant metal M comprises Mg, Ti, Al, Zn, Fe, Zr, Sn, Sc, V, Cr, Fe, Cu, Zu, Ga, Y, Zr, Nb, Mo, Ru, Ta, W, Ir, or any combination thereof; or
(iv) any combination of (i)-(iii).

3. The solid-state method of claim 1, wherein:
(i) the temperature $T_{S1}$ is 400° C. to 1000° C.; or
(ii) the effective period of time $t_1$ is 1 hour to 30 hours; or
(iii) the temperature $T_{S2}$ is 400° C. to 1000° C.; or
(iv) the effective period of time $t_2$ is 1 hour to 30 hours; or
(v) the temperature $T_{S3}$ is 600° C. to 1000° C.; or
(vi) the effective period of time $t_3$ is 1 hour to 30 hours; or
(vii) the temperature $T_{S4}$ is 600° C. to 1000° C.; or
(viii) the effective period of time $t_4$ is 1 hour to 30 hours; or
(ix) any combination of (i)-(viii).

4. The solid-state method of claim 1, wherein heating the solid hydroxide precursor at the temperature $T_{S1}$ in the oxygen-containing atmosphere for the effective period of time $t_1$ further comprises:
(i) increasing the temperature to the temperature $T_{S1}$ at a rate of 1-300° C./min, and heating the solid hydroxide precursor at the temperature $T_{S1}$ for the effective period of time $t_1$; or
(ii) heating the solid hydroxide precursor in pure oxygen or air; or
(iii) both (i) and (ii).

5. The solid-state method of claim 1, wherein:
(i) x=0.65-0.9, y=0.05-0.2, z=0-0.02, and x+y+z=0.7-0.95; or
(ii) the lithium compound comprises lithium hydroxide, lithium carbonate, lithium nitrate, lithium oxide, lithium peroxide, or any combination thereof; or
(iii) the solid oxide precursor and the lithium compound are combined in a Li:solid oxide precursor molar ratio of 0.9:1 to 3:1; or
(iv) any combination of (i), (ii), and (iii).

6. The solid-state method of claim 1, further comprising preparing the solid hydroxide precursor by:
preparing a 1.5-2.5 M solution comprising metal salts in water, the metal salts comprising a nickel (II) salt, a manganese (II) salt, a cobalt (II) salt, and optionally one or more dopant metal salts, wherein a mole fraction x of the nickel (II) salt in the solution is ≥0.6, a mole fraction y of the manganese (II) salt is 0.01≤y<0.2, a mole fraction z of the one or more dopant metal salts is 0≤z≤0.05, a mole fraction of the cobalt (II) salt is 1−x−y−z, and x+y+z≤1.0;

combining the solution comprising metal salts in water with aqueous $NH_3$ and aqueous NaOH or KOH to provide a combined solution having a pH of 10.5-12 and a combined metal salt concentration of 0.1 M to 3 M;

aging the combined solution for 5 hours to 48 hours at a temperature of 25° C. to 80° C. to co-precipitate hydroxides of nickel, manganese, and cobalt to provide the solid hydroxide precursor; and drying the solid hydroxide precursor, wherein the solid hydroxide precursor comprises particles having a mean particle size of 0.5 μm to 2.5 μm.

7. The solid state method of claim 6, wherein the metal salts are sulfates, nitrates, chlorides, acetates, or a combination thereof.

8. The solid state method of claim 6, wherein the metal salts are sulfates, nitrates, or a combination thereof.

9. The solid state method of claim 1, wherein:
x is 0.7-0.9;
y is 0.05-0.15;
z is 0-0.02; and
x+y+z is 0.7-0.95.

10. The solid-state method of claim 1, wherein:
the temperature $T_{S1}$ is 800 ° C. to 1000 ° C.; and
the effective period of time $t_1$ is 10 hours to 20 hours.

11. The solid-state method of claim 1, wherein:
the temperature $T_{S2}$ is 400 ° C. to 600 ° C. and the effective period of time $t_2$ is 1 hour to 10 hours.

12. The solid-state method of claim 1, wherein:
the temperature $T_{S3}$ is 700 ° C. to 900 ° C.; and
the effective period of time $t_3$ is 1 hour to 10 hours.

13. The solid-state method of claim 1, wherein:
the temperature $T_{S4}$ is 700 ° C. to 900 ° C.; and
the effective period of time $t_4$ is 1 hour to 10 hours.

14. The solid-state method of claim 1, wherein the lithium compound comprises lithium hydroxide.

15. The solid-state method of claim 1, wherein the solid oxide precursor and the lithium compound are combined in a Li : solid oxide precursor molar ratio of 1.05:1 to 1.5:1.

16. The solid-state method of claim 1, wherein heating the solid hydroxide precursor at the temperature $T_{S1}$ in the oxygen-containing atmosphere for the effective period of time $t_1$ further comprises increasing the temperature to the temperature $T_{S1}$ at a rate of 1° C/min to 50° C/min, and heating the solid hydroxide precursor at the temperature $T_{S1}$ for the effective period of time b.

17. The solid-state method of claim 1, wherein the monocrystalline lithium nickel manganese cobalt oxide has a mean particle size of 1 μm to 5 μm.

* * * * *